(12) United States Patent
Fujita et al.

(10) Patent No.: US 12,187,384 B2
(45) Date of Patent: Jan. 7, 2025

(54) REAR SPROCKET

(71) Applicant: SHIMANO INC., Sakai (JP)

(72) Inventors: Hiroshi Fujita, Sakai (JP); Yusuke Oda, Sakai (JP); Hiroaki Uemura, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 17/950,105

(22) Filed: Sep. 22, 2022

(65) Prior Publication Data

US 2024/0067299 A1    Feb. 29, 2024

Related U.S. Application Data

(63) Continuation-in-part of application No. 17/899,549, filed on Aug. 30, 2022, now abandoned.

(51) Int. Cl.
B62M 9/10 (2006.01)

(52) U.S. Cl.
CPC .................... B62M 9/10 (2013.01)

(58) Field of Classification Search
CPC .......... F16H 55/30; F16H 55/12; B62M 9/10; F16D 2001/103
USPC ........................................................ 474/160
See application file for complete search history.

(56) References Cited

U.S. PATENT DOCUMENTS

| | | | | |
|---|---|---|---|---|
| 6,382,381 B1* | 5/2002 | Okajima | ................. | B60B 1/042 192/64 |
| 6,428,437 B1* | 8/2002 | Schlanger | ................. | B62M 9/10 474/160 |
| 8,956,254 B2* | 2/2015 | Tokuyama | ............... | B62M 9/12 474/160 |
| 9,868,491 B1* | 1/2018 | Oishi | ....................... | B62M 9/10 |
| 10,093,388 B2* | 10/2018 | Kamada | ................... | B62M 9/10 |
| 10,625,820 B2* | 4/2020 | Emura | ..................... | B62M 9/12 |
| 2004/0142782 A1* | 7/2004 | Kamada | ................... | B62M 9/10 474/160 |
| 2004/0142783 A1* | 7/2004 | Kamada | ................... | B62M 9/10 474/160 |
| 2008/0188336 A1* | 8/2008 | Tokuyama | ............... | B62M 9/10 474/160 |
| 2011/0092327 A1* | 4/2011 | Oishi | ....................... | B62M 9/10 474/160 |
| 2012/0196711 A1* | 8/2012 | Loy | .......................... | B62M 9/10 474/160 |
| 2012/0225745 A1* | 9/2012 | Oishi | .................... | B62M 9/125 474/160 |

(Continued)

FOREIGN PATENT DOCUMENTS

DE    10 2019 218 548    7/2020

*Primary Examiner* — Henry Y Liu
(74) *Attorney, Agent, or Firm* — MORI & WARD, LLP

(57) ABSTRACT

A rear sprocket comprises a sprocket body, a plurality of sprocket teeth, a plurality of spline teeth, a maximum spline distance, and a radial tooth-bottom distance. Each of the plurality of spline teeth has a spline crest. The maximum spline distance is defined from the rotational center axis to the spline crest. The radial tooth-bottom distance is defined from a rotational center axis to one of plurality of tooth bottom center points. The maximum spline distance is larger than the radial tooth-bottom distance. The spline crest of each of the plurality of spline teeth is positioned radially inwardly from the tooth outline of each of the plurality of sprocket teeth in the radial direction.

20 Claims, 39 Drawing Sheets

(56) References Cited

U.S. PATENT DOCUMENTS

| | | | |
|---|---|---|---|
| 2015/0133249 A1* | 5/2015 | Tsai | B62M 9/12 |
| | | | 474/160 |
| 2016/0114859 A1* | 4/2016 | Tsai | B62M 9/10 |
| | | | 474/160 |
| 2017/0369124 A1* | 12/2017 | Kamada | F16H 55/30 |
| 2018/0009505 A1* | 1/2018 | Kamada | F16H 55/30 |
| 2018/0022415 A1* | 1/2018 | Oishi | B62M 9/10 |
| | | | 474/160 |
| 2018/0022416 A1* | 1/2018 | Oishi | B62M 9/12 |
| | | | 474/160 |
| 2018/0194431 A1* | 7/2018 | Iwai | B62M 9/10 |
| 2019/0092425 A1* | 3/2019 | Fujita | B60B 27/023 |
| 2019/0092427 A1* | 3/2019 | Oka | B62M 9/12 |
| 2019/0225301 A1* | 7/2019 | Emura | F16H 55/30 |
| 2019/0225302 A1* | 7/2019 | Emura | F16H 55/30 |
| 2019/0359284 A1* | 11/2019 | Fukunaga | F16H 55/30 |
| 2019/0359285 A1* | 11/2019 | Emura | B62M 9/10 |
| 2020/0239106 A1 | 7/2020 | Fukunaga et al. | |
| 2020/0269953 A1* | 8/2020 | Fukunaga | B62M 9/10 |
| 2021/0171155 A1* | 6/2021 | Fukumori | B62M 9/10 |
| 2022/0258833 A1* | 8/2022 | Li | B62M 9/10 |

\* cited by examiner

REAR SPROCKET

CROSS-REFERENCE TO RELATED APPLICATIONS

The present application is a continuation-in-part application of the U.S. patent application Ser. No. 17/899,549 filed Aug. 30, 2022. The contents of this application are incorporated herein by reference in their entirety.

BACKGROUND

Technical Field

The present invention relates to a rear sprocket.

Background Information

A human-powered vehicle includes a sprocket assembly configured to be engage with a chain. The sprocket assembly includes a plurality of sprockets. The sprocket includes a torque-transmitting part configured to engage with another torque-transmitting part of a neighboring sprocket to transmit torque between the sprocket and the neighboring sprocket. It is preferable to improve the strength of the torque-transmitting part of the sprocket in a case where the sprocket has a comparatively small outer diameter.

The sprocket includes a shifting facilitation structure configured to facilitate a shifting operation in which a chain is shifted between sprockets. It is preferable to smoothen the shifting operation.

SUMMARY

In accordance with a first aspect of the present invention, a rear sprocket is configured to be mounted to a rear hub assembly for a human-powered vehicle. The rear sprocket has a rotational center axis to define an axial direction, a radial direction and a circumferential direction. The rear sprocket comprises a sprocket body, a plurality of sprocket teeth, a plurality of spline teeth, a maximum spline distance, and a radial tooth-bottom distance. The plurality of sprocket teeth extends radially outwardly from the sprocket body in the radial direction. The plurality of sprocket teeth defines a plurality of tooth bottom center points spaced apart from each other in the circumferential direction. Each of the plurality of sprocket teeth has a tooth outline extending from corresponding one of the plurality of tooth bottom center points to a neighboring tooth bottom center point among the plurality of tooth bottom center points in the circumferential direction. The plurality of spline teeth is configured to transmit a driving torque to a neighboring sprocket adjacent to the rear sprocket without another sprocket between the rear sprocket and the neighboring sprocket in the axial direction. Each of the plurality of spline teeth has a spline crest. The maximum spline distance is defined from the rotational center axis to the spline crest. The radial tooth-bottom distance is defined from the rotational center axis to one of the plurality of tooth bottom center points. The maximum spline distance is larger than the radial tooth-bottom distance. The spline crest of each of the plurality of spline teeth is positioned radially inwardly from the tooth outline of each of the plurality of sprocket teeth in the radial direction.

With the rear sprocket according to the second aspect, since the maximum spline distance is larger than the radial tooth-bottom distance, the strength of the plurality of spline teeth can be improved. Furthermore, it is possible to manufacture the rear sprocket having the plurality of spline tooth by forging.

In accordance with a second aspect of the present invention, the rear sprocket assembly according to the first aspect is configured so that the sprocket body has a sprocket opening configured to receive a hub axle of the rear hub assembly in a hub mounting state where the rear sprocket is mounted to the rear hub assembly.

With the rear sprocket according to the second aspect, it is possible to mount the rear sprocket to the rear hub assembly.

In accordance with a third aspect of the present invention, the rear sprocket assembly according to the second aspect is configured so that the sprocket opening has a minimum diameter that is smaller than an outermost diameter of a sprocket support body of the rear hub assembly.

With the rear sprocket according to the third aspect, a total number of the plurality of sprocket teeth can be less than 10.

In accordance with a fourth aspect of the present invention, the rear sprocket assembly according to any one of the first to third aspects further comprises an annular base from which the plurality of spline teeth extends radially outwardly in the radial direction.

With the rear sprocket according to the fourth aspect, the annular base makes it easier to arrange the plurality of spline teeth.

In accordance with a fifth aspect of the present invention, the rear sprocket assembly according to the fourth aspect has an axially outwardly facing surface and an axially inwardly facing surface. The axially inwardly facing surface is provided on a reverse side of the axially outwardly facing surface in the axial direction. The axially inwardly facing surface is configured to face toward an axial center plane of the human-powered vehicle in the axial direction in a vehicle mounting state where the rear sprocket is mounted to the human-powered vehicle. The annular base extends axially inwardly from the axially inwardly facing surface of the sprocket body in the axial direction.

With the rear sprocket according to the fifth aspect, it is possible to arrange the plurality of spline teeth to engage with the neighboring sprocket provided between the rear sprocket and the axial center plane of the human-powered vehicle.

In accordance with a sixth aspect of the present invention, the rear sprocket assembly according to the fourth or fifth aspect is configured so that the sprocket body has a sprocket opening configured to receive a hub axle of the rear hub assembly in a hub mounting state where the rear sprocket is mounted to the rear hub assembly. The annular base is disposed so as to surround the sprocket opening as viewed in the axial direction.

With the rear sprocket according to the sixth aspect, it is possible to arrange the plurality of spline teeth to the rear sprocket which is easily attachable to the rear hub assembly.

In accordance with a seventh aspect of the present invention, the rear sprocket assembly according to any one of the first to sixth aspects is configured so that the plurality of spline teeth is spaced apart from the plurality of sprocket teeth in the axial direction.

With the rear sprocket according to the seventh aspect, it is possible to reduce interference between the drive chain and the plurality of spline teeth while improving the strength of the plurality of spline teeth.

In accordance with an eighth aspect of the present invention, the rear sprocket assembly according to any one of the first to seventh aspects is configured so that at least two spline teeth of the plurality of spline teeth are disposed so as to overlap with one of the plurality of sprocket teeth as viewed in the axial direction.

With the rear sprocket according to the eighth aspect, it is possible to increase the total number of the spline teeth. Thus, it is possible to further improve the strength of the plurality of spline teeth.

In accordance with a ninth aspect of the present invention, the rear sprocket assembly according to any one of the first to eighth aspects is configured so that the plurality of spline teeth includes at least one positioning spline tooth which is different from the other spline teeth of the plurality of spline teeth in at least one of size and shape.

With the rear sprocket according to the ninth aspect, it is possible to circumferentially position the rear sprocket in a predetermined position relative to the neighboring sprocket.

In accordance with a tenth aspect of the present invention, the rear sprocket assembly according to the ninth aspect is configured so that the at least one positioning spline tooth has a circumferential positioning-spline width which is larger than each of circumferential spline widths of the other spline teeth of the plurality of spline teeth.

With the rear sprocket according to the tenth aspect, it is possible to reliably and circumferentially position the rear sprocket in the predetermined position relative to the neighboring sprocket.

In accordance with an eleventh aspect of the present invention, the rear sprocket assembly according to any one of the first to tenth aspects is configured so that the plurality of spline teeth includes at least one circumferentially symmetrical tooth with respect to the rotational center axis.

With the rear sprocket according to the eleventh aspect, it is possible to reduce uneven wear of the at least one circumferentially symmetrical tooth.

In accordance with a twelfth aspect of the present invention, the rear sprocket assembly according to the eleventh aspect is configured so that the plurality of spline teeth includes a plurality of circumferentially symmetrical teeth with respect to the rotational center axis.

With the rear sprocket according to the twelfth aspect, it is possible to reliably reduce uneven wear of the at least one circumferentially symmetrical tooth.

In accordance with a thirteenth aspect of the present invention, the rear sprocket assembly according to any one of the first to twelfth aspects is configured so that the plurality of spline teeth includes at least one circumferentially asymmetrical tooth with respect to the rotational center axis.

With the rear sprocket according to the thirteenth aspect, it is possible to reduce interference between the at least one circumferentially asymmetrical tooth and a shifting facilitation structure of the neighboring sprocket.

In accordance with a fourteenth aspect of the present invention, the rear sprocket assembly according to any one of the first to thirteenth aspects is configured so that a total spline-tooth number of the plurality of spline teeth ranges from 15 to 18.

With the rear sprocket according to the fourteenth aspect, it is possible to arrange the plurality of the spline teeth having a necessary and sufficient number within the tooth outline of the rear sprocket.

In accordance with a fifteenth aspect of the present invention, the rear sprocket assembly according to any one of the first to fourteenth aspects is configured so that a total sprocket-tooth number of the plurality of sprocket teeth is equal to or smaller than 10.

With the rear sprocket according to the fifteenth aspect, it is possible to provide the plurality of spline teeth with necessary and sufficient strength while the rear sprocket has a comparatively small outer diameter.

In accordance with a sixteenth aspect of the present invention, the rear sprocket assembly according to the fifteenth aspect is configured so that a total sprocket-tooth number of the plurality of sprocket teeth is nine.

With the rear sprocket according to the sixteenth aspect, it is possible to provide the plurality of spline teeth with necessary and sufficient strength while the rear sprocket has a comparatively small outer diameter.

In accordance with a seventeenth aspect of the present invention, a rear sprocket is configured to be mounted to a rear hub assembly for a human-powered vehicle. The rear sprocket has a rotational center axis to define an axial direction, a radial direction and a circumferential direction. The rear sprocket comprises a sprocket body, a plurality of sprocket teeth, and a plurality of spline teeth. The plurality of sprocket teeth extends radially outwardly from the sprocket body in the radial direction. The plurality of sprocket teeth defines a plurality of tooth bottom center points spaced apart from each other in the circumferential direction. The plurality of spline teeth is configured to transmit driving torque to a neighboring sprocket adjacent to the rear sprocket without another sprocket between the rear sprocket and the neighboring sprocket in the axial direction. The plurality of spline teeth is disposed so as to be offset from the plurality of tooth bottom center points in the circumferential direction.

With the rear sprocket according to the seventeenth aspect, since the plurality of spline teeth is disposed so as to be offset from the plurality of tooth bottom center points in the circumferential direction, it is possible to increase a size of at least one of the plurality of spline teeth. Thus, it is possible to improve the strength of the plurality of spline teeth. Furthermore, it is possible to manufacture the rear sprocket having the plurality of spline tooth by forging.

In accordance with an eighteenth aspect of the present invention, the rear sprocket assembly according to the seventeenth aspect is configured so that a total spline-tooth number of the plurality of spline teeth ranges from 15 to 18.

With the rear sprocket according to the eighteenth aspect, it is possible to arrange the plurality of the spline teeth having a necessary and sufficient number within the tooth outline of the rear sprocket.

In accordance with a nineteenth aspect of the present invention, the rear sprocket assembly according to the seventeenth or eighteenth aspect is configured so that a total sprocket-tooth number of the plurality of sprocket teeth is equal to or smaller than 10.

With the rear sprocket according to the nineteenth aspect, it is possible to provide the plurality of spline teeth with necessary and sufficient strength while the rear sprocket has a comparatively small outer diameter.

In accordance with a twentieth aspect of the present invention, the rear sprocket assembly according to the nineteenth aspect is configured so that a total sprocket-tooth number of the plurality of sprocket teeth is nine.

With the rear sprocket according to the twentieth aspect, it is possible to provide the plurality of spline teeth with necessary and sufficient strength while the rear sprocket has a comparatively small outer diameter.

In accordance with a twenty-first aspect of the present invention, a rear sprocket is configured to be mounted to a rear hub assembly for a human-powered vehicle. The rear sprocket has a rotational center axis to define an axial direction, a radial direction and a circumferential direction. The rear sprocket has an axially outwardly facing surface, and an axially inwardly facing surface. The axially inwardly facing surface is provided on a reverse side of the axially outwardly facing surface in the axial direction. The axially inwardly facing surface is configured to face toward an axial center plane of the human-powered vehicle in the axial direction in a vehicle mounting state where the rear sprocket is mounted to the human-powered vehicle. The rear sprocket comprises a sprocket body and a plurality of sprocket teeth. The plurality of sprocket teeth extends radially outwardly from the sprocket body in the radial direction. The plurality of sprocket teeth includes a first upshifting facilitation tooth, a second upshifting facilitation tooth, a third upshifting facilitation tooth and an upshifting initiation tooth. The first upshifting facilitation tooth, the second upshifting facilitation tooth and the third upshifting facilitation tooth are configured to facilitate an upshifting operation where a drive chain is shifted from a neighboring larger sprocket toward the rear sprocket. The upshifting initiation tooth is configured to firstly engage with the drive chain during the upshifting operation. The first upshifting facilitation tooth has a first recess provided to the axially inwardly facing surface of the first upshifting facilitation tooth so as to be dented from the axially inwardly facing surface toward the axially outwardly facing surface in the axial direction. The second upshifting facilitation tooth has a second recess provided to the axially inwardly facing surface of the second upshifting facilitation tooth so as to be dented from the axially inwardly facing surface toward the axially outwardly facing surface in the axial direction. The second upshifting facilitation tooth is adjacent to the first upshifting facilitation tooth at an upstream side of the first upshifting facilitation tooth with respect to a driving rotational direction of the rear sprocket without another tooth between the first upshifting facilitation tooth and the second upshifting facilitation tooth in the circumferential direction. The third upshifting facilitation tooth has a third recess provided to the axially inwardly facing surface of the third upshifting facilitation tooth so as to be dented from the axially inwardly facing surface toward the axially outwardly facing surface in the axial direction. The third upshifting facilitation tooth is adjacent to the second upshifting facilitation tooth at an upstream side of the second upshifting facilitation tooth with respect to the driving rotational direction of the rear sprocket without another tooth between the second upshifting facilitation tooth and the third upshifting facilitation tooth in the circumferential direction. The upshifting initiation tooth is adjacent to the third upshifting facilitation tooth at an upstream side of the third upshifting facilitation tooth with respect to the driving rotational direction of the rear sprocket without another tooth between the third upshifting facilitation tooth and the upshifting initiation tooth in the circumferential direction.

With the rear sprocket according to the twenty-first aspect, the first recess, the second recess, and the third recess allow the drive chain to smoothly move toward the rear sprocket during the upshifting operation. The first recess, the second recess, and the third recess make it smoother to bring the upshifting initiation tooth into engagement with the drive chain during the upshifting operation. Thus, it is possible to smoothen the upshifting operation, for example, in a case where a difference between a total number of the sprocket teeth and a total number of sprocket teeth of the neighboring larger sprocket is equal to or less than two.

In accordance with a twenty-second aspect of the present invention, the rear sprocket assembly according to the twenty-first aspect is configured so that a total sprocket-tooth number of the plurality of sprocket teeth is equal to or smaller than 10.

With the rear sprocket according to the twenty-second aspect, it is possible to smoothen the upshifting operation between two adjacent sprockets each of which has a relatively small diameter.

In accordance with a twenty-third aspect of the present invention, the rear sprocket assembly according to the twenty-second aspect is configured so that a total sprocket-tooth number of the plurality of sprocket teeth is nine.

With the rear sprocket according to the twenty-third aspect, it is possible to smoothen the upshifting operation between two adjacent sprockets each of which has a relatively small diameter.

In accordance with a twenty-fourth aspect of the present invention, the rear sprocket assembly according to any one of the twenty-first to twenty-third aspects is configured so that the first upshifting facilitation tooth has a first tooth crest, a first driving surface and a first non-driving surface opposite to the first driving surface in the circumferential direction. The first recess reaches each of the first tooth crest, the first driving surface and the first non-driving surface.

With the rear sprocket according to the twenty-fourth aspect, it is possible to reliably smoothen the upshifting operation, for example, in a case where the difference between the total number of the sprocket teeth and the total number of sprocket teeth of the neighboring larger sprocket is equal to or less than two.

In accordance with a twenty-fifth aspect of the present invention, the rear sprocket assembly according to any one of the twenty-first to twenty-fourth aspects is configured so that the second upshifting facilitation tooth has a second tooth crest, a second driving surface and a second non-driving surface opposite to the second driving surface in the circumferential direction. The second recess reaches each of the second tooth crest, the second driving surface and the second non-driving surface.

With the rear sprocket according to the twenty-fifth aspect, it is possible to reliably smoothen the upshifting operation, for example, in a case where the difference between the total number of the sprocket teeth and the total number of sprocket teeth of the neighboring larger sprocket is equal to or less than two.

In accordance with a twenty-sixth aspect of the present invention, the rear sprocket assembly according to any one of the twenty-first to twenty-fifth aspects is configured so that the third upshifting facilitation tooth has a third tooth crest, a third driving surface and a third non-driving surface opposite to the third driving surface in the circumferential direction. The third recess reaches each of the third tooth crest and the third non-driving surface and does not reach the third driving surface.

With the rear sprocket according to the twenty-sixth aspect, it is possible to smoothen the upshifting operation while providing the third upshifting facilitation tooth with necessary and sufficient strength, for example, in a case where the difference between the total number of the sprocket teeth and the total number of sprocket teeth of the neighboring larger sprocket is equal to or less than two.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
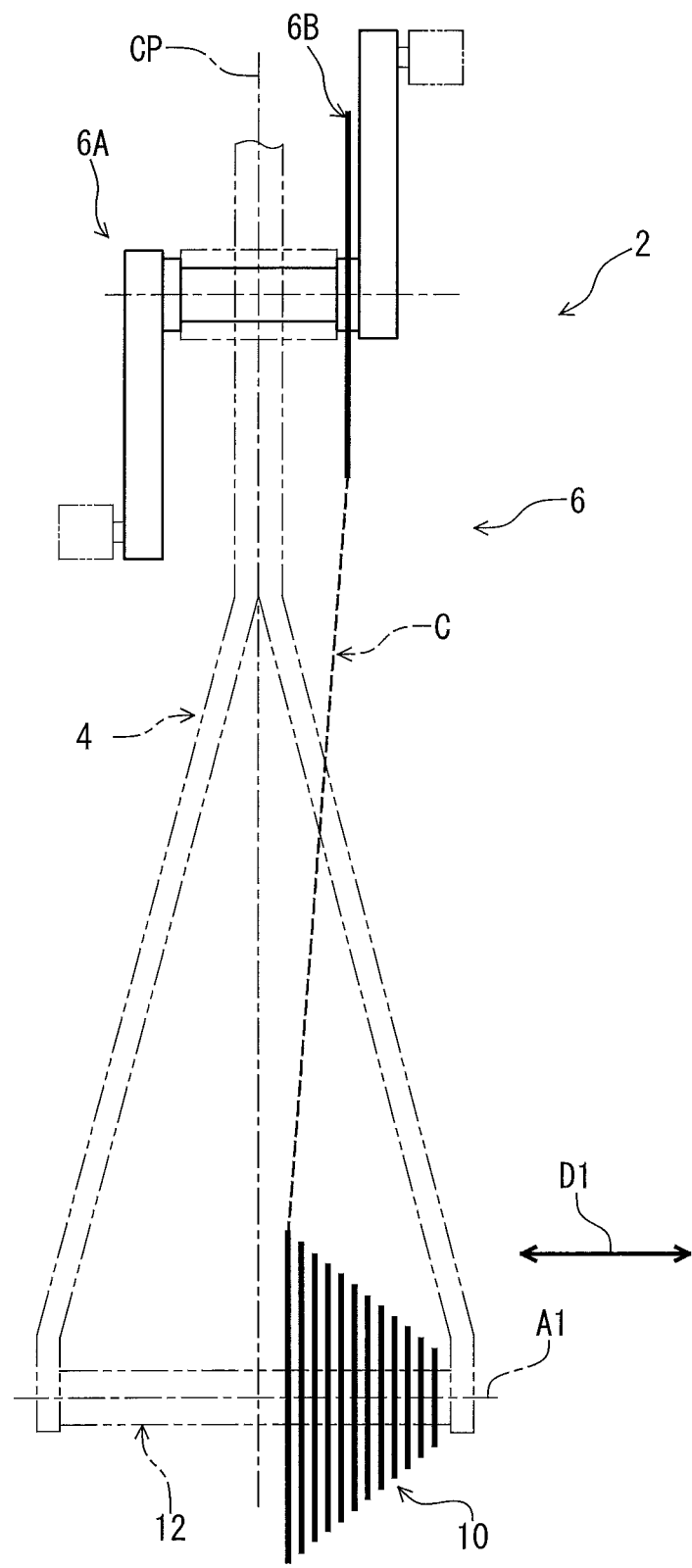
FIG. 1 is a schematic diagram of a human-powered vehicle including a rear sprocket assembly including a rear sprocket in accordance with an embodiment.

The embodiments will now be described with reference to the accompanying drawings, wherein like reference numerals designate corresponding or identical elements throughout the various drawings.

As seen in FIG. 1, a human-powered vehicle 2 includes a vehicle body 4 and a drive train 6. The drive train 6 includes a rear sprocket assembly 10 and a rear hub assembly 12. The rear hub assembly 12 is secured to the vehicle body 4. The rear sprocket assembly 10 is configured to be mounted to the rear hub assembly 12 for the human-powered vehicle 2. The rear sprocket assembly 10 has a rotational center axis A1 to define an axial direction D1, a radial direction and a circumferential direction D2 (see e.g., FIG. 4). The rear sprocket assembly 10 is rotatably supported by the rear hub assembly 12 relative to the vehicle body 4 about the rotational center axis A1. The human-powered vehicle 2 has an axial center plane CP. The axial center plane CP is defined in a transverse center position of the vehicle body 4 of the human-powered vehicle 2. The axial center plane CP is perpendicular to the rotational center axis A1.

The drive train 6 includes a crank assembly 6A, a front sprocket 6B, and a drive chain C. The crank assembly 6A is rotatably mounted to the vehicle body 4. The front sprocket 6B is secured to crank assembly 6A. The drive chain C is engaged with the front sprocket 6B and the rear sprocket assembly 10 to transmit pedaling force from the front sprocket 6B to the rear sprocket assembly 10. The front sprocket 6B includes a single sprocket wheel in the present embodiment. However, the front sprocket 6B can include a plurality of sprocket wheels.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or a seat) in the human-powered vehicle 2 with facing a handlebar or steering. Accordingly, these terms, as utilized to describe the rear sprocket assembly 10, the rear hub assembly 12, or other components, should be interpreted relative to the human-powered vehicle 2 equipped with the rear sprocket assembly 10, the rear hub assembly 12, or other components as used in an upright riding position on a horizontal surface.

In the present application, a human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

Figure 2:
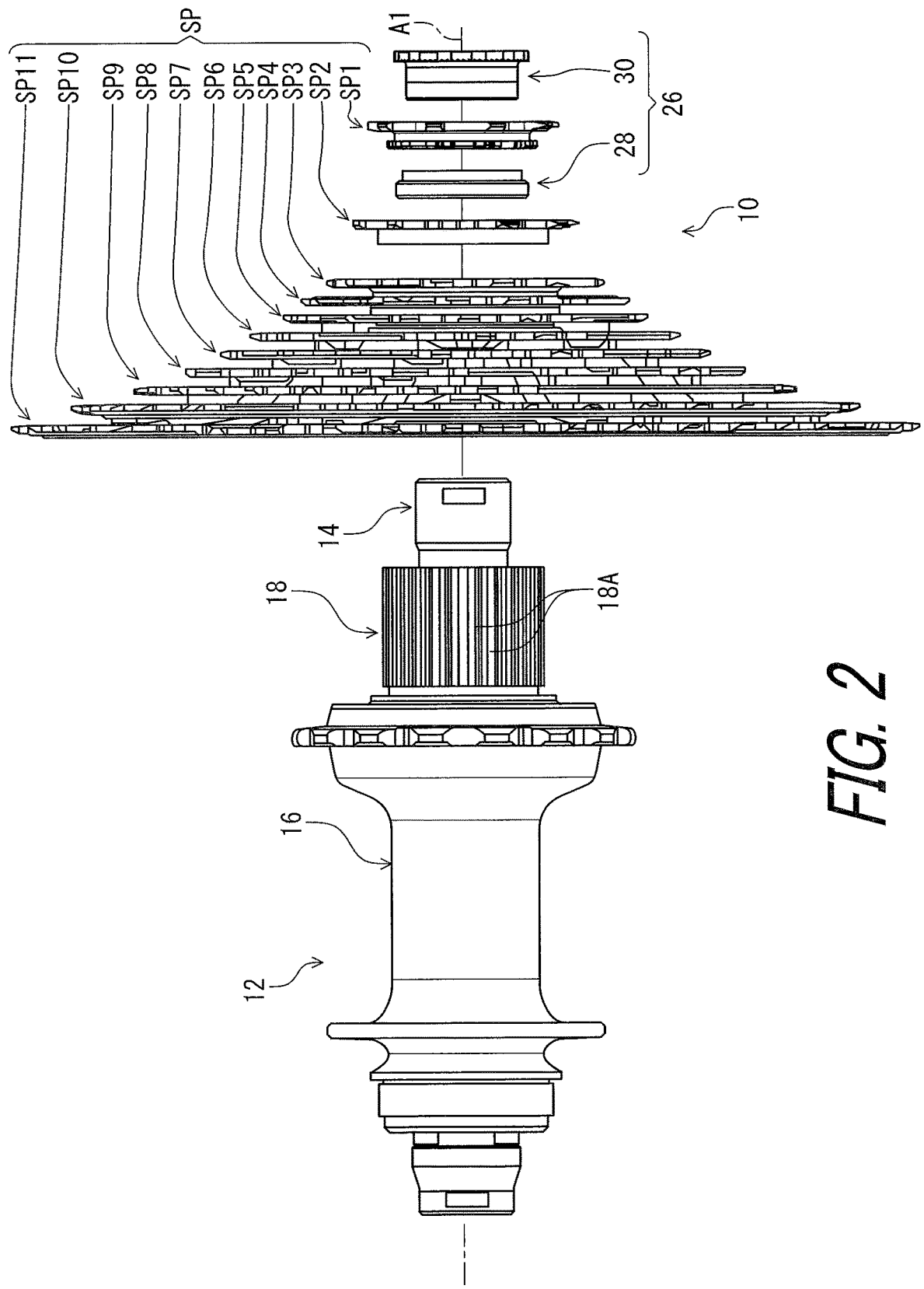
FIG. 2 is an exploded rear view of the rear sprocket assembly and a rear hub assembly of the human-powered vehicle illustrated in FIG. 1.

As seen in FIG. 2, the rear sprocket assembly 10 includes a plurality of rear sprockets SP. The plurality of rear sprockets SP is configured to engage with the drive chain C. The plurality of rear sprockets SP includes rear sprockets SP1 to SP11. The rear sprockets SP1 to SP11 can also be referred to as first to eleventh sprockets SP1 to SP11, respectively. The total number of the plurality of rear sprockets SP is not limited to eleven.

The rear hub assembly 12 includes a hub axle 14, a hub body 16, and a sprocket support body 18. The hub axle 14 is configured to be secured to the vehicle body 4 (see e.g., FIG. 1) of the human-powered vehicle 2. The hub body 16 is rotatably mounted on the hub axle 14 about the rotational center axis A1. The sprocket support body 18 is rotatably mounted on the hub axle 14 about the rotational center axis A1.

The rear sprocket assembly 10 is configured to be mounted to the sprocket support body 18. The sprocket support body 18 includes a plurality of external spline teeth 18A. The rear sprocket assembly 10 is configured to engage with the plurality of external spline teeth 18A of the sprocket support body 18.

Figure 3:
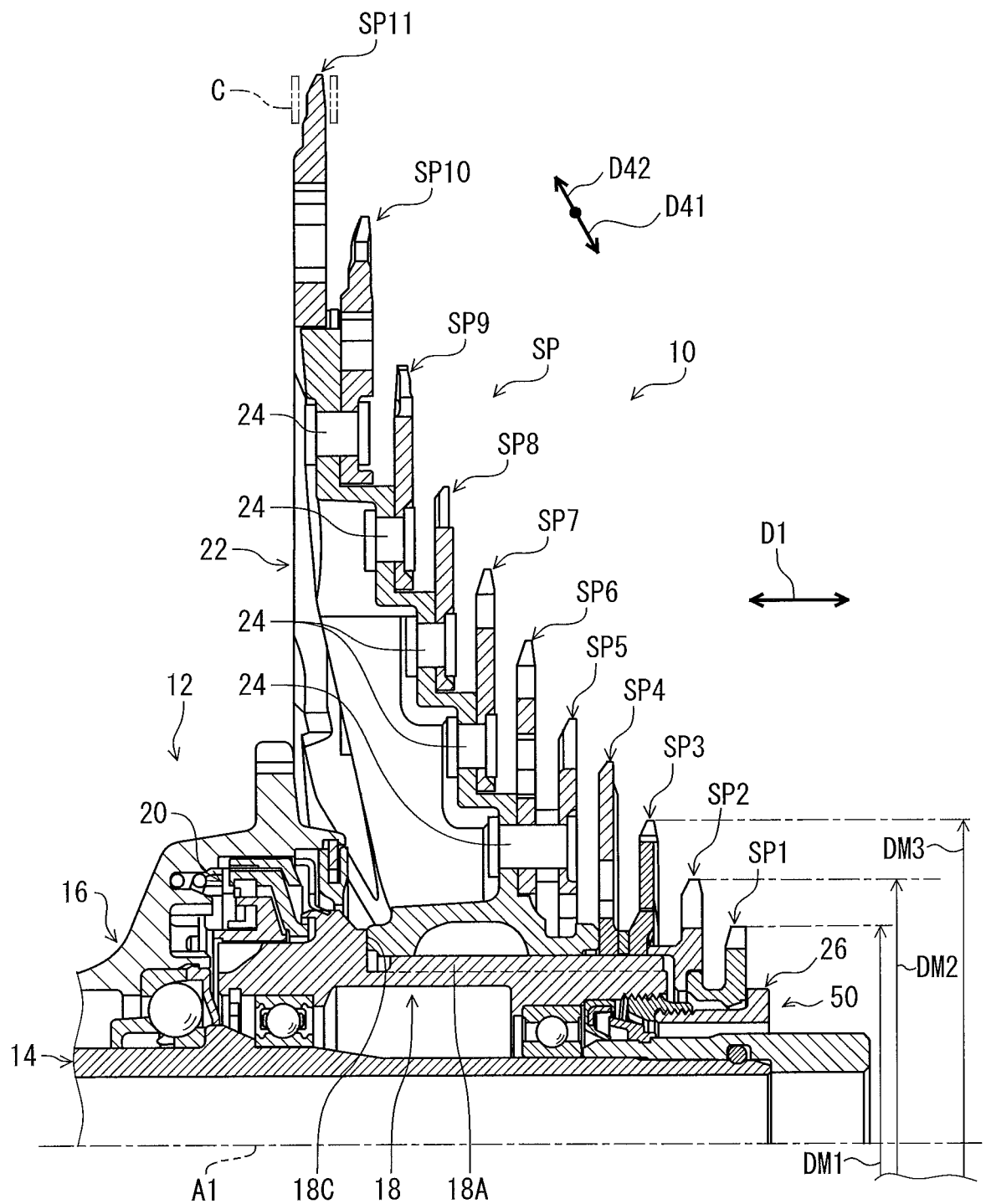
FIG. 3 is a cross-sectional view of the rear sprocket assembly and the rear hub assembly illustrated in FIG. 2.

As seen in FIG. 3, the rear hub assembly 12 includes a ratchet structure 20. The ratchet structure 20 is configured to allow the sprocket support body 18 to rotate relative to the hub body 16 about the rotational center axis A1 in only one rotational direction. The ratchet structure 20 is configured to restrict the sprocket support body 18 from rotating relative to the hub body 16 about the rotational center axis A1 in the other rotational direction.

For example, upshifting occurs the drive chain C is shifted from a sprocket to a neighboring larger sprocket in an upshifting direction D41. Downshifting occurs the drive chain C is shifted from a sprocket to a neighboring smaller sprocket in a downshifting direction D42.

The rear sprocket SP1 is configured to be mounted to the rear hub assembly 12 for the human-powered vehicle 2. The second sprocket SP2 is configured to be mounted to the rear hub assembly 12 for the human-powered vehicle 2. The second sprocket SP2 is adjacent to the rear sprocket SP1 without another sprocket between the rear sprockets SP1 and SP2. The second sprocket SP2 can also be referred to as a neighboring sprocket SP2 or a neighboring larger sprocket SP2.

The rear sprocket SP1 has a first sprocket outer diameter DM1. The second sprocket SP2 has a second sprocket outer diameter DM2 larger than the first sprocket outer diameter DM1. The second sprocket SP2 is adjacent to the rear sprocket SP1 without another sprocket between the rear sprocket SP1 and the second sprocket SP2 in the axial direction D1 with respect to the rotational center axis A1. The first sprocket outer diameter DM1 is the smallest among outer diameters of the first to eleventh sprockets SP1 to SP11 in the present embodiment. Thus, the rear sprocket SP1 is a smallest sprocket in the rear sprocket assembly 10. The rear sprocket SP1 can also be referred to as a top-gear sprocket SP1.

The third sprocket SP3 has a third sprocket outer diameter DM3 which is larger than the second sprocket outer diameter DM2. The third sprocket SP3 is adjacent to the second sprocket SP2 without another sprocket between the second sprocket SP2 and the third sprocket SP3 in the axial direction D1.

The rear sprocket assembly 10 includes a sprocket carrier 22. The rear sprockets SP5 to SP11 are mounted on the sprocket carrier 22. The rear sprockets SP5 to SP11 are secured to the sprocket carrier 22 with fasteners 24 such as rivets in the present embodiment. However, a total number of sprockets secured to the sprocket carrier 22 is not limited to the embodiment illustrated in FIG. 3. The sprocket carrier 22 is configured to be in contact with a positioning surface 18C of the sprocket support body 18. However, the structure of the sprocket carrier 22 is not limited to the structure illustrated in FIG. 3. The sprocket carrier 22 can be omitted from the rear sprocket assembly 10 if needed and/or desired. In such embodiments, all of the sprockets directly engage with the sprocket support body 18.

Figure 4:
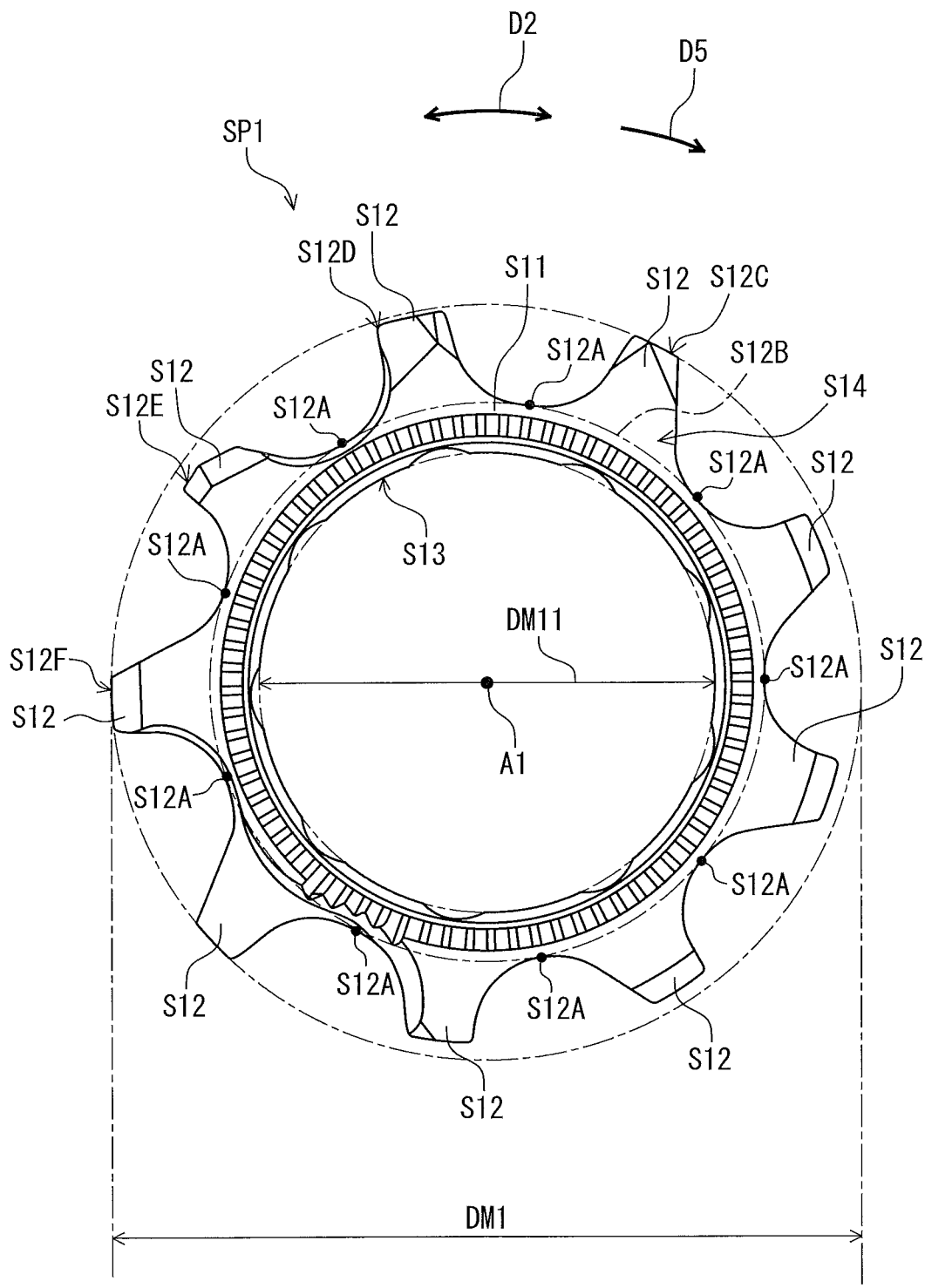
FIG. 4 is a side elevational view of the rear sprocket of the rear sprocket assembly illustrated in FIG. 2.

As seen in FIG. 4, the rear sprocket SP1 has the rotational center axis A1 to define the axial direction D1, the radial direction and the circumferential direction D2. The rear sprocket SP1 comprises a sprocket body S11 and a plurality of sprocket teeth S12. The sprocket body S11 has a sprocket opening S13. The sprocket opening S13 has a minimum diameter DM11. The plurality of sprocket teeth S12 extends radially outwardly from the sprocket body S11 in the radial direction. The plurality of first sprocket teeth S12 defines the first sprocket outer diameter DM1. The sprocket body S11 can also be referred to as a first sprocket body S11. The sprocket tooth S12 can also be referred to as a first sprocket tooth S12. The sprocket opening S13 can also be referred to as a first sprocket opening S13. The minimum diameter DM11 can also be referred to as a first minimum diameter DM11.

The plurality of sprocket teeth S12 has a total sprocket-tooth number which is a total number of the sprocket teeth S12. The total sprocket-tooth number of the plurality of sprocket teeth S12 is equal to or smaller than 10. In the present embodiment, the total sprocket-tooth number of the plurality of sprocket teeth S12 is nine. However, the total sprocket-tooth number of the plurality of sprocket teeth S12 is not limited to the above total number and the above range.

Figure 5:
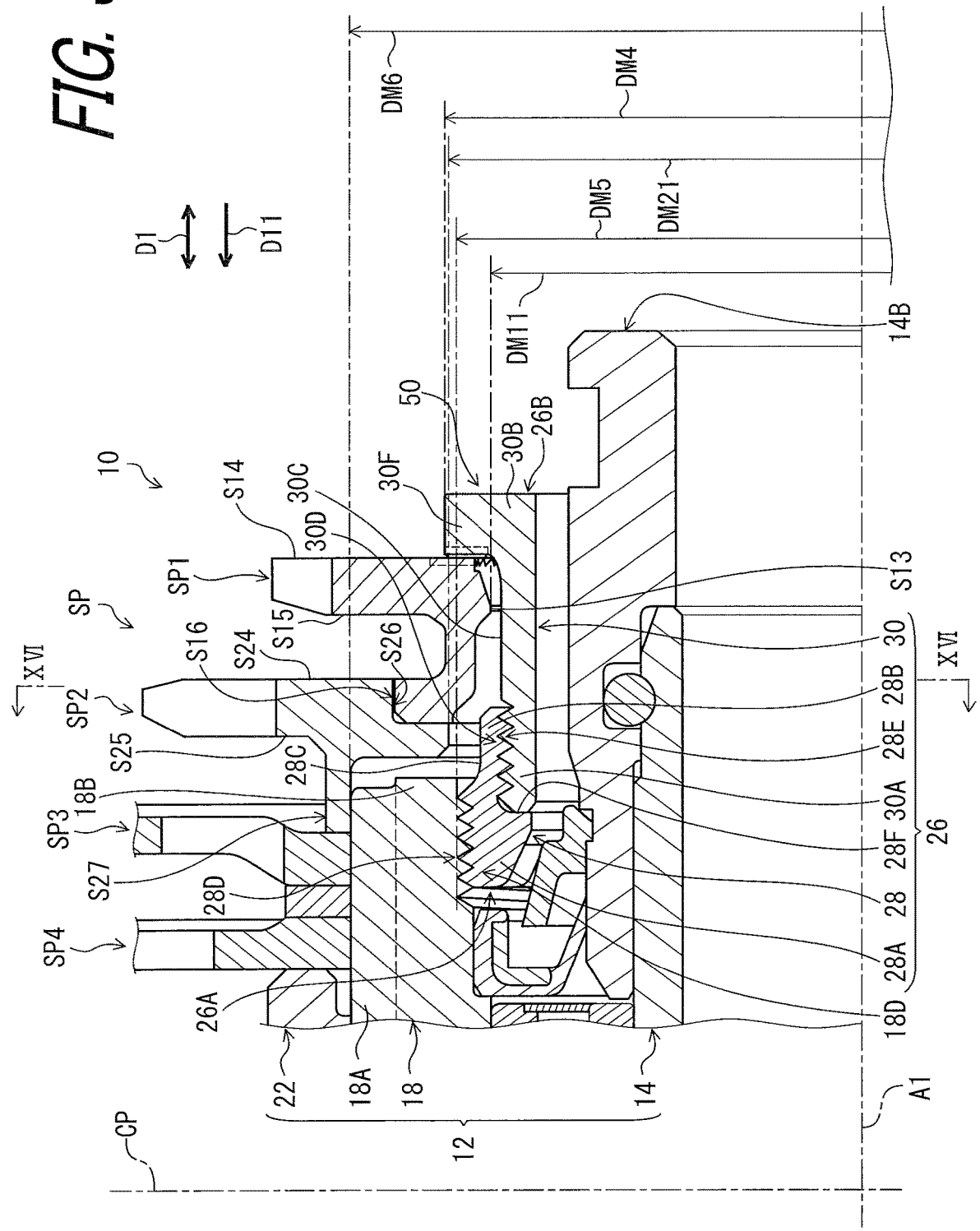
FIG. 5 is a partial cross-sectional view of the rear sprocket assembly and the rear hub assembly illustrated in FIG. 2.

As seen in FIG. 5, the sprocket opening S13 is configured to receive the hub axle 14 of the rear hub assembly 12 in a hub mounting state where the rear sprocket SP1 is mounted to the rear hub assembly 12. The minimum diameter DM11 is smaller than an outermost diameter DM6 of the sprocket support body 18 of the rear hub assembly 12.

The rear sprocket SP1 has an axially outwardly facing surface S14 and an axially inwardly facing surface S15. The axially inwardly facing surface S15 is provided on a reverse side of the axially outwardly facing surface S14 in the axial direction D1. The axially inwardly facing surface S15 is configured to face toward the axial center plane CP of the human-powered vehicle 2 in the axial direction D1 in a vehicle mounting state where the rear sprocket SP1 is mounted to the human-powered vehicle 2. The axially outwardly facing surface S14 can also be referred to as a first axially outwardly facing surface S14. The axially inwardly facing surface S15 can also be referred to as a first axially inwardly facing surface S15.

Figure 6:
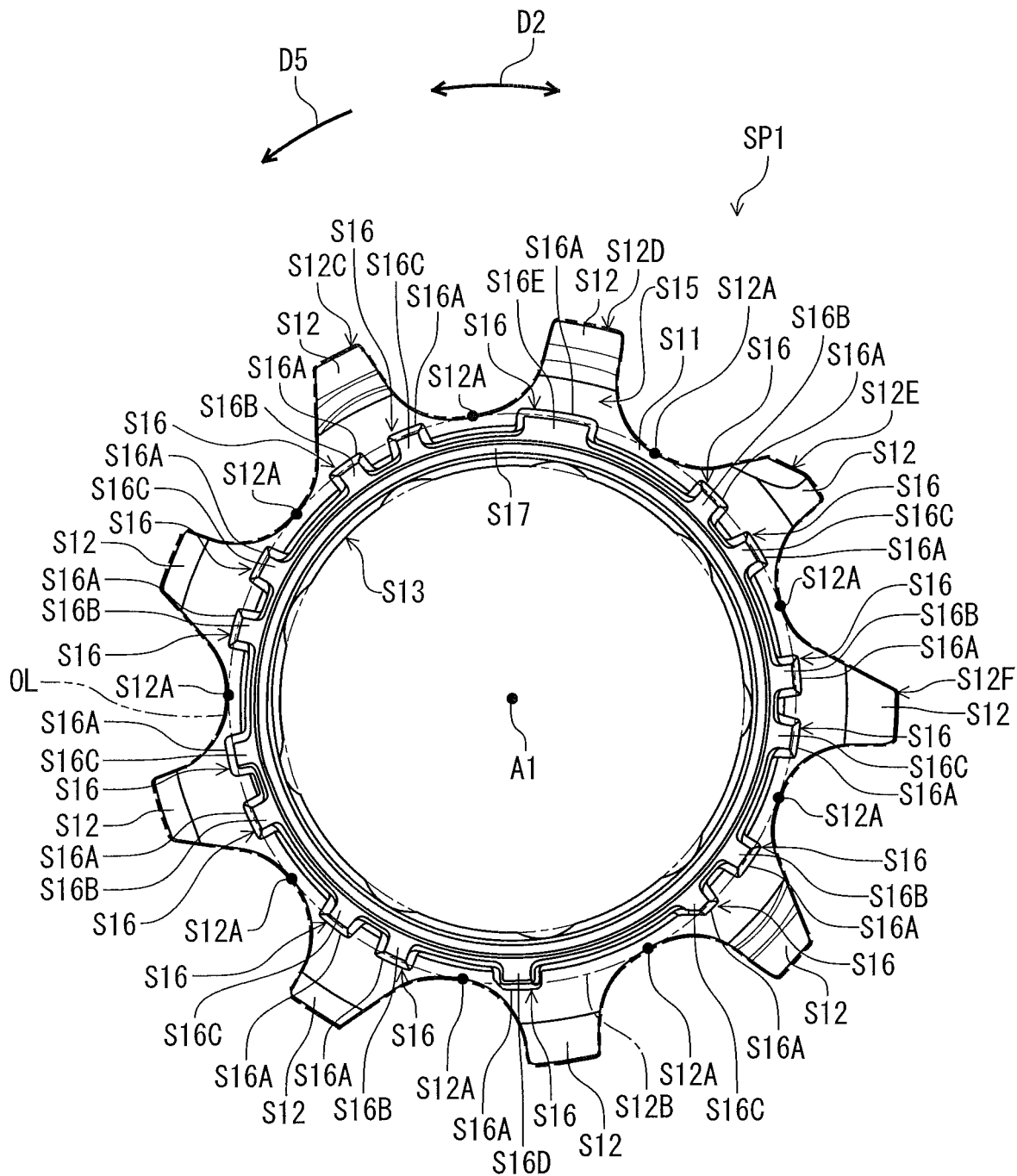
FIG. 6 is another side elevational view of the rear sprocket of the rear sprocket assembly illustrated in FIG. 2.

As seen in FIG. 6, the plurality of sprocket teeth S12 defines a plurality of tooth bottom center points S12A spaced apart from each other in the circumferential direction D2. Each of the plurality of sprocket teeth S12 has a tooth outline OL extending from corresponding one of the plurality of tooth bottom center points S12A to a neighboring tooth bottom center point among the plurality of tooth bottom center points S12A in the circumferential direction D2. The plurality of tooth bottom center points S12A defines a root circle S12B. The tooth outline OL is indicated with a thick chain double-dashed line in FIG. 6.

The rear sprocket SP1 comprises a plurality of spline teeth S16. The plurality of spline teeth S16 is configured to transmit driving torque to the neighboring sprocket SP2 (see e.g., FIG. 5) adjacent to the rear sprocket SP1 without another sprocket between the rear sprocket SP1 and the neighboring sprocket SP2 in the axial direction D1.

The plurality of spline teeth S16 has a total spline-tooth number which is a total number of the spline teeth S16. The total spline-tooth number of the plurality of spline teeth S16 ranges from 15 to 18. In the present embodiment, the total spline-tooth number of the plurality of spline teeth S16 is 16. However, the total spline-tooth number of the plurality of spline teeth S16 is not limited to the above total number and the above range.

The rear sprocket SP1 further comprises an annular base S17 from which the plurality of spline teeth S16 extends radially outwardly in the radial direction. The annular base S17 is disposed so as to surround the sprocket opening S13 as viewed in the axial direction D1.

As seen in FIG. 6, at least two spline teeth of the plurality of spline teeth S16 are disposed so as to overlap with one of the plurality of sprocket teeth S12 as viewed in the axial direction D1. The plurality of spline teeth S16 is disposed so as to be offset from the plurality of tooth bottom center points S12A in the circumferential direction D2.

The plurality of spline teeth S16 includes at least one first spline tooth S16B and at least one second spline tooth S16C. The plurality of spline teeth S16 includes at least two first spline teeth S16B and at least two second spline teeth S16C. The plurality of spline teeth S16 includes at least two pairs of the first spline tooth S16B and the second spline tooth S16C. In the present embodiment, a total number of the at least two pairs of the first spline tooth S16B and the second spline tooth S16C is seven. However, the total number of the at least two pairs of the first spline tooth S16B and the second spline tooth S16C is not limited to seven.

In the pair of the first spline tooth S16B and the second spline tooth S16C, the second spline tooth S16C is adjacent to the first spline tooth S16B in the circumferential direction D2 without another spline tooth between the first spline tooth S16B and the second spline tooth S16C in the circumferential direction D2. The first spline tooth S16B and the second spline tooth S16C are disposed so as to overlap with one of the plurality of sprocket teeth S12 as viewed in the axial direction D1. Three or more spline teeth of the spline teeth S16 can be disposed so as to overlap with one of the plurality of sprocket teeth S12 as viewed in the axial direction D1 if needed and/or desired.

The plurality of spline teeth S16 includes at least one positioning spline tooth S16D and/or S16E. The at least one positioning spline tooth S16D and/or S16E is different from the other spline teeth of the plurality of spline teeth S16 in at least one of size and shape. In the present embodiment, the plurality of spline teeth S16 includes positioning spline teeth S16D and S16E. However, the plurality of spline teeth S16 can include at least one positioning spline tooth if needed and/or desired.

The positioning spline tooth S16D is provided between one of the at least two pairs of the first spline tooth S16B and the second spline tooth S16C and another of the at least two pairs of the first spline tooth S16B and the second spline tooth S16C in the circumferential direction D2. The positioning spline tooth S16E is provided between one of the at least two pairs of the first spline tooth S16B and the second spline tooth S16C and another of the at least two pairs of the first spline tooth S16B and the second spline tooth S16C in the circumferential direction D2. The positioning spline tooth S16D is disposed so as to overlap with one of the plurality of sprocket teeth S12 as viewed in the axial direction D1. The positioning spline tooth S16E is disposed so as to overlap with one of the plurality of sprocket teeth S12 as viewed in the axial direction D1.

Figure 7:
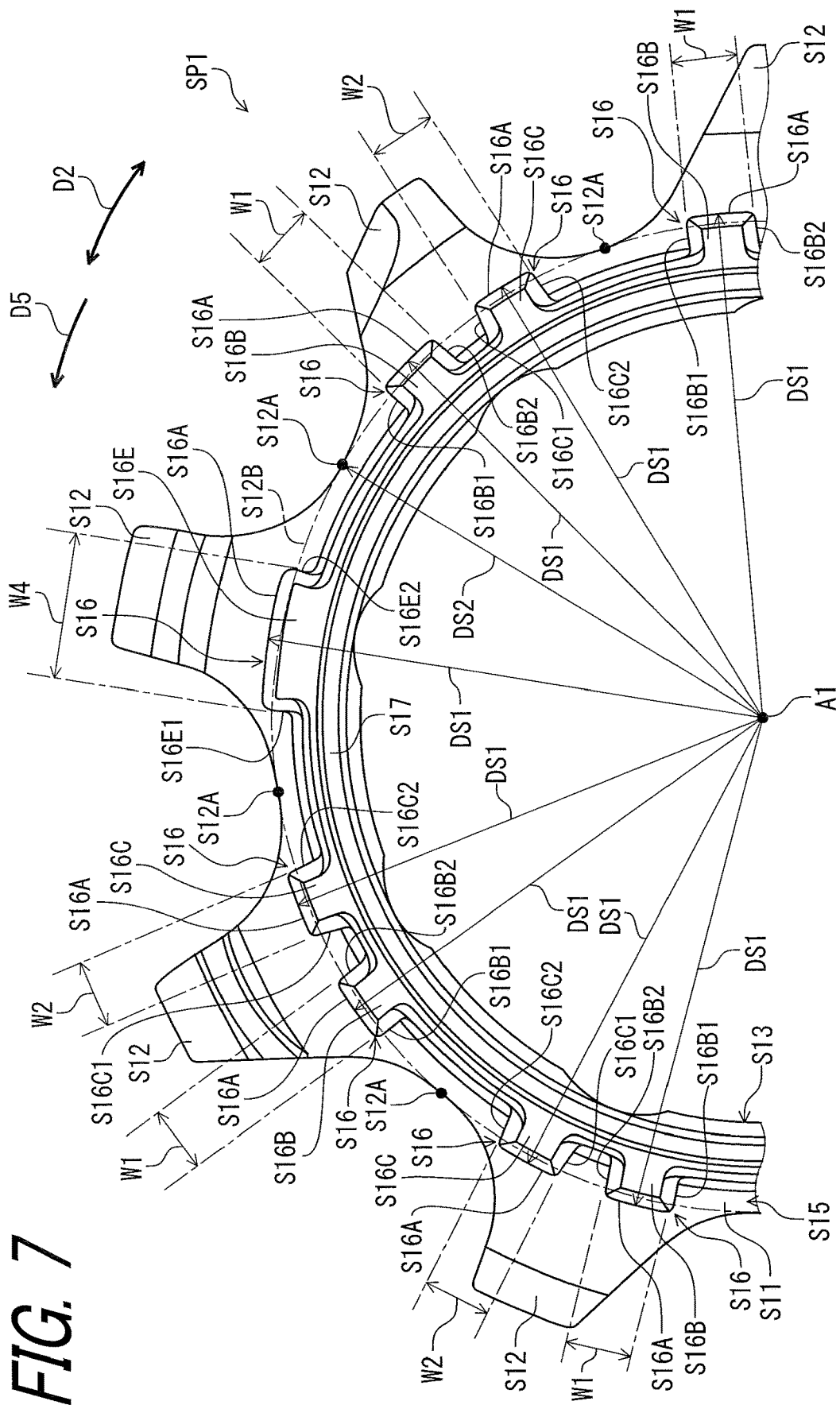
FIG. 7 is a partial enlarged side elevational view of the rear sprocket illustrated in FIG. 6.
Figure 8:
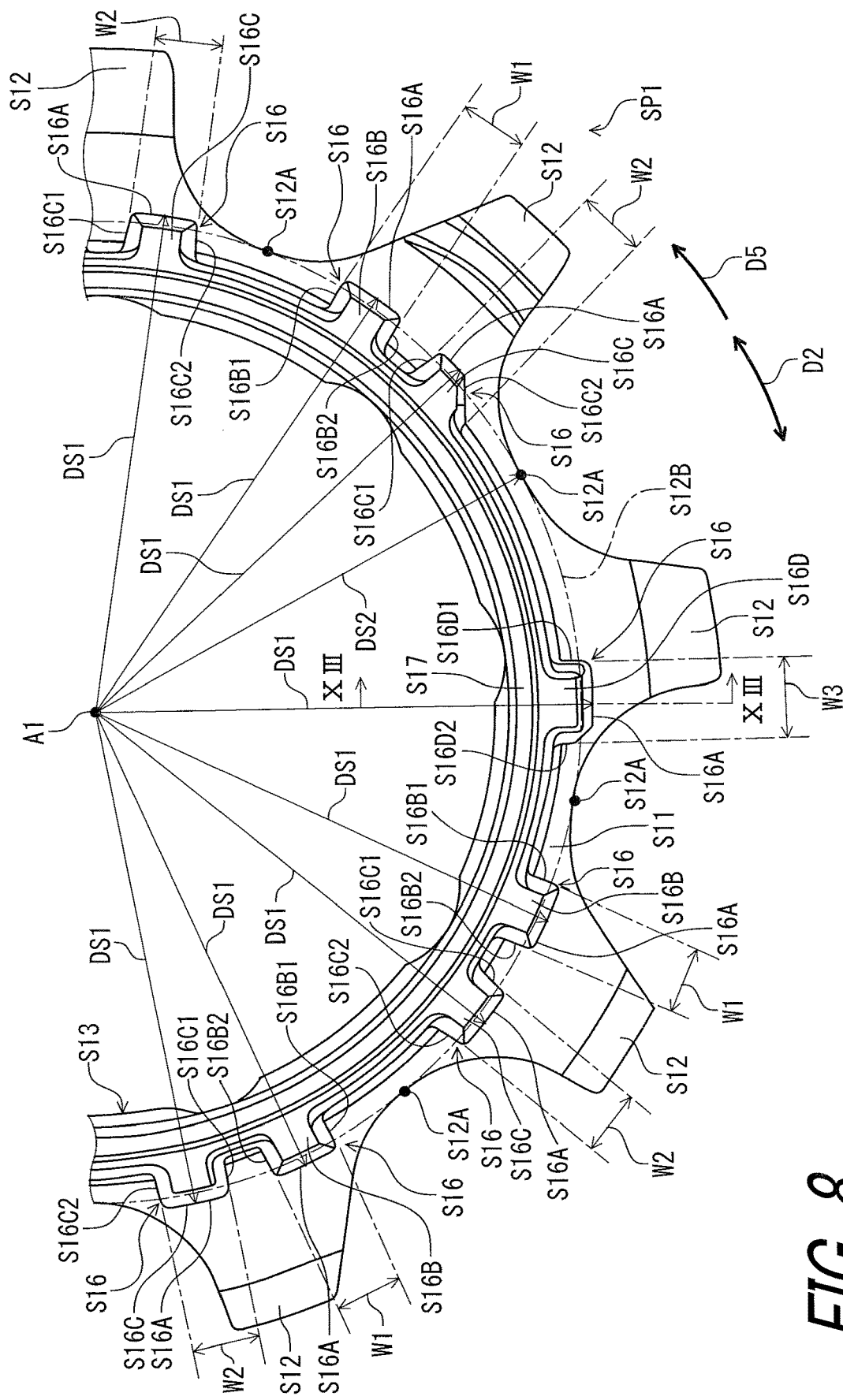
FIG. 8 is a partial enlarged side elevational view of the rear sprocket illustrated in FIG. 6.

As seen in FIGS. 7 and 8, the first spline tooth S16B has a circumferential spline width W1 defined in the circumferential direction D2. The second spline tooth S16C has a circumferential spline width W2 defined in the circumferential direction D2. The at least one positioning spline tooth S16D and/or S16E has a circumferential positioning-spline width W3 and/or W4. The positioning spline tooth S16D has a circumferential positioning-spline width W3. The positioning spline tooth S16E has a circumferential positioning-spline width W4.

The circumferential positioning-spline width W3 is larger than each of circumferential spline widths W1 and W2 of other spline teeth of the plurality of spline teeth S16. The circumferential positioning-spline width W4 is larger than each of circumferential spline widths W1 and W2 of other spline teeth of the plurality of spline teeth S16. The at least one positioning spline tooth S16D and/or S16E has a circumferential positioning-spline width W3 and/or W4 which is larger than each of circumferential spline widths W1 and W2 of the other spline teeth of the plurality of spline teeth S16. In the present embodiment, the circumferential spline widths W1 and W2 are equal to each other. The circumferential positioning-spline width W4 is different from the circumferential positioning-spline width W3. The circumferential positioning-spline width W4 is larger than the circumferential positioning-spline width W3. However, each of the circumferential positioning-spline widths W3 and W4 can be equal to or smaller than at least one of the circumferential spline widths W1 and W2 if needed and/or desired. The circumferential positioning-spline width W4 can be equal to or smaller than the circumferential positioning-spline width W3 if needed and/or desired. The circumferential spline width W2 can be different from the circumferential spline width W1 if needed and/or desired.

The circumferential spline widths W1 and W2 range from 1.5 mm to 3.0 mm. The circumferential positioning-spline width W3 ranges 1.5 mm to 3.0 mm. The circumferential positioning-spline width W4 ranges 3.0 mm to 6.0 mm. In the present embodiment, the circumferential spline widths W1 and W2 are equal to 2.03 mm. The circumferential positioning-spline width W3 is equal to 2.42 mm. The circumferential positioning-spline width W4 is equal to 4.12 mm. However, the circumferential spline widths W1 and W2 are not limited to the above size and range. The circumferential positioning-spline width W3 is not limited to the above size and range. The circumferential positioning-spline width W4 is not limited to the above size and range.

A sum of the circumferential spline widths W1 and W2 and the circumferential positioning-spline widths W3 and W4 of the spline teeth S16B, S16C, S16D and S16E is larger than or equal to 11.0 mm in order to achieve sufficient strength of the plurality of spline teeth S16. The sum of the circumferential spline widths W1 and W2 and the circumferential positioning-spline widths W3 and W4 of the spline teeth S16B, S16C, S16D and S16E is smaller than or equal to 15.0 mm in order to increase the total number of the spline teeth 16. Thus, the sum of the circumferential spline widths W1 and W2 and the circumferential positioning-spline widths W3 and W4 of the spline teeth S16B, S16C, S16D and S16E can range from 11.0 mm to 15.0 mm in order to achieve sufficient strength of the plurality of spline teeth S16 and to increase the total number of the spline teeth 16. In the present embodiment, the sum of the circumferential spline widths W1 and W2 and the circumferential positioning-spline widths W3 and W4 of the spline teeth S16B, S16C, S16D and S16E is 13.92 min. However, the sum of the circumferential spline widths W1 and W2 and the circumferential positioning-spline widths W3 and W4 of the spline teeth S16B, S16C, S16D and S16E is not limited to the above size and range.

As seen in FIGS. 7 and 8, at least one of the first spline teeth S16B has a circumferentially symmetrical shape with respect to the rotational center axis A1. Another of the first spline teeth S16B can have a circumferentially asymmetrical shape with respect to the rotational center axis A1. At least one of the second spline teeth S16C has a circumferentially symmetrical shape with respect to the rotational center axis A1. Another of the second spline teeth S16C can have a circumferentially symmetrical shape with respect to the rotational center axis A1. The positioning spline tooth S16D has a circumferentially asymmetrical shape with respect to the rotational center axis A1. The positioning spline tooth S16E has a circumferentially symmetrical shape with respect to the rotational center axis A1.

In the present embodiment, each of the first spline teeth S16B has a circumferentially symmetrical shape with respect to the rotational center axis A1. Six of the second spline teeth S16C has a circumferentially symmetrical shape with respect to the rotational center axis A1. One of the second spline teeth S16C has a circumferentially asymmetrical shape with respect to the rotational center axis A1. However, at least one of the first spline teeth S16B can have a circumferentially asymmetrical shape with respect to the rotational center axis A1 if needed and/or desired. At least two of the second spline teeth S16C can have a circumferentially asymmetrical shape with respect to the rotational center axis A1 if needed and/or desired. The positioning spline tooth S16D can have a circumferentially symmetrical shape with respect to the rotational center axis A1 if needed and/or desired. The positioning spline tooth S16E can have a circumferentially asymmetrical shape with respect to the rotational center axis A1 if needed and/or desired.

As seen in FIGS. 7 and 8, the first spline tooth S16B having a circumferential symmetrical shape can also be referred to as a circumferentially symmetrical tooth S16B. The second spline tooth S16C having a circumferential symmetrical shape can also be referred to as a circumferentially symmetrical tooth S16C. The second spline tooth S16C having a circumferential asymmetrical shape can also be referred to as a circumferentially asymmetrical tooth S16C. The positioning spline tooth S16D having a circumferential asymmetrical shape can also be referred to as a circumferentially asymmetrical tooth S16D. The positioning spline tooth S16E having a circumferential symmetrical shape can also be referred to as a circumferentially symmetrical tooth S16E.

Namely, the plurality of spline teeth S16 includes at least one circumferentially symmetrical tooth S16B, S16C, S16D, and/or S16E with respect to the rotational center axis A1. The plurality of spline teeth S16 includes a plurality of circumferentially symmetrical teeth S16B, S16C, and S16E with respect to the rotational center axis A1. The plurality of spline teeth S16 includes at least one circumferentially asymmetrical tooth S16B, S16C, S16D, and/or S16E with respect to the rotational center axis A1. The plurality of spline teeth S16 includes a plurality of circumferentially asymmetrical teeth S16C and S16D with respect to the rotational center axis A1.

As seen in FIGS. 7 and 8, each of the plurality of spline teeth S16 has a spline crest S16A. The spline crest S16A includes a radially outer end of the spline tooth S16. Thus, the spline crest S16A can also be referred to as a radially outer end S16A. Each of the first spline tooth S16B, the second spline tooth S16C, the third spline tooth S16C, and the positioning spline tooth S16E includes the spline crest S16A.

A maximum spline distance DS1 is defined from the rotational center axis A1 to the spline crest S16A. A radial tooth-bottom distance DS2 is defined from the rotational center axis A1 to one of the plurality of tooth bottom center points S12A. The radial tooth-bottom distance DS2 corresponds to a radius of the root circle S12B of the rear sprocket SP1.

The maximum spline distance DS1 is larger than the radial tooth-bottom distance DS2. The spline crest S16A of each of the plurality of spline teeth S16 is positioned radially inwardly from the tooth outline OL of each of the plurality of sprocket teeth S12 in the radial direction. The spline crest S16A of each of the plurality of spline teeth S16 is positioned radially outwardly from the root circle S12B of the rear sprocket SP1.

In the present embodiment, the maximum spline distance DS1 of the first spline tooth S16B, the maximum spline distance DS1 of the second spline tooth S16C, the maximum spline distance DS1 of the positioning spline tooth S16D, and the maximum spline distance DS1 of the positioning spline tooth S16E are equal to each other. However, at least one of the maximum spline distance DS1 of the first spline tooth S16B, the maximum spline distance DS1 of the second spline tooth S16C, the maximum spline distance DS1 of the positioning spline tooth S16D, and the maximum spline distance DS1 of the positioning spline tooth S16E can be different from another of the maximum spline distance DS1 of the first spline tooth S16B, the maximum spline distance DS1 of the second spline tooth S16C, the maximum spline distance DS1 of the positioning spline tooth S16D, and the maximum spline distance DS1 of the positioning spline tooth S16E if needed and/or desired.

As seen in FIG. 7, the first spline tooth S16B includes a driving spline surface S16B1 and a non-driving spline surface S16B2. The driving spline surface S16B1 faces in the driving rotational direction D5. The driving spline surface S16B1 is configured to transmit the driving torque from the rear sprocket SP1 to the neighboring sprocket SP2 during pedaling. The non-driving spline surface S16B2 is opposite to the driving spline surface S16B1 in the circumferential direction D2. The driving spline surface S16B1 can also be configured to directly transmit the driving torque from the rear sprocket SP1 to the sprocket support body 18 of the rear hub assembly 12 during pedaling.

The second spline tooth S16C includes a driving spline surface S16C1 and a non-driving spline surface S16C2. The driving spline surface S16C1 faces in the driving rotational direction D5. The driving spline surface S16C1 is configured to transmit the driving torque from the rear sprocket SP1 to the neighboring sprocket SP2 during pedaling. The non-driving spline surface S16C2 is opposite to the driving spline surface S16C1 in the circumferential direction D2. The driving spline surface S16C1 can also be configured to directly transmit the driving torque from the rear sprocket SP1 to the sprocket support body 18 of the rear hub assembly 12 during pedaling.

The positioning spline tooth S16E includes a driving spline surface S16E1 and a non-driving spline surface S16E2. The driving spline surface S16E1 faces in the driving rotational direction D5. The driving spline surface S16E1 is configured to transmit the driving torque from the rear sprocket SP1 to the neighboring sprocket SP2 during pedaling. The non-driving spline surface S16E2 is opposite to the driving spline surface S16E1 in the circumferential direction D2. The driving spline surface S16E1 can also be configured to directly transmit the driving torque from the rear sprocket SP1 to the sprocket support body 18 of the rear hub assembly 12 during pedaling.

As seen in FIG. 8, the positioning spline tooth S16D includes a driving spline surface S16D1 and a non-driving spline surface S16D2. The driving spline surface S16D1 faces in the driving rotational direction D5. The driving spline surface S16D1 is configured to transmit the driving torque from the rear sprocket SP1 to the neighboring sprocket SP2 during pedaling. The non-driving spline surface S16D2 is opposite to the driving spline surface S16D1 in the circumferential direction D2. The driving spline surface S16D1 can also be configured to directly transmit the driving torque from the rear sprocket SP1 to the sprocket support body 18 of the rear hub assembly 12 during pedaling.

Figure 9:
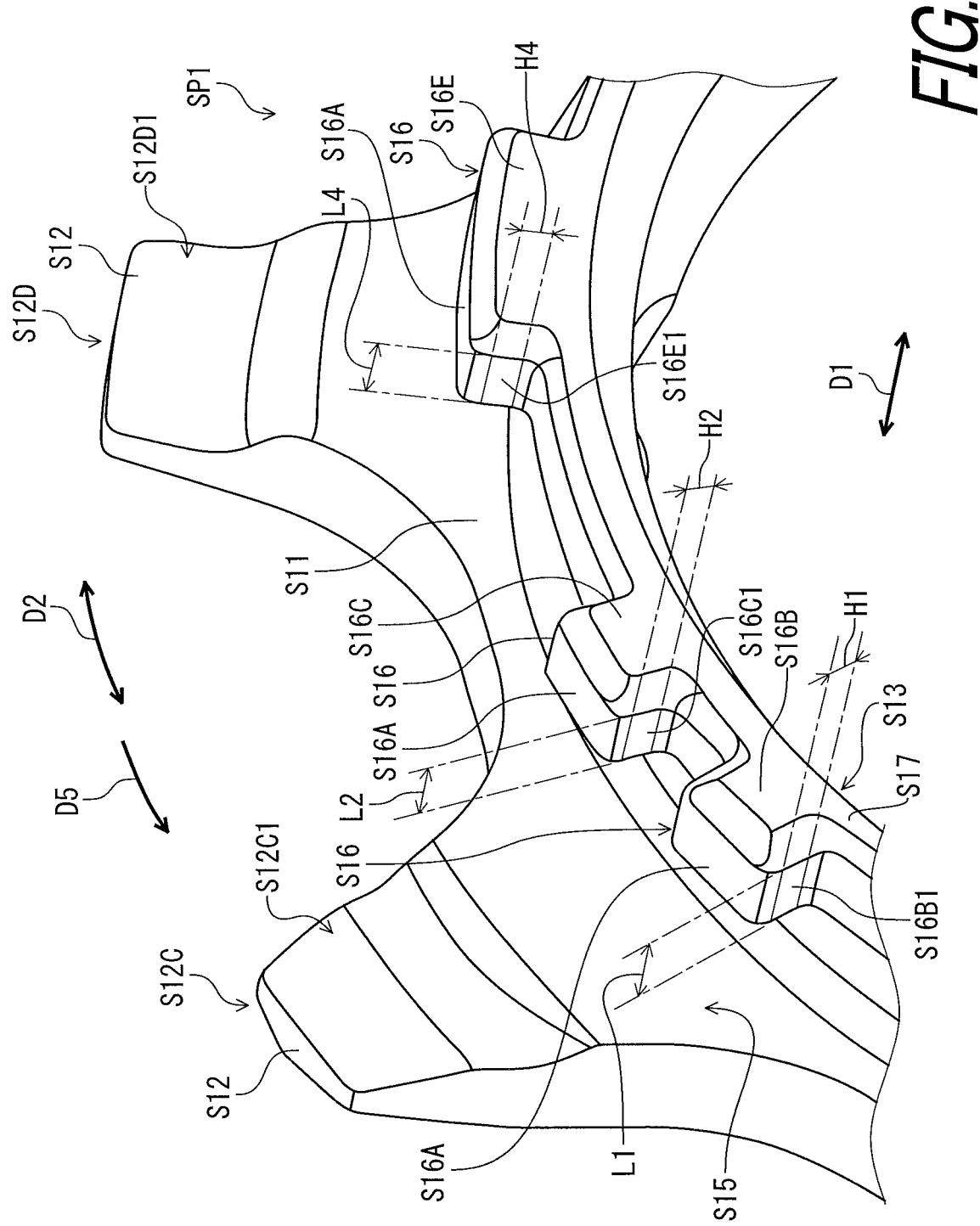
FIG. 9 is a partial perspective view of the rear sprocket illustrated in FIG. 6.

As seen in FIG. 9, the driving spline surface S16B1 of the first spline tooth S16B has an axial length L1 and a radial length H1. The axial length L1 is defined in the axial direction D1 The radial length H1 is defined in the radial direction of the rear sprocket SP1. The axial length L1 ranges from 0.7 mm to 1.1 mm. The radial length H1 ranges from 0.27 mm to 0.4 mm. In the present embodiment, the axial length L1 is equal to 0.87 mm. The radial length H1 is equal to 0.34 mm. However, the axial length L1 is not limited to the above size and range. The radial length H1 is not limited to the above size and range.

The driving spline surface S16C1 of the second spline tooth S16C has an axial length L2 and a radial length H2. The axial length L2 is defined in the axial direction D1. The radial length H2 is defined in the radial direction of the rear sprocket SP1. The axial length L2 ranges from 0.7 mm to 1.1 mm. The radial length H2 ranges from 0.27 mm to 0.4 mm. In the present embodiment, the axial length L2 is equal to 0.87 mm. The radial length H2 is equal to 0.34 mm. However, the axial length L2 is not limited to the above size and range. The radial length H2 is not limited to the above size and range.

The driving spline surface S16E1 of the positioning spline tooth S16E has an axial length L4 and a radial length H4. The axial length L4 is defined in the axial direction D1. The radial length H4 is defined in the radial direction of the rear sprocket SP1. The axial length L4 ranges from 0.7 mm to 1.1 mm. The radial length H4 ranges from 0.27 mm to 0.4 mm. In the present embodiment, the axial length L4 is equal to 0.87 mm. The radial length H4 is equal to 0.34 mm. However, the axial length L4 is not limited to the above size and range. The radial length H4 is not limited to the above size and range.

Figure 10:
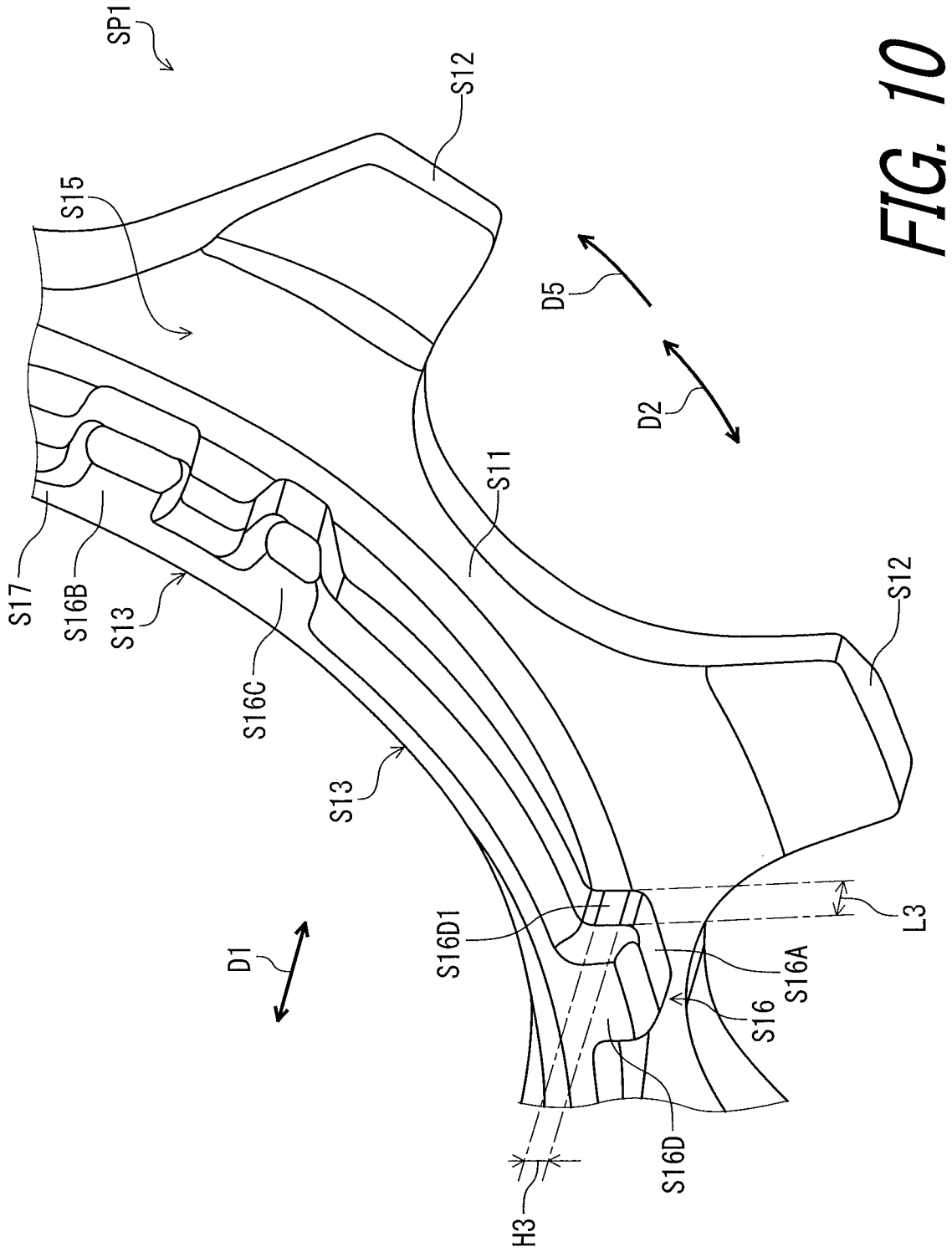
FIG. 10 is a partial perspective view of the rear sprocket illustrated in FIG. 6.

As seen in FIG. 10, the driving spline surface S16D1 of the positioning spline tooth S16D has an axial length L3 and a radial length H3. The axial length L3 is defined in the axial direction D1. The radial length 113 is defined in the radial direction of the rear sprocket SP1. The axial length L3 ranges from 0.7 mm to 1.1 mm. The radial length H3 ranges from 0.27 mm to 0.4 mm. In the present embodiment, the axial length L3 is equal to 0.87 mm. The radial length H3 is equal to 0.34 mm. However, the axial length L3 is not limited to the above size and range. The radial length H3 is not limited to the above size and range.

A sum of the axial lengths L1, L2, L3 and L4 of the driving spline surfaces S16B1, S16C1, S16D1 and S16E1 in the plurality of spline teeth S16 is larger than 11.0 mm in order to achieve sufficient strength of the plurality of spline teeth S16. The sum of the axial lengths L1, L2, L3 and L4 of the driving spline surfaces S16B1, S16C1, S16D1 and S16E1 in the plurality of spline teeth S16 is preferably larger than 13.0 mm in order to achieve sufficient strength of the plurality of spline teeth S16. The sum of the axial lengths L1, L2, L3 and L4 of the driving spline surfaces S16B1, S16C1, S16D1 and S16E1 in the plurality of spline teeth S16 can range from 11.0 mm to 16.0 mm in order to achieve sufficient strength of the plurality of spline teeth S16 and to save axial space of the plurality of spline teeth S16. In the present embodiment, the sum of the axial lengths LE L2, L3 and L4 of the driving spline surfaces S16B1, S16C1, S16D1 and S16E1 in the plurality of spline teeth S16 is 13.92 mm. However, the sum of the axial lengths L1, L2, L3 and L4 of the driving spline surfaces S16B1, S16C1, S16D1 and S16E1 in the plurality of spline teeth S16 is not limited to the above size and range.

A sum of the radial lengths H1, H2, H3 and H4 of the driving spline surfaces S16B1, S16C1, S16D1 and S16E1 in the plurality of spline teeth S16 is larger than 4.0 mm in order to achieve sufficient strength of the plurality of spline teeth S16. The sum of the radial lengths H1, H2, H3 and H4 of the driving spline surfaces S16B1, S16C1, S16D1 and S16E1 in the plurality of spline teeth S16 is preferably larger than 5.0 mm in order to achieve sufficient strength of the plurality of spline teeth S16. The sum of the radial lengths HE H2, H3 and H4 of the driving spline surfaces S16B1, S16C1, S16D1 and S16E1 in the plurality of spline teeth S16 can range from 4.0 mm to 7.0 mm in order to achieve sufficient strength of the plurality of spline teeth S16 and to save radial space of the plurality of spline teeth S16. In the present embodiment, the sum of the radial lengths HE H2, H3 and H4 of the driving spline surfaces S16B1, S16C1, S16D1 and S16E1 in the plurality of spline teeth S16 is 5.44 mm. However, the sum of the radial lengths HE H2, H3 and H4 of the driving spline surfaces S16B1, S16C1, S16D1 and S16E1 in the plurality of spline teeth S16 is not limited to the above size and range.

As seen in FIGS. 11 to 14, the annular base S17 extends axially inwardly from the axially inwardly facing surface S15 of the sprocket body S11 in the axial direction D1. The plurality of spline teeth S16 is spaced apart from the plurality of sprocket teeth S12 in the axial direction D1. However, at least one spline tooth of the plurality of spline teeth S16 can be directly coupled to corresponding one of the plurality of sprocket teeth S12 if needed and/or desired.

Figure 11:
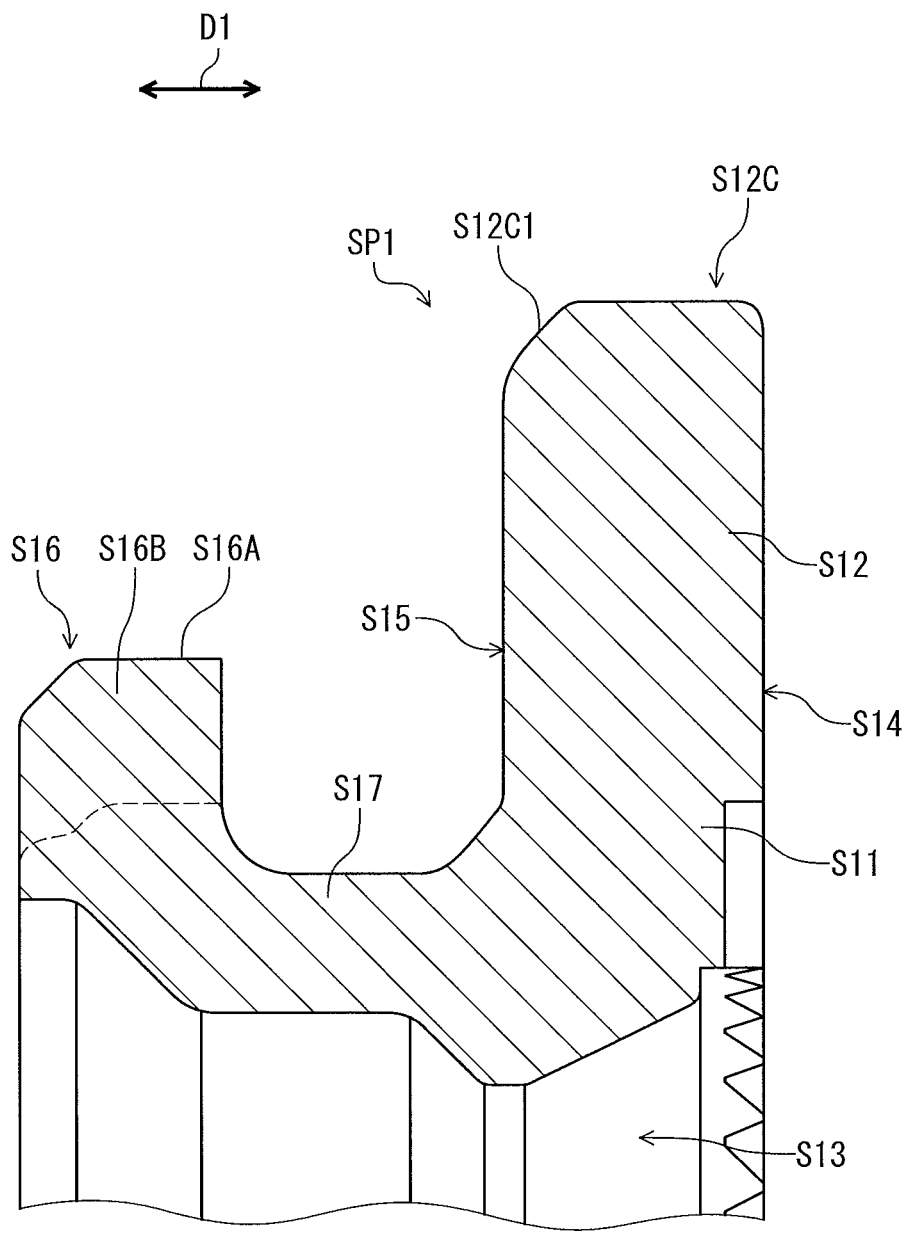
FIG. 11 is a cross-sectional view of the rear sprocket taken along line XI-XI of FIG. 23.

As seen in FIG. 11, the first spline tooth S16B extends radially outwardly from the annular base S17. The first spline tooth S16B is spaced apart from the plurality of sprocket teeth S12 in the axial direction D1. However, the first spline teeth S16B can be directly coupled to corresponding one of the plurality of sprocket teeth S12 if needed and/or desired.

Figure 12:
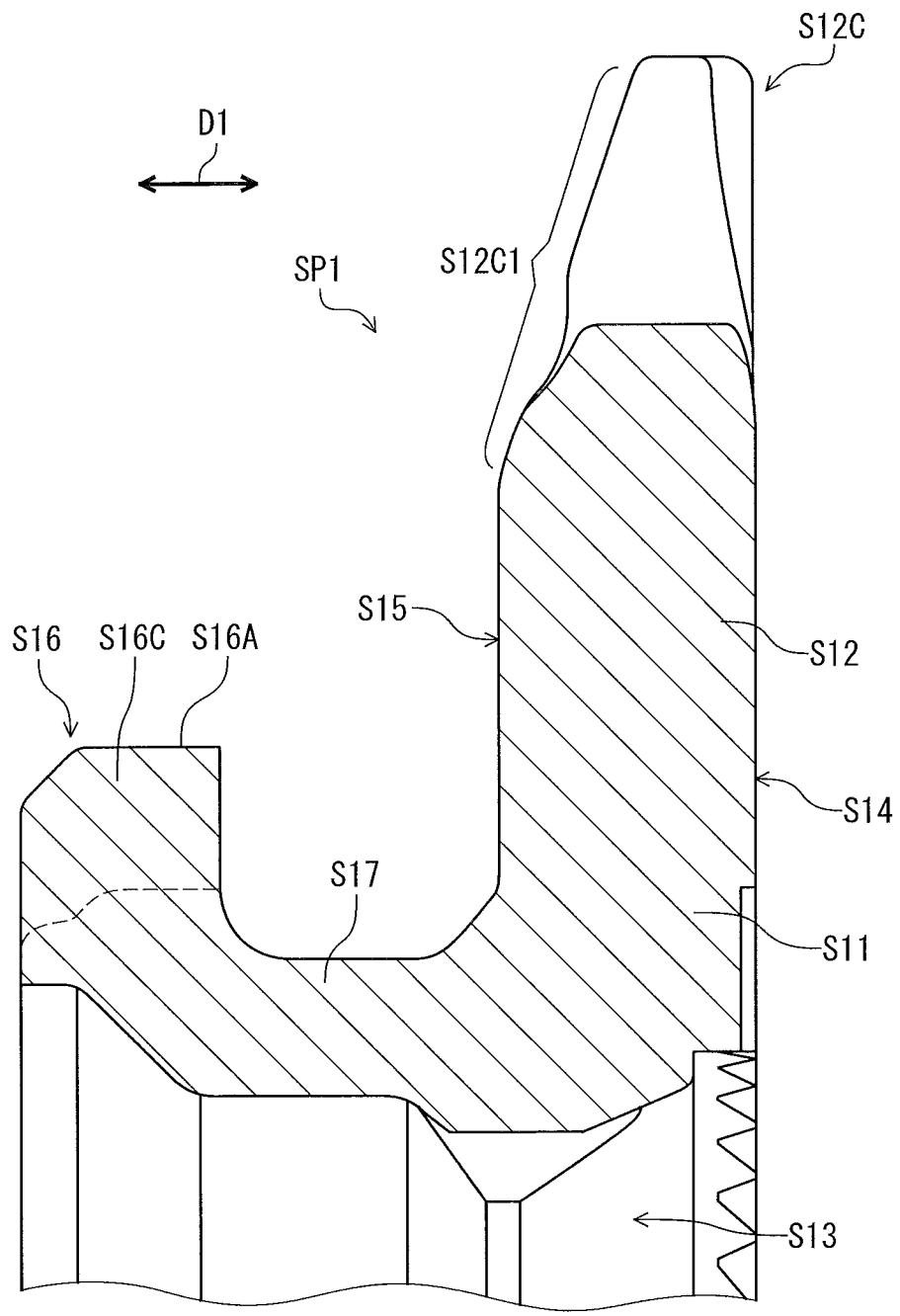
FIG. 12 is a cross-sectional view of the rear sprocket taken along line XII-XII of FIG. 23.

As seen in FIG. 12, the second spline tooth S16C extends radially outwardly from the annular base S17. The second spline tooth S16C is spaced apart from the plurality of sprocket teeth S12 in the axial direction D1. However, the second spline teeth S16C can be directly coupled to corresponding one of the plurality of sprocket teeth S12 if needed and/or desired.

Figure 13:
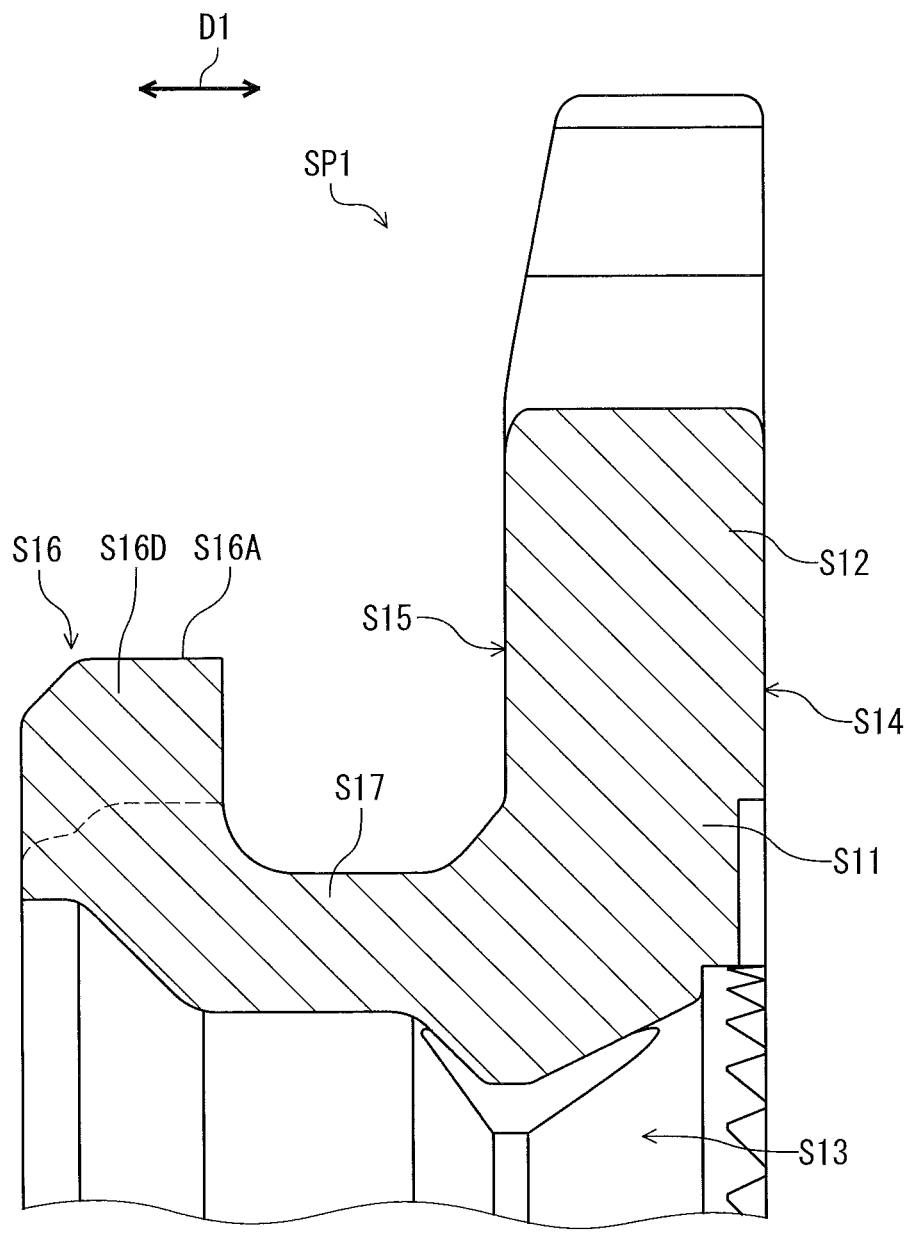
FIG. 13 is a cross-sectional view of the rear sprocket taken along line XIII-XIII of FIG. 8.

As seen in FIG. 13, the positioning spline tooth S16D extends radially outwardly from the annular base S17. The positioning spline tooth S16D is spaced apart from the plurality of sprocket teeth S12 in the axial direction D1. However, the third spline teeth S16D can be directly coupled to corresponding one of the plurality of sprocket teeth S12 if needed and/or desired.

Figure 14:
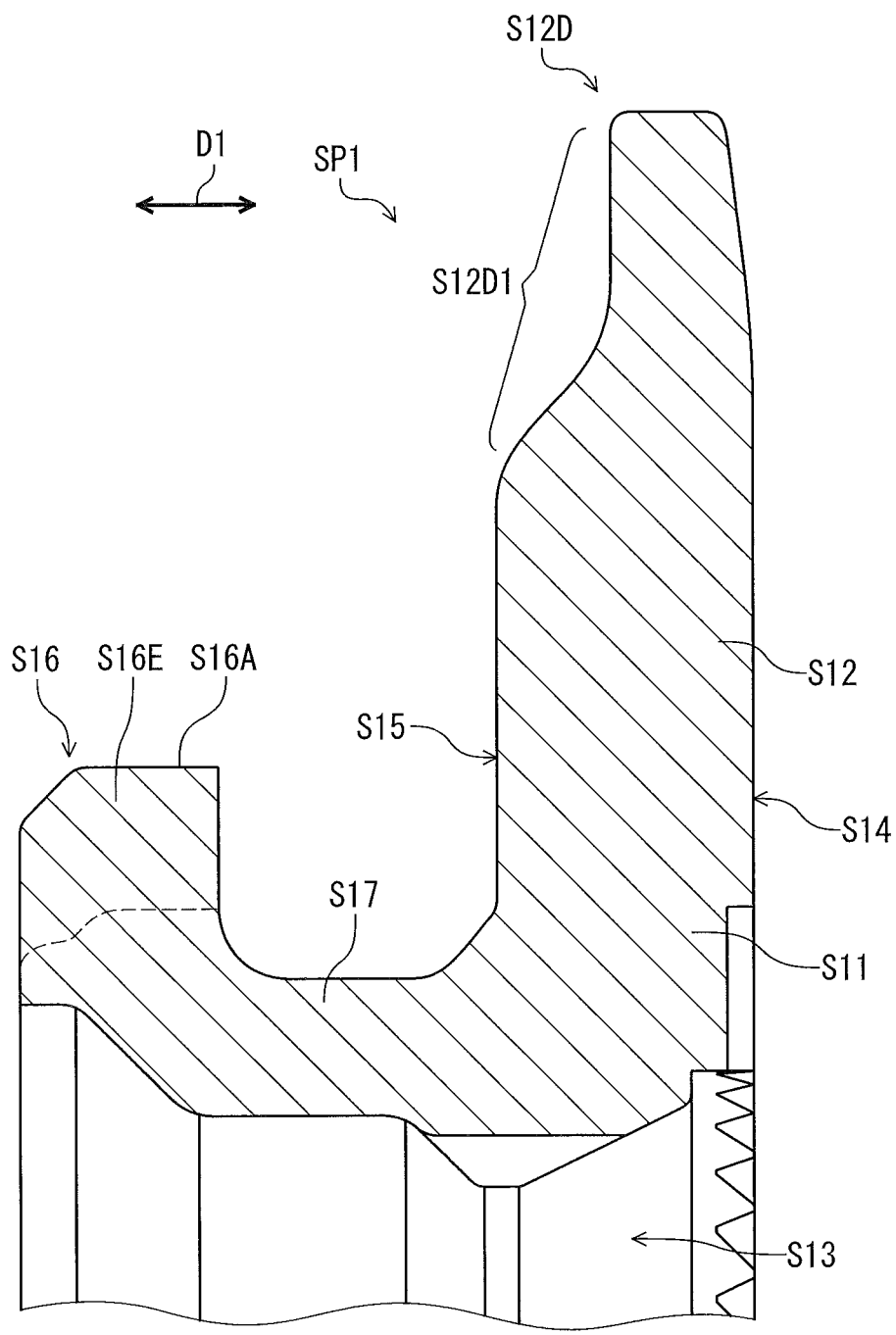
FIG. 14 is a cross-sectional view of the rear sprocket taken along line XIV-XIV of FIG. 23.

As seen in FIG. 14, the positioning spline tooth S16E extends radially outwardly from the annular base S17. The positioning spline tooth S16E is spaced apart from the plurality of sprocket teeth S12 in the axial direction D1. However, the positioning spline teeth S16E can be directly coupled to corresponding one of the plurality of sprocket teeth S12 if needed and/or desired.

Figure 15:
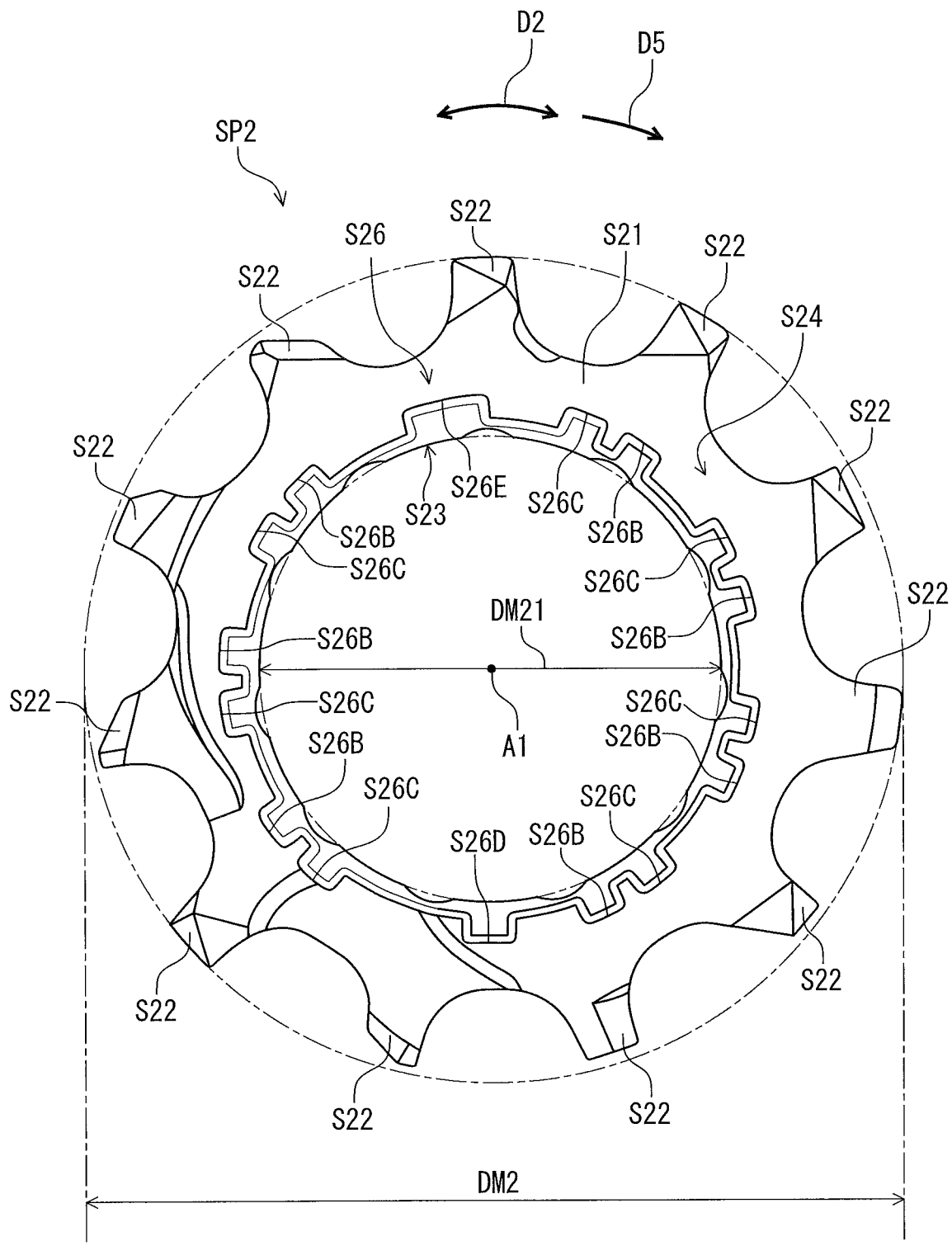
FIG. 15 is a side elevational view of a neighboring sprocket of the rear sprocket assembly illustrated in FIG. 2.

As seen in FIG. 15, the neighboring sprocket SP2 includes a second sprocket body S21 and a plurality of second sprocket teeth S22. The second sprocket body S21 has a second sprocket opening S23. The second sprocket opening S23 has a second minimum diameter DM21. The plurality of second sprocket teeth S22 extends radially outwardly from the second sprocket body S21 in the radial direction with respect to the rotational center axis A1. The plurality of second sprocket teeth S22 defines the second sprocket outer diameter DM2. In the present embodiment, a total number of the second sprocket teeth S22 is eleven. However, the total number of the second sprocket teeth S22 is not limited to eleven.

As seen in FIG. 5, the second sprocket opening S23 is configured to receive the hub axle 14 of the rear hub assembly 12 in the hub mounting state where the rear sprocket SP1 and the neighboring sprocket SP2 are mounted to the rear hub assembly 12. The second minimum diameter DM21 is smaller than the outermost diameter DM6 of the sprocket support body 18 of the rear hub assembly 12.

The rear sprocket SP1 further has a second axially outwardly facing surface S24 and a second axially inwardly facing surface S25. The second axially inwardly facing surface S25 is provided on a reverse side of the second axially outwardly facing surface S24 in the axial direction D1. The second axially inwardly facing surface S25 is configured to face toward the axial center plane CP of the human-powered vehicle 2 in the axial direction D1 in the vehicle mounting state where the rear sprocket SP1 and the neighboring sprocket SP2 are mounted to the human-powered vehicle 2.

As seen in FIG. 15, the neighboring sprocket SP2 includes a plurality of spline recesses S26. The plurality of spline recesses S26 is provided on the second axially outwardly facing surface S24. The plurality of spline recesses S26 includes at least one first spline recess S26B and at least one second spline recess S26C. The plurality of spline recesses S26 includes at least two first spline recesses S26B and at least two second spline recesses S26C. The plurality of spline recesses S26 includes at least two pairs of the first spline recess S26B and the second spline recess S26C. In the present embodiment, a total number of the at least two pairs of the first spline recess S26B and the second spline recess S26C is seven. The plurality of spline recesses S26 includes positioning spline recesses S26D and S26E. However, the total number of the at least two pairs of the first spline recess S26B and the second spline recess S26C is not limited to seven.

In the pair of the first spline recess S26B and the second spline recess S26C, the second spline recess S26C is adjacent to the first spline recess S26B in the circumferential direction D2 without another spline recess between the first spline recess S26B and the second spline recess S26C in the circumferential direction D2.

The plurality of spline recesses S26 includes at least one positioning spline recess S26D and/or S26E. The at least one positioning spline recess S26D and/or S26E is different from the other spline recesses of the plurality of spline recesses S26 in at least one of size and shape. In the present embodiment, the plurality of spline recesses S26 includes positioning spline recesses S26D and S26E. However, the plurality of spline recesses S26 can include at least one positioning spline recess if needed and/or desired.

The positioning spline recess S26D is provided between one of the at least two pairs of the first spline recess S26B and the second spline recess S26C and another of the at least two pairs of the first spline recess S26B and the second spline recess S26C in the circumferential direction D2. The positioning spline recess S26E is provided between one of the at least two pairs of the first spline recess S26B and the second spline recess S26C and another of the at least two pairs of the first spline recess S26B and the second spline recess S26C in the circumferential direction D2.

Figure 16:
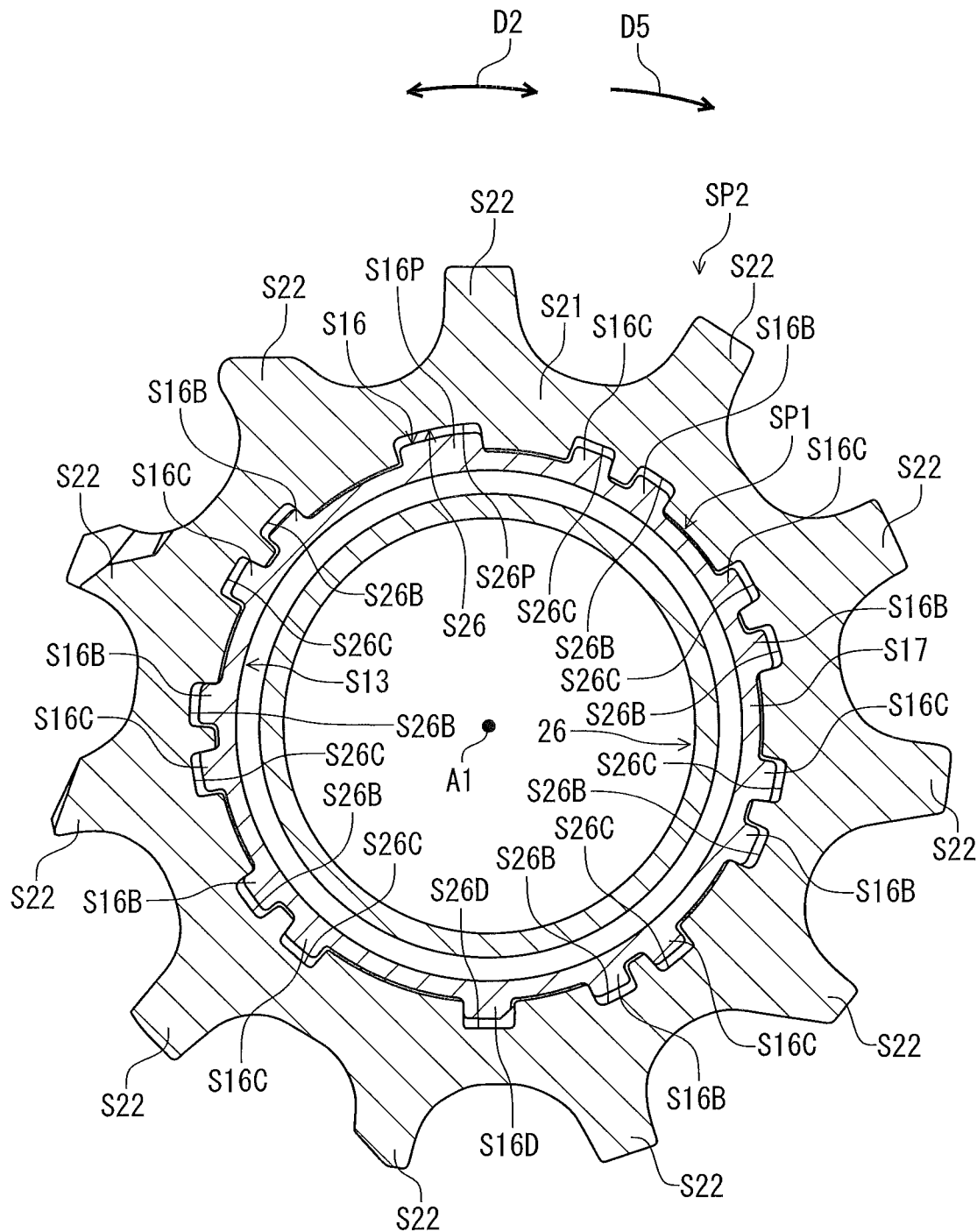
FIG. 16 is a cross-sectional view of the rear sprocket taken along line XVI-XVI of FIG. 5.

As seen in FIG. 16, the plurality of spline tooth S16 is engaged with the plurality of spline recesses S26 to transmit the driving torque between the rear sprocket SP1 and the neighboring sprocket SP2. The spline tooth S16 is configured to be at least partly provided in the spline recess S26 in the hub mounting state where the rear sprocket SP1 and the neighboring sprocket SP2 are mounted to the rear hub assembly 12. The first spline tooth S16B is configured to be at least partly provided in the first spline recess S26B in the hub mounting state where the rear sprocket SP1 and the neighboring sprocket SP2 are mounted to the rear hub assembly 12. The second spline tooth S16C is configured to be at least partly provided in the second spline recess S26C in the hub mounting state where the rear sprocket SP1 and the neighboring sprocket SP2 are mounted to the rear hub assembly 12. The positioning spline tooth S16D is configured to be at least partly provided in the positioning spline recess S26D in the hub mounting state where the rear sprocket SP1 and the neighboring sprocket SP2 are mounted to the rear hub assembly 12. The positioning spline tooth S16E is configured to be at least partly provided in the positioning spline recess S26E in the hub mounting state where the rear sprocket SP1 and the neighboring sprocket SP2 are mounted to the rear hub assembly 12.

As seen in FIG. 5, the rear sprocket assembly 10 comprises a lock device 26. The lock device 26 is configured to fix the rear sprocket assembly 10 to the sprocket support body 18 of the rear hub assembly 12 in the hub mounting state. The lock device 26 is configured to mount the rear sprocket SP1 and the neighboring sprocket SP2 to the rear hub assembly 12. The lock device 26 is configured to be attached to the sprocket support body 18 to hold the sprocket carrier 22 and the first to fourth sprockets SP1 to SP4 between the lock device 26 and the positioning surface 18C (see e.g., FIG. 3) of the sprocket support body 18 in the axial direction D1.

The lock device 26 includes an axially inward end 26A and an axially outward end 26B. The lock device 26 extends between the axially inward end 26A and the axially outward end 26B in the axial direction D1. The axially outward end 26B is opposite to the axially inward end 26A in the axial direction D1. The lock device 26 includes a first lock member 28 and a second lock member 30. The first lock member 28 includes the axially inward end 26A. The second lock member 30 includes the axially outward end 26B.

The first lock member 28 is configured to detachably engage with the sprocket support body 18 of the rear hub assembly 12 in the hub mounting state. The second lock member 30 is configured to detachably engage with the first lock member 28 so as to abut against the rear sprocket SP1 in the axial direction D1 in the hub mounting state.

The first lock member 28 is configured to detachably and reattachably engage with the axial end 18B of the sprocket support body 18 in the hub mounting state. The first lock member 28 is configured to be at least partly provided in the second sprocket opening S23 in the hub mounting state. The second lock member 30 is configured to be at least partly provided in the first sprocket opening S13 and the second sprocket opening S23 in the hub mounting state.

The term "detachably" or "detachably and reattachably" as used herein, encompasses a configuration in which an element is repeatedly detachable from and attachable to another element without substantial damage.

As seen in FIG. 5, the first lock member 28 includes a first axial end 28A and a second axial end 28B. The second axial end 28B is opposite to the first axial end 28A in the axial direction D1. The first axial end 28A is configured to be detachably attached to the sprocket support body 18 of the rear hub assembly 12 in the hub mounting state. The first axial end 28A is configured to be detachably and reattachably attached to the sprocket support body 18 of the rear hub assembly 12 in the hub mounting state.

The first axial end 28A has first threads 28D. The second axial end 28B has second threads 28E. The axially inward end 26A has the first threads 28D. In the present embodiment, the first threads 28D include external threads. The second threads 28E include internal threads. However, the first threads 28D can include internal threads if needed and/or desired. The second threads 28E can include external threads if needed and/or desired.

The first threads 28D are configured to threadedly engage with threads 18D provided to the sprocket support body 18 of the rear hub assembly 12 in the hub mounting state where the rear sprocket assembly 10 is mounted to the rear hub assembly 12. In the present embodiment, the threads 18D includes internal threads. However, the threads 18D can include external threads if needed and/or desired.

The first lock member 28 includes a first surface 28C. The first surface 28C radially outwardly faces in the radial direction with respect to the rotational center axis A1. The first surface 28C is adjacent to the first threads 28D. The first threads 28D of the first lock member 28 extend radially outwardly from the first surface 28C in the radial direction. The first surface 28C extends from the first threads 28D in the axial direction D1. The second threads 28E are provided radially inwardly of the first surface 28C.

As seen in FIG. 5, the second lock member 30 includes a third axial end 30A and a fourth axial end 30B. The fourth axial end 30B is opposite to the third axial end 30A in the axial direction D1. The third axial end 30A is configured to be attached to the second axial end 28B of the first lock member 28 in an assembled state where the rear sprocket SP1 and the lock device 26 are assembled as one unit. The third axial end 30A of the second lock member 30 is configured to be detachably attached to the second axial end 28B of the first lock member 28 in the assembled state where the rear sprocket SP1 and the lock device 26 are assembled as one unit.

The third axial end 30A has third threads 30D. The third threads 30D are configured to threadedly engage with the second threads 28E of the first lock member 28 in the assembled state where the rear sprocket SP1 and the lock device 26 are assembled as one unit. The fourth axial end 30B has at least one radial projection 30F. Namely, the axially outward end 26B has the at least one radial projection 30F. In the present embodiment, the third threads 30D includes external threads. However, the third threads 30D can include internal threads if needed and/or desired. Furthermore, the third axial end 30A of the second lock member 30 may be attached to the second axial end 28B of the first lock member 28 by spline engagement in a press-fitted manner.

The second lock member 30 includes a second surface 30C. The second surface 30C radially outwardly faces in the radial direction. The second surface 30C is adjacent to the third threads 30D. The second surface 30C is adjacent to the at least one radial projection 30F in the axial direction D1. The second surface 30C is disposed between the third threads 30D and the at least one radial projection 30F. The second surface 30C extends from the third threads 30D in the axial direction D1. The second surface 30C extends from the at least one radial projection 30F in the axial direction D1 in the axial direction D1. The at least one radial projection 30F of the second lock member 30 extends radially outwardly from the second surface 30C in the radial direction. The first surface 28C is disposed radially outwardly from the second surface 30C with respect to the rotational center axis A1 in the assembled state where the rear sprocket SP1 and the lock device 26 are assembled as one unit.

The at least one radial projection 30F is configured to abut against the rear sprocket SP1 in the axial direction D1 in the hub mounting state where the rear sprocket assembly 10 is mounted to the rear hub assembly 12. The at least one radial projection 30F has a flange shape. The at least one radial projection 30F has an annular shape. However, the at least one radial projection 30F may include a plurality of radial projections if needed and/or desired. The at least one radial projection 30F may have shapes other than the flange shape and the annular shape if needed and/or desired. An intermediate member such as a washer can be provided between the at least one radial projection 30F and the rear sprocket SP1 in the axial direction D1 if needed and/or desired.

As seen in FIG. 5, the first lock member 28 has an axial contact surface 28F disposed radially inwardly from the first surface 28C. The axial contact surface 28F is configured to contact the third axial end 30A of the second lock member 30 in the assembled state where the rear sprocket SP1 and the lock device 26 are assembled as one unit. The axial contact surface 28F is configured to contact the third axial end 30A of the second lock member 30 in the assembled state where the rear sprocket SP1 and the lock device 26 are assembled as one unit. The axial contact surface 28F is configured to contact the third axial end 30A of the second lock member 30 in the assembled state where the first lock member 28, the second lock member 30, and the at least two sprockets of the plurality of rear sprockets SP are assembled as one unit. The axial contact surface 28F is configured to contact the third axial end 30A of the second lock member 30 in the assembled state where the first lock member 28, the second lock member 30, and the rear sprocket SP1 are assembled as one unit.

As seen in FIG. 5, the lock device 26 is configured to arrange the rear sprocket SP1 between the first threads 28D of the first lock member 28 and the at least one radial projection 30F of the second lock member 30 in the axial direction D1 in the assembled state where the rear sprocket SP1 and the lock device 26 are assembled as one unit. The rear sprocket SP1 is configured to be disposed between the at least one radial projection 30F of the second lock member 30 and the sprocket support body 18 of the rear hub assembly 12 in the axial direction D1 in the hub mounting state. The first lock member 28 and the second lock member 30 are configured to arrange the rear sprocket SP1 between the first threads 28D of the first lock member 28 and the at least one radial projection 30F of the second lock member 30 in the axial direction D1 in the assembled state where the first lock member 28, the second lock member 30, and the rear sprocket SP1 are assembled as one unit.

The at least one radial projection 30F has a radially maximum projection diameter DM4. The first threads 28D have a first maximum thread diameter DM5. The first maximum thread diameter DM5 is an external major diameter of the first threads 28D. The first minimum diameter DM11 of the first sprocket opening S13 is smaller than each of the first maximum thread diameter DM5 of the first threads 28D and the radially maximum projection diameter DM4 of the at least one radial projection 30F. Thus, the rear sprocket SP1 is provided between the first threads 28D and the at least one radial projection 30F in the axial direction D1 without dropping off from the lock device 26.

The second minimum diameter DM21 of the second sprocket opening S23 is smaller than the radially maximum projection diameter DM4 of the at least one radial projection 30F. The second minimum diameter DM21 of the second sprocket opening S23 is larger than the first maximum thread diameter DM5 of the first threads 28D. Thus, the first threads 28D of the lock device 26 is configured to be inserted into the second sprocket opening S23 of the neighboring sprocket SP2 in the assembled state where the rear sprocket SP1 and the lock device 26 are assembled as one unit. However, the second minimum diameter DM21 of the second sprocket opening S23 can be smaller than or equal to the first maximum thread diameter DM5 of the first threads 28D if needed and/or desired. In such embodiments, the rear sprocket SP1 and the neighboring sprocket SP2 are provided between the first threads 28D and the at least one radial projection 30F in the axial direction D1 without dropping off from the lock device 26.

Figure 17:
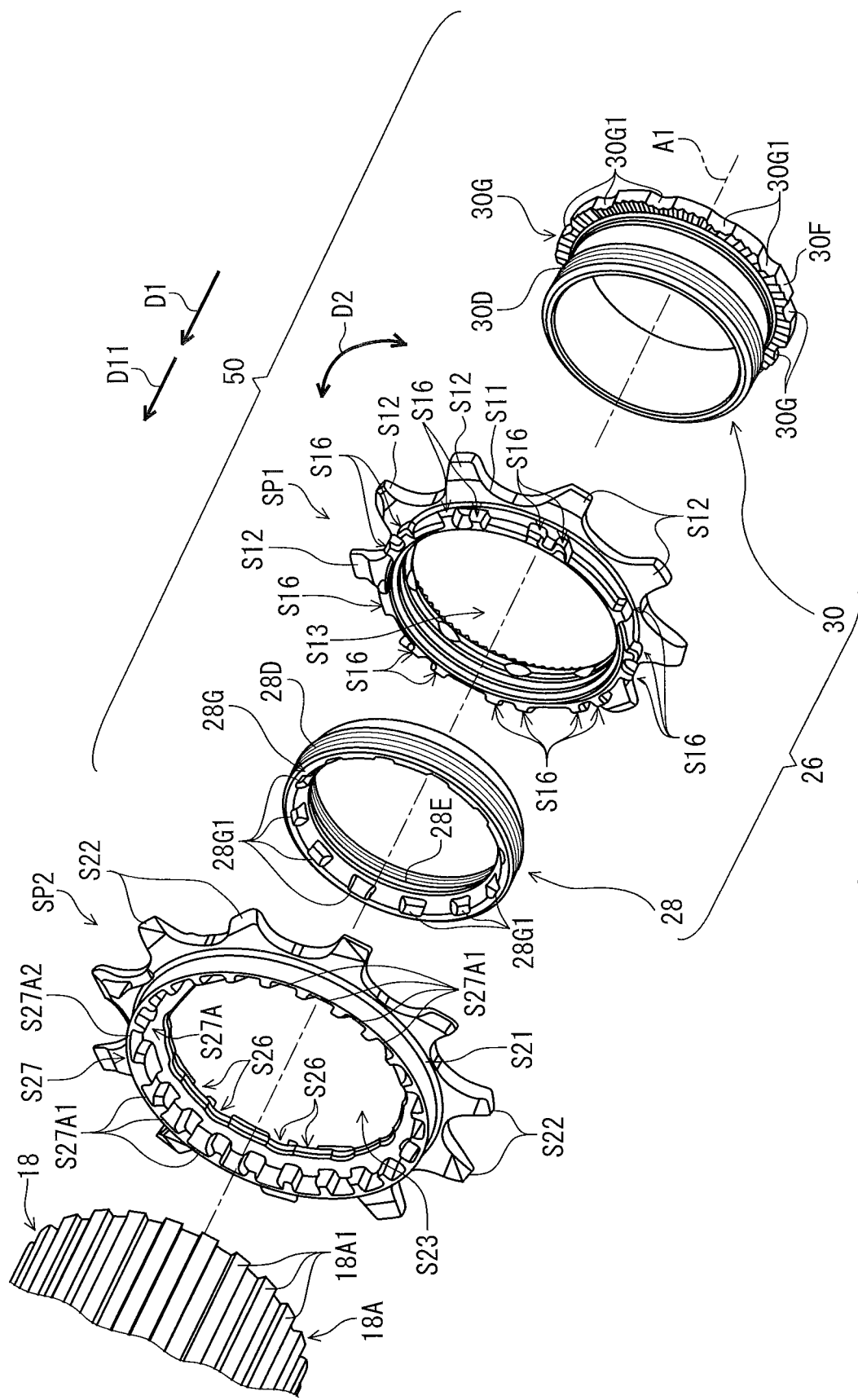
FIG. 17 is an exploded perspective view of a lock device assembly of the rear sprocket assembly illustrated in FIG. 2.
Figure 18:
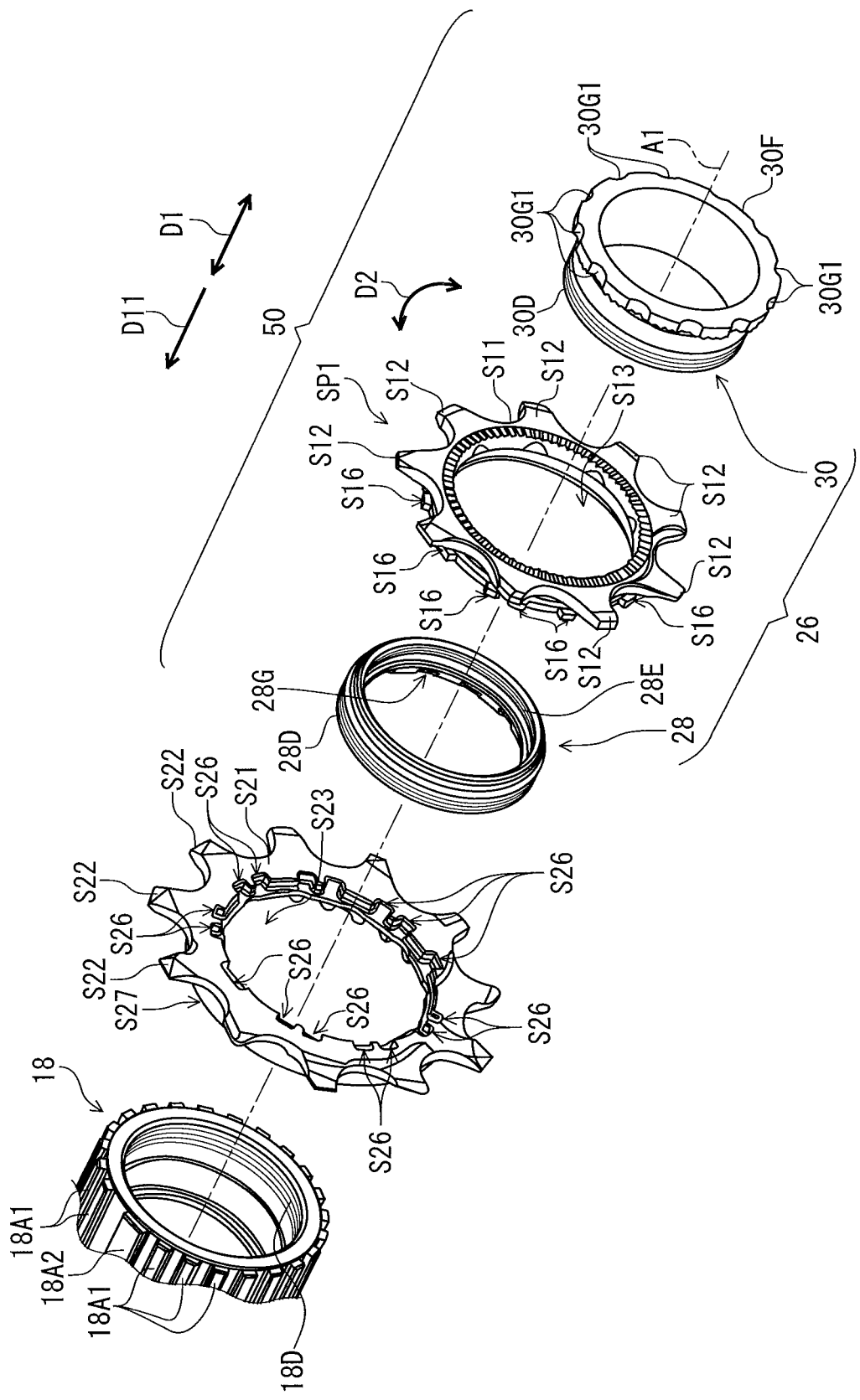
FIG. 18 is another exploded perspective view of the lock device assembly of the rear sprocket assembly illustrated in FIG. 2.

As seen in FIGS. 17 and 18, the first axial end 28A of the first lock member 28 includes a first tool engagement profile 28G. In the present embodiment, the first tool engagement profile 28G includes a plurality of first tool engagement recesses 28G1. The first tool engagement recesses 28G1 are circumferentially arranged at constant intervals. However, the structure of the first tool engagement profile 28G is not limited to the first tool engagement recesses 28G1.

The fourth axial end 30B of the second lock member 30 includes a second tool engagement profile 30G. In the present embodiment, the at least one radial projection 30F includes the second tool engagement profile 30G. The second tool engagement profile 30G includes a plurality of second tool engagement recesses 30G1. The second tool engagement recesses 30G1 are circumferential arranged at constant intervals. However, the structure of the second tool engagement profile 30G is not limited to the second tool engagement recesses 30G1.

The first tool engagement profile 28G is configured to be engaged with a first tool. The second tool engagement profile 30G is configured to be engaged with a second tool. The first lock member 28 and the second lock member 30 are rotated relative to each other using the first tool and the second tool in a state where the first tool is engaged with the first tool engagement profile 28G and the second tool is engaged with the second tool engagement profile 30G. Thus, the third threads 30D of the second lock member 30 is screwed into the second threads 28E of the first lock member 28.

As seen in FIG. 5, the neighboring sprocket SP2 includes a axially inwardly torque transmitting profile S27 provided to the second axially inwardly facing surface S25. The axially inwardly torque transmitting profile S27 is configured to engage with at least one of a torque transmitting profile provided to the third sprocket SP3 and the plurality of external spline teeth 18A of the sprocket support body 18 in a torque-transmitting manner.

In the present embodiment, the axially inwardly torque transmitting profile S27 is configured to engage with the plurality of external spline teeth 18A of the sprocket support body 18 in a torque-transmitting manner. However, the axially inwardly torque transmitting profile S27 can be configured to engage with a torque transmitting profile provided to the sprocket support body 18 in a torque-transmitting manner if needed and/or desired.

As seen in FIG. 17, the axially inwardly torque transmitting profile S27 includes a plurality of torque transmitting recesses S27A. The plurality of torque transmitting recesses S27A includes a plurality of torque transmitting recesses S27A1 and a positioning recess S27A2. The third positioning recess S27A2 that has a different shape and/or size from the other of the plurality of torque transmitting recesses S27A1. In the present embodiment, the third positioning recess S27A2 has a circumferential width which is larger than a circumferential width of the torque transmitting recess S27A1.

As seen in FIG. 18, the plurality of external spline teeth 18A includes a plurality of external spline teeth 18A1 and an external positioning tooth 18A2. The plurality of external spline teeth 18A includes at least two external spline teeth 18A1 and an external positioning tooth 18A2. The external positioning tooth 18A2 that has a different shape and/or size from the other of the at least two external spline teeth 18A1. In the present embodiment, the external positioning tooth 18A2 has a circumferential width which is larger than a circumferential width of the external spline tooth 18A1.

As seen in FIGS. 17 and 18, the external spline teeth 18A of the sprocket support body 18 are configured to respectively engage with the torque transmitting recesses S27A of the neighboring sprocket SP2 in a torque transmitting manner. In the present embodiment, the external spline teeth 18A1 of the sprocket support body 18 are configured to respectively engage with the torque transmitting recesses S27A1 of the neighboring sprocket SP2. The external positioning tooth 18A2 of the sprocket support body 18 is configured to engage with the third positioning recess S27A2 of the neighboring sprocket SP2. The external positioning tooth 18A2 is configured not to engage with the torque transmitting recess S27A1 since the circumferential width of the external positioning tooth 18A2 is larger than the circumferential width of the torque transmitting recess S27A1. Thus, the external positioning tooth 18A2 and the third positioning recess S27A2 define a single circumferential position of the sprocket support body 18 relative to the neighboring sprocket SP2.

The assembly procedure in which the rear sprocket assembly 10 is assembled to the rear hub assembly 12 will be described below referring to FIGS. 3, 5, and 19 to 21.

As seen in FIG. 3, the third to eleventh sprockets SP3 to SP11 and the sprocket carrier 22 are mounted to the sprocket support body 18 before the neighboring sprocket SP2 and the lock device assembly 50 are mounted to the sprocket support body 18. The neighboring sprocket SP2 is mounted to the sprocket support body 18 after the third to eleventh sprockets SP3 to SP11 and the sprocket carrier 22 are mounted to the sprocket support body 18.

Figure 19:
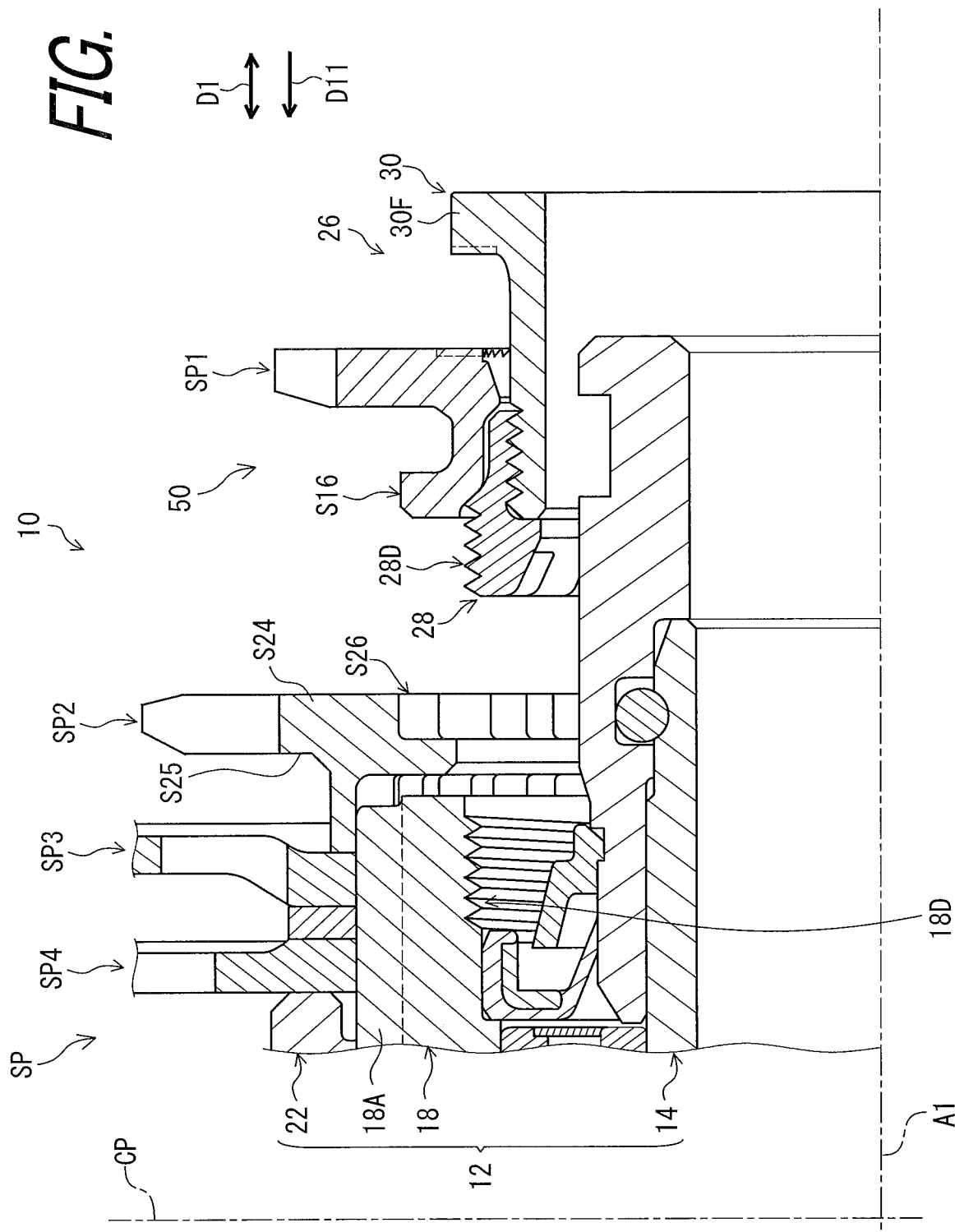
FIG. 19 is a cross-sectional view of the rear sprocket assembly and the rear hub assembly illustrated in FIG. 2 for showing an assembly procedure.

As seen in FIG. 19, for example, the neighboring sprocket SP2 is rotated by the user relative to the sprocket support body 18 about the rotational center axis A1 so that the neighboring sprocket SP2 is positioned in a predetermined circumferential position relative to the sprocket support body 18.

In a state where the neighboring sprocket SP2 is positioned in the predetermined circumferential position, the axially inwardly torque transmitting profile S27 of the neighboring sprocket SP2 is brought into engagement with the plurality of external spline teeth 18A of the sprocket support body 18. Specifically, in the state where the neighboring sprocket SP2 is positioned in the predetermined circumferential position, the torque transmitting recess S27A1 (see e.g., FIG. 17) of the axially inwardly torque transmitting profile S27 is brought into engagement with the external spline tooth 18A1 (see e.g., FIG. 18) of the sprocket support body 18. In the state where the neighboring sprocket SP2 is positioned in the predetermined circumferential position, the third positioning recess S27A2 (see e.g., FIG. 17) of the axially inwardly torque transmitting profile S27 is brought into engagement with the external positioning tooth 18A2 (see e.g., FIG. 18) of the sprocket support body 18. Thus, the neighboring sprocket SP2 is engaged with the sprocket support body 18 in the predetermined circumferential position about the rotational center axis A1.

Figure 20:
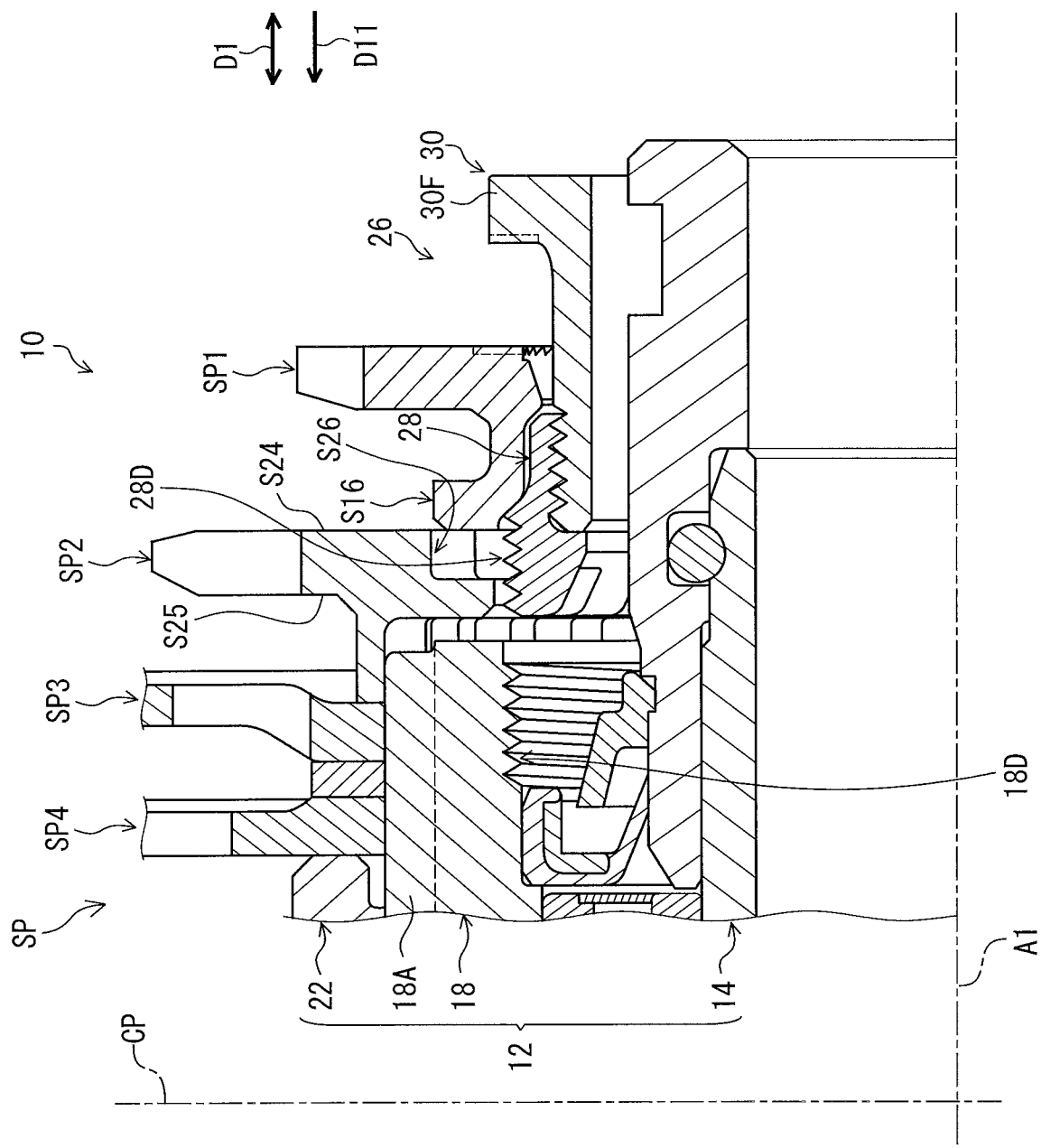
FIG. 20 is a cross-sectional view of the rear sprocket assembly and the rear hub assembly illustrated in FIG. 2 for showing the assembly procedure.

As seen in FIG. 20, the lock device assembly 50 is mounted to the sprocket support body 18 after the neighboring sprocket SP2 is mounted to the sprocket support body 18. For example, the rear sprocket SP1 is rotated by the user relative to the sprocket support body 18 and the neighboring sprocket SP2 about the rotational center axis A1 so that the rear sprocket SP1 is positioned in a predetermined circumferential position relative to the sprocket support body 18 and the neighboring sprocket SP2. In the state where the rear sprocket SP1 is positioned in the predetermined circumferential position, the plurality of spline teeth S16 of the rear sprocket SP1 is brought into engagement with the plurality of spline recesses S26 of the neighboring sprocket SP2. In the state where the rear sprocket SP1 is positioned in the predetermined circumferential position, the first spline teeth S16B, the second spline teeth S16C, the positioning spline tooth S16D, and the positioning spline tooth S16E are brought into engagement with the first spline recesses S26B, the second spline recesses S26C, the positioning spline recess S26D, and the positioning spline recess S26E.

Figure 21:
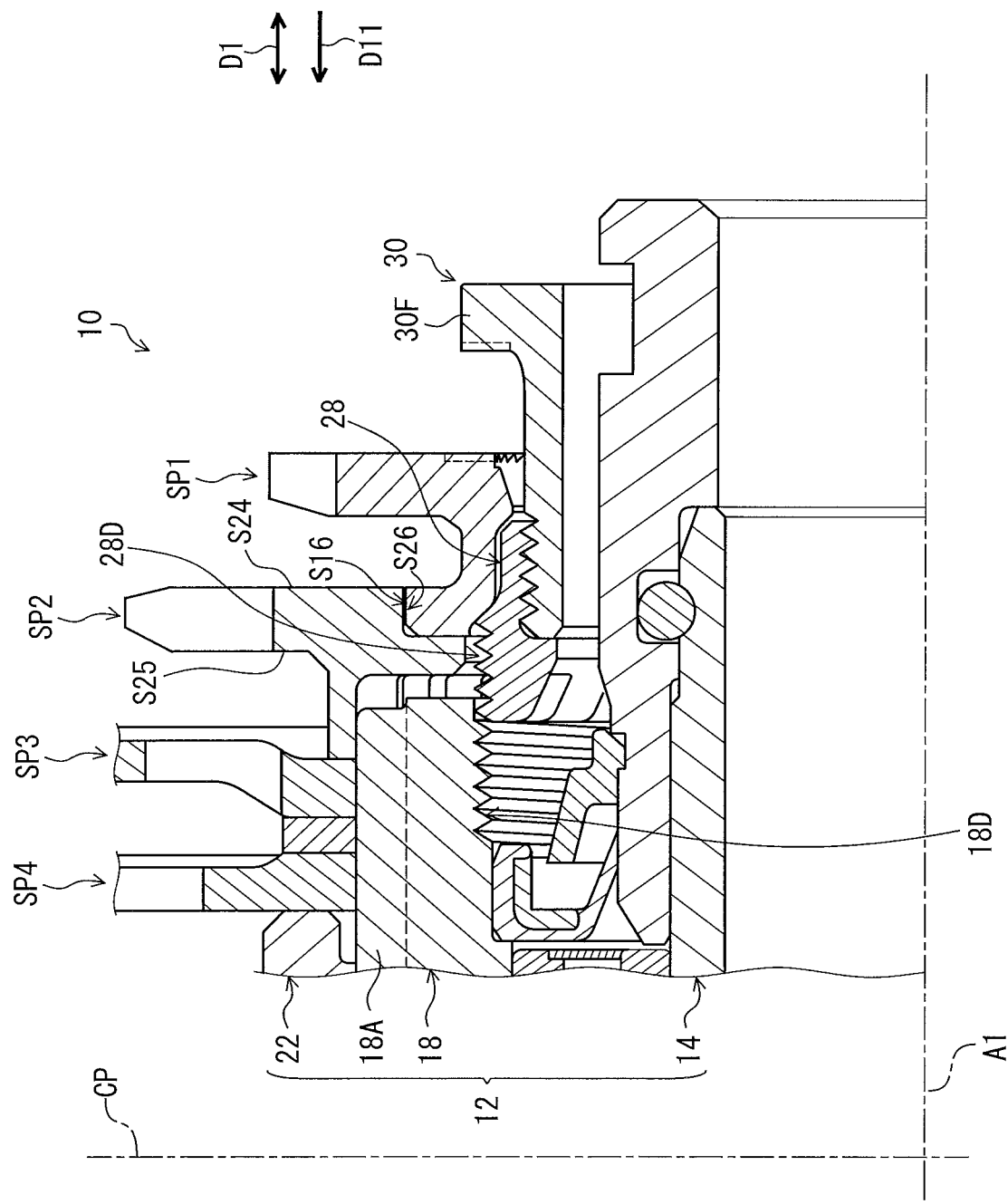
FIG. 21 is a cross-sectional view of the rear sprocket assembly and the rear hub assembly illustrated in FIG. 2 for showing the assembly procedure.

As seen in FIG. 21, the lock device 26 is rotated by the user relative to the sprocket support body 18 about the rotational center axis A1 after the plurality of spline teeth S16 of the rear sprocket SP1 is brought into engagement with the plurality of spline recesses S26 of the neighboring sprocket SP2. The first threads 28D of the first lock member 28 are screwed into the threads 18D of the sprocket support body 18 while the lock device 26 is rotated by the user relative to the sprocket support body 18 about the rotational center axis A1.

The first threads 28D and the threads 18D convert the rotation of the lock device 26 into an axial movement of the lock device 26 relative to the sprocket support body 18 in the axial direction D1. Thus, the lock device 26 is moved relative to the sprocket support body 18 in a first axial direction D11 when the first threads 28D are screwed into the threads 18D of the sprocket support body 18. The at least one radial projection 30F is moved relative to the rear sprocket SP1 from the first end position P21 toward the second end position P22 when the first threads 28D are screwed into the threads 18D of the sprocket support body 18.

As seen in FIG. 5, the rear sprocket SP1 and the neighboring sprocket SP2 are held between the at least one radial projection 30F of the second lock member 30 and the sprocket support body 18 in the axial direction D1. Thus, the rear sprocket assembly 10 is assembled to the rear hub assembly 12.

As seen in FIG. 6, the plurality of sprocket teeth S12 includes a first upshifting facilitation tooth S12C, a second upshifting facilitation tooth S12D, a third upshifting facilitation tooth S12E and an upshifting initiation tooth S12F. The first upshifting facilitation tooth S12C, the second upshifting facilitation tooth S12D and the third upshifting facilitation tooth S12E are configured to facilitate an upshifting operation where the drive chain C is shifted from the neighboring larger sprocket SP2 toward the rear sprocket SP1. The upshifting initiation tooth S12F is configured to firstly engage with the drive chain C during the upshifting operation. The upshifting initiation tooth S12F is configured to firstly be inserted into a space provided between an opposed pair of link plates of the drive chain C during the upshifting operation. Specifically, the upshifting initiation tooth S12F is configured to firstly be inserted into a space provided between an opposed pair of outer link plates of the drive chain C during the upshifting operation. The drive chain C is shifted from the neighboring larger sprocket SP2 toward the rear sprocket SP1 by a gear changing device such as a derailleur.

The second upshifting facilitation tooth S12D is adjacent to the first upshifting facilitation tooth S12C at an upstream side of the first upshifting facilitation tooth S12C with respect to a driving rotational direction D5 of the rear sprocket SP1 without another tooth between the first upshifting facilitation tooth S12C and the second upshifting facilitation tooth S12D in the circumferential direction D2. The second upshifting facilitation tooth S12D is provided on the upstream side of the first upshifting facilitation tooth S12C in the driving rotational direction D5. The rear sprocket SP1 is rotated about the rotational center axis A1 in the driving rotational direction D5 during pedaling.

The third upshifting facilitation tooth S12E is adjacent to the second upshifting facilitation tooth S12D at an upstream side of the second upshifting facilitation tooth S12D with respect to the driving rotational direction D5 of the rear sprocket SP1 without another tooth between the second upshifting facilitation tooth S12D and the third upshifting facilitation tooth S12E in the circumferential direction D2. The third upshifting facilitation tooth S12E is provided on the upstream side of the second upshifting facilitation tooth S12D in the driving rotational direction D5.

The upshifting initiation tooth S12F is adjacent to the third upshifting facilitation tooth S12E at an upstream side of the third upshifting facilitation tooth S12E with respect to the driving rotational direction D5 of the rear sprocket SP1 without another tooth between the third upshifting facilitation tooth S12E and the upshifting initiation tooth S12F in the circumferential direction D2. The upshifting initiation tooth S12F is provided on the upstream side of the third upshifting facilitation tooth S12E in the driving rotational direction D5.

As seen in FIG. 12, the first upshifting facilitation tooth S12C has a first recess S12C1. The first recess S12C1 is provided to the axially inwardly facing surface S15 of the first upshifting facilitation tooth S12C so as to be dented from the axially inwardly facing surface S15 toward the axially outwardly facing surface S14 in the axial direction D1.

As seen in FIG. 14, the second upshifting facilitation tooth S12D has a second recess S12D1. The second recess S12D1 is provided to the axially inwardly facing surface S15 of the second upshifting facilitation tooth S12D so as to be dented from the axially inwardly facing surface S15 toward the axially outwardly facing surface S14 in the axial direction D1.

Figure 22:
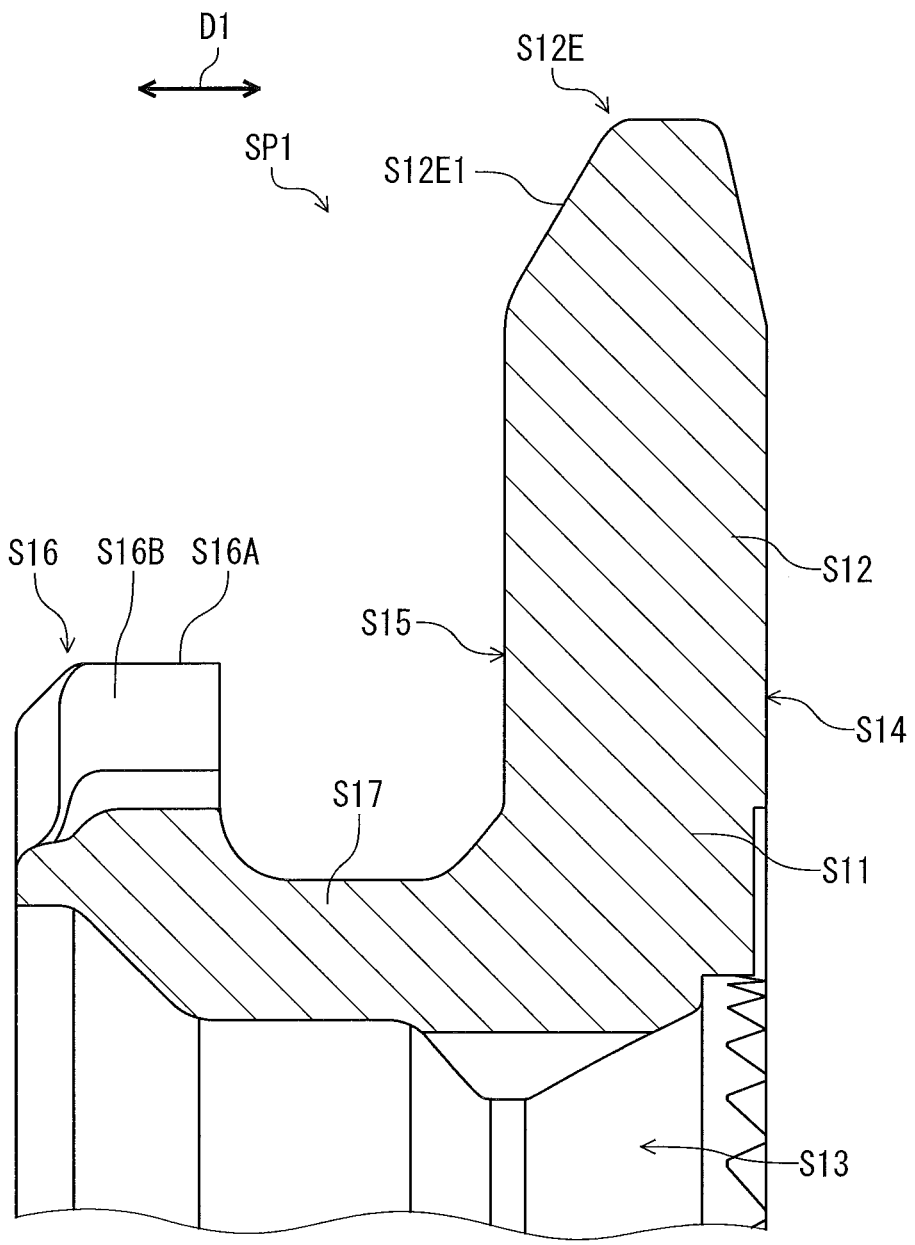
FIG. 22 is a cross-sectional view of the rear sprocket taken along line XXII-XXII of FIG. 24.

As seen in FIG. 22, the third upshifting facilitation tooth S12E has a third recess S12E1 provided to the axially inwardly facing surface S15 of the third upshifting facilitation tooth S12E so as to be dented from the axially inwardly facing surface S15 toward the axially outwardly facing surface S14 in the axial direction D1.

Figure 23:
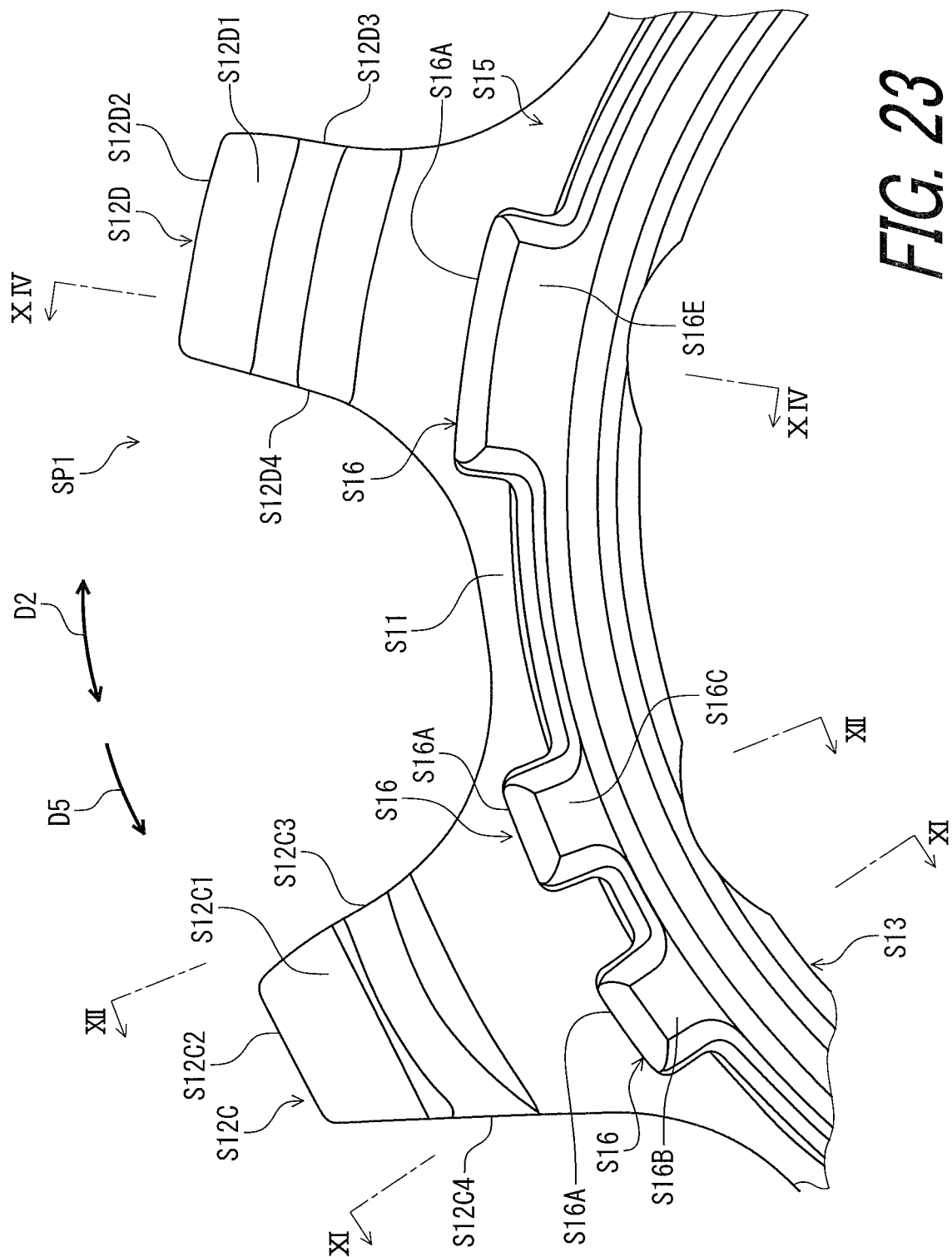
FIG. 23 is a partial enlarged side elevational view of the rear sprocket illustrated in FIG. 6.

As seen in FIG. 23, the first upshifting facilitation tooth S12C has a first tooth crest S12C2, a first driving surface S12C3 and a first non-driving surface S12C4. The first non-driving surface S12C4 is opposite to the first driving surface S12C3 in the circumferential direction D2. The first tooth crest S12C2 includes a radially outer end of the first upshifting facilitation tooth S12C. Thus, the first tooth crest S12C2 can also be referred to as a first radially outer end S12C 1. The first driving surface S12C3 is configured to receive a driving force from the drive chain C during pedaling. The first driving surface S12C3 is provided on an upstream side of the first non-driving surface S12C4 in the driving rotational direction D5.

As seen in FIGS. 12 and 23, the first recess S12C1 reaches each of the first tooth crest S12C2, the first driving surface S12C3 and the first non-driving surface S12C4. However, the first recess S12C 1 can be configured not to reach at least one of the first tooth crest S12C2, the first driving surface S12C3 and the first non-driving surface S12C4 if needed and/or desired.

As seen in FIG. 23, the second upshifting facilitation tooth S12D has a second tooth crest S12D2, a second driving surface S12D3 and a second non-driving surface S12D4. The second non-driving surface S12D4 is opposite to the second driving surface S12D3 in the circumferential direction D2. The second tooth crest S12D2 includes a radially outer end of the second upshifting facilitation tooth S12D. Thus, the second tooth crest S12D2 can also be referred to as a second radially outer end S12D1. The second driving surface S12D3 is configured to receive the driving force from the drive chain C during pedaling. The second driving surface S12D3 is provided on an upstream side of the second non-driving surface S12D4 in the driving rotational direction D5.

As seen in FIGS. 14 and 23, the second recess S12D1 reaches each of the second tooth crest S12D2, the second driving surface S12D3 and the second non-driving surface S12D4. However, the second recess S12D1 can be configured not to reach at least one of the second tooth crest S12D2, the second driving surface S12D3 and the second non-driving surface S12D4 if needed and/or desired.

Figure 24:
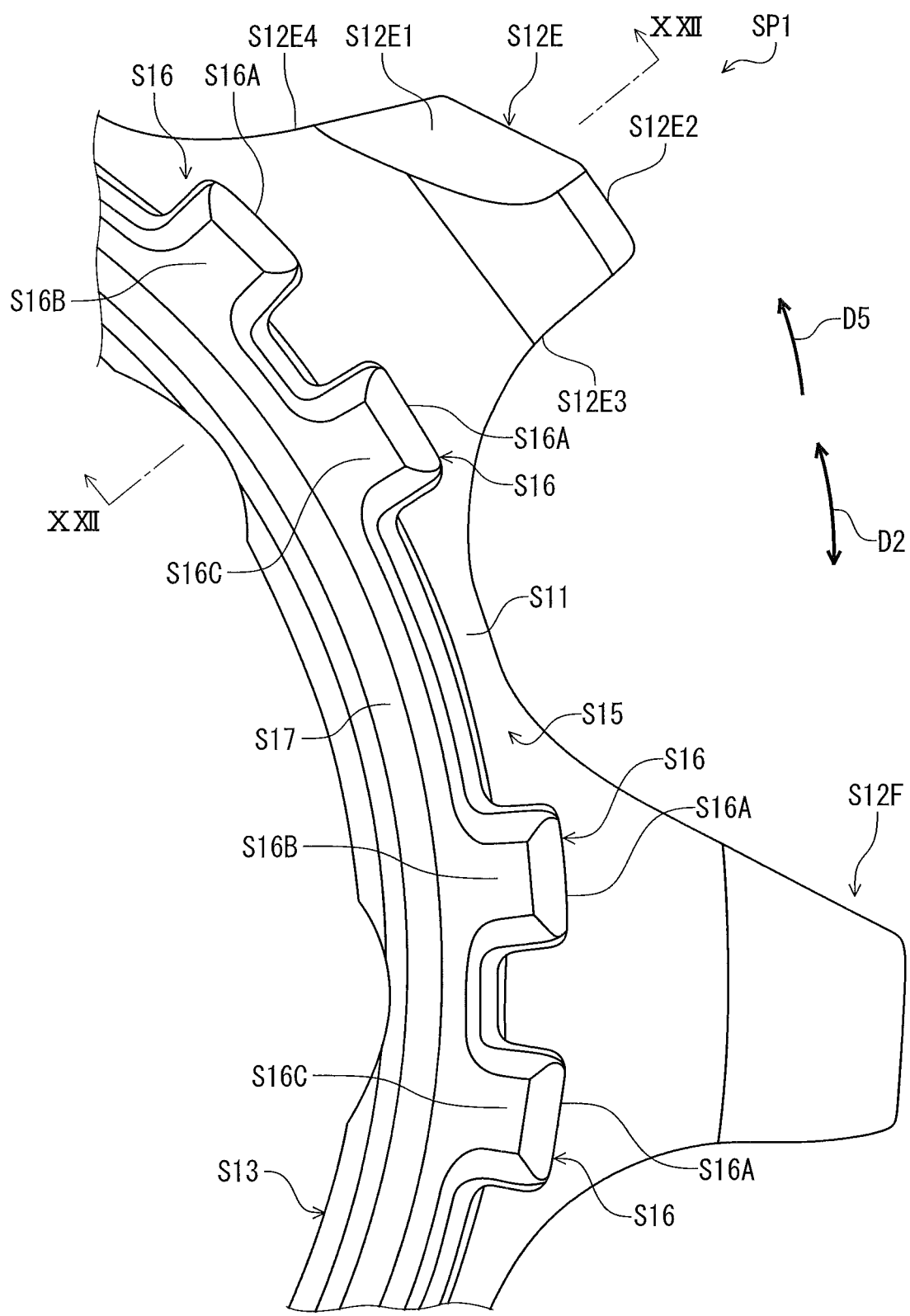
FIG. 24 is a partial enlarged side elevational view of the rear sprocket illustrated in FIG. 6.

As seen in FIG. 24, the third upshifting facilitation tooth S12E has a third tooth crest S12E2, a third driving surface S12E3 and a third non-driving surface S12E4. The third non-driving surface S12E4 is opposite to the third driving surface S12E3 in the circumferential direction D2. The third tooth crest S12E2 includes a radially outer end of the third upshifting facilitation tooth S12E. Thus, the third tooth crest S12E2 can also be referred to as a third radially outer end S12E1. The third driving surface S12E3 is configured to receive a driving force from the drive chain C during pedaling. The third driving surface S12E3 is provided on an upstream side of the third non-driving surface S12E4 in the driving rotational direction D5.

As seen in FIGS. 22 and 24, the third recess S12E1 reaches each of the third tooth crest S12E2 and the third non-driving surface S12E4 and does not reach the third driving surface S12E3. However, the third recess S12E1 can be configured not to reach at least one of the third tooth crest S12E2, the third driving surface S12E3 and the third non-driving surface S12E4 if needed and/or desired.

The first recess S12C1, the second recess S12D1, and the third recess S12E1 allow the drive chain C to smoothly move toward the rear sprocket SP1 during the upshifting operation. The first recess S12C1, the second recess S12D1, and the third recess S12E1 make it smoother to bring the upshifting initiation tooth S12F into engagement with the drive chain C during the upshifting operation. Thus, it is possible to smoothen the upshifting operation.

As seen in FIG. 3, the rear sprockets SP1 to SP11 are separate members from each other. However, at least two of rear sprockets can be integrally provided with each other as a one-piece unitary member if needed and/or desired. Elements having substantially the same function as those in the rear sprocket assembly 10 and the modifications thereof will be numbered the same here and will not be described and/or illustrated again in detail here for the sake of brevity.

Figure 25:
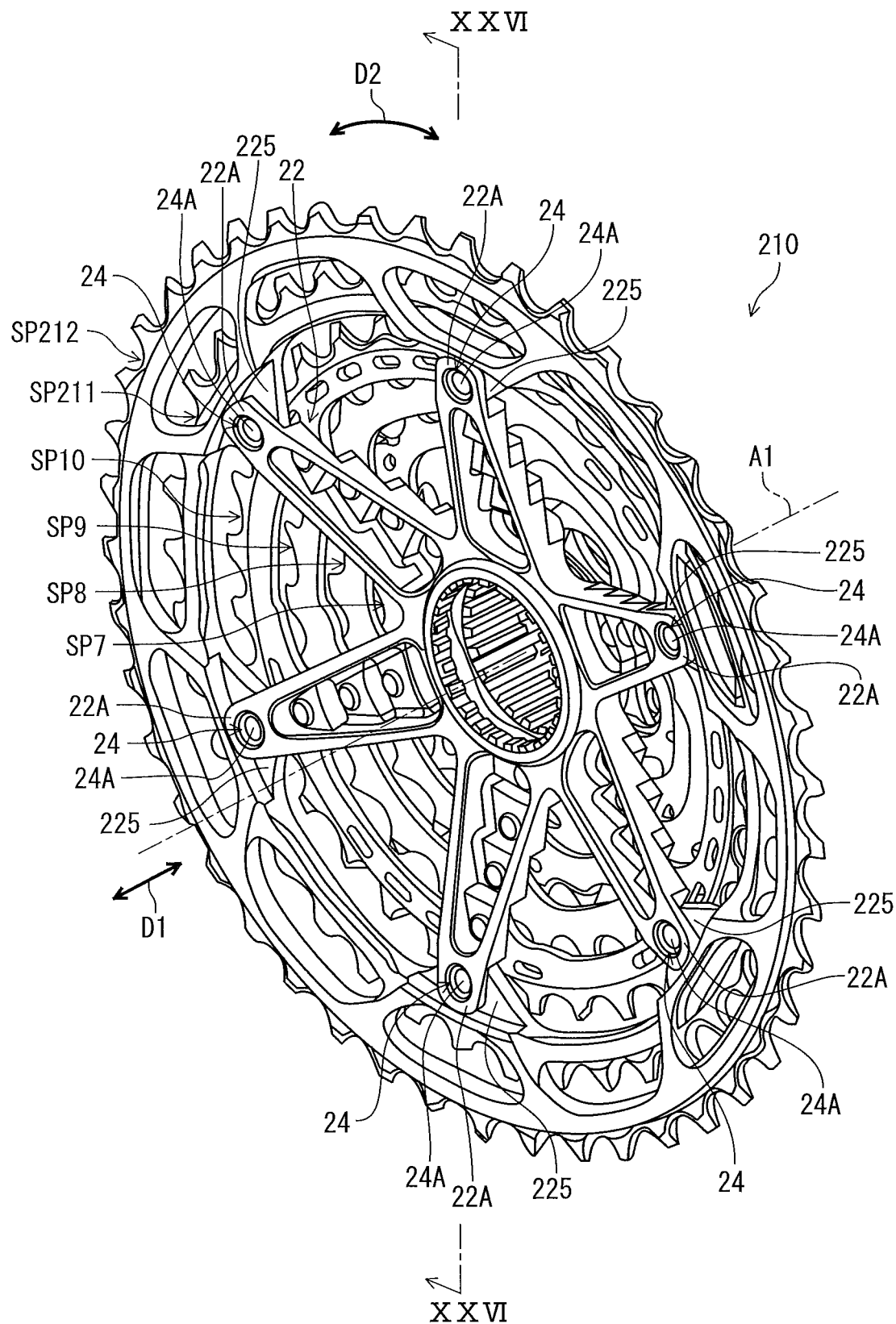
FIG. 25 is a perspective view of a rear sprocket assembly in accordance with a first modification.

FIG. 25 depicts a rear sprocket assembly 210 in accordance with a first modification. The rear sprocket assembly 210 has substantially the same structure as the structure of the rear sprocket assembly 10. The rear sprocket assembly 210 for the human-powered vehicle 2 has the rotational center axis A1. The rear sprocket SP10 of the rear sprocket assembly 10 can also be referred to as a first rear-sprocket SP10. The rear sprocket assembly 210 comprises the first rear-sprocket SP10, a second rear-sprocket SP211, and a third rear-sprocket SP212. In the rear sprocket assembly 210, the second rear-sprocket SP211 and the third rear-sprocket SP212 are formed as a unitary, one-piece member.

Figure 26:
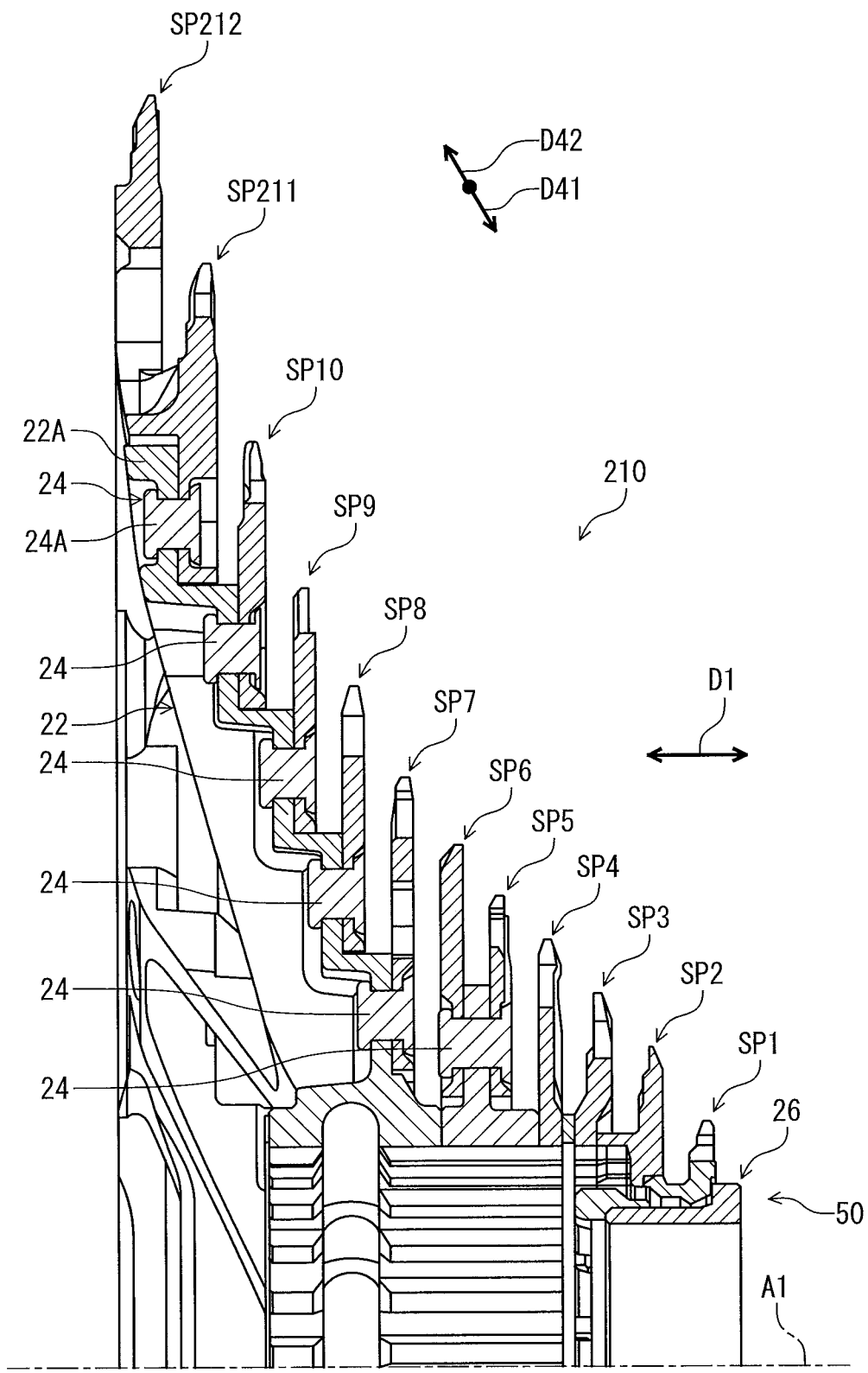
FIG. 26 is a cross-sectional view of the rear sprocket assembly taken along line XXVI-XXVI of FIG. 25.

As seen in FIG. 26, the second rear-sprocket SP211 is adjacent to the first rear-sprocket SP10 without another sprocket between the first rear-sprocket SP10 and the second rear-sprocket SP211 in the axial direction D1. The third rear-sprocket SP212 is adjacent to the second rear-sprocket SP211 without another sprocket between the second rear-sprocket SP211 and the third rear-sprocket SP212 in the axial direction D1. The first rear-sprocket SP10 is a separate member from the second rear-sprocket SP211 and the third rear-sprocket SP212.

The rear sprockets SP1 to SP9 of the rear sprocket assembly 10 can also be referred to as additional rear-sprockets SP1 to SP9. Namely, the rear sprocket assembly 210 further comprises the plurality of additional rear-sprockets SP1 to SP9. The plurality of additional rear-sprockets SP1 to SP9 is disposed on an opposite side of the second rear-sprocket SP211 with respect to the first rear-sprocket SP10. Each of the plurality of additional rear-sprockets SP1 to SP9 is a separate member from the second rear-sprocket SP211 and the third rear-sprocket SP212. The plurality of additional rear-sprockets SP1 to SP9 is a separate member from each other. However, at least two of the first rear-sprocket SP10 and the plurality of additional rear-sprockets SP1 to SP9 can be integrally provided with each other as a one-piece unitary member if needed and/or desired.

For example, the plurality of additional rear-sprockets SP1 to SP9 is made of at least one of aluminum, titanium and iron. The first rear-sprocket SP10 is made of at least one of aluminum, titanium and iron. The second rear-sprocket SP211 and the third rear-sprocket SP212 are made of aluminum. However, the materials of the first rear-sprocket SP10 and the plurality of additional rear-sprockets SP1 to SP9 are not limited to the above examples. The material of the second rear-sprocket SP211 and the third rear-sprocket SP212 is not limited to the above examples.

As seen in FIG. 25, the rear sprocket assembly 210 includes the sprocket carrier 22. One of the second rear-sprocket SP211 and the third rear-sprocket SP212 has at least one coupling portion 225 coupled to one of the first rear-sprocket SP10 and the sprocket carrier 22 that is a separate member from the second rear-sprocket SP211 and the third rear-sprocket SP212. The at least one coupling portion 225 is coupled to the one of the first rear-sprocket SP10 and the sprocket carrier 22 by at least one fastener 24. The fastener 24 includes a rivet 24A. Thus, the at least one coupling portion 225 is coupled to the one of the first rear-sprocket SP10 and the sprocket carrier 22 by at least one rivet 24A.

In the first modification, the second rear-sprocket SP211 has the at least one coupling portion 225. The at least one coupling portion 225 is coupled to the sprocket carrier 22. The sprocket carrier 22 includes a plurality of arms 22A. The second rear-sprocket SP211 has a plurality of coupling portions 225 coupled to the plurality of arms 22A of the sprocket carrier 22. The coupling portion 225 is coupled to the arm 22A of the sprocket carrier 22 with the rivet 24A. However, the coupling portion 225 can be coupled to the arm 22A of the sprocket carrier 22 with members other than the rivet 24A if needed and/or desired. The total number of the coupling portions 225 is not limited to the illustrated modification. The total number of the arms 22A of the sprocket carrier 22 is not limited to the illustrated modification. The third rear-sprocket SP212 can include the at least one coupling portion 225 if needed and/or desired. The at least one coupling portion 225 can be coupled to the first rear-sprocket SP10 by the fastener 24 if needed and/or desired.

Figure 27:
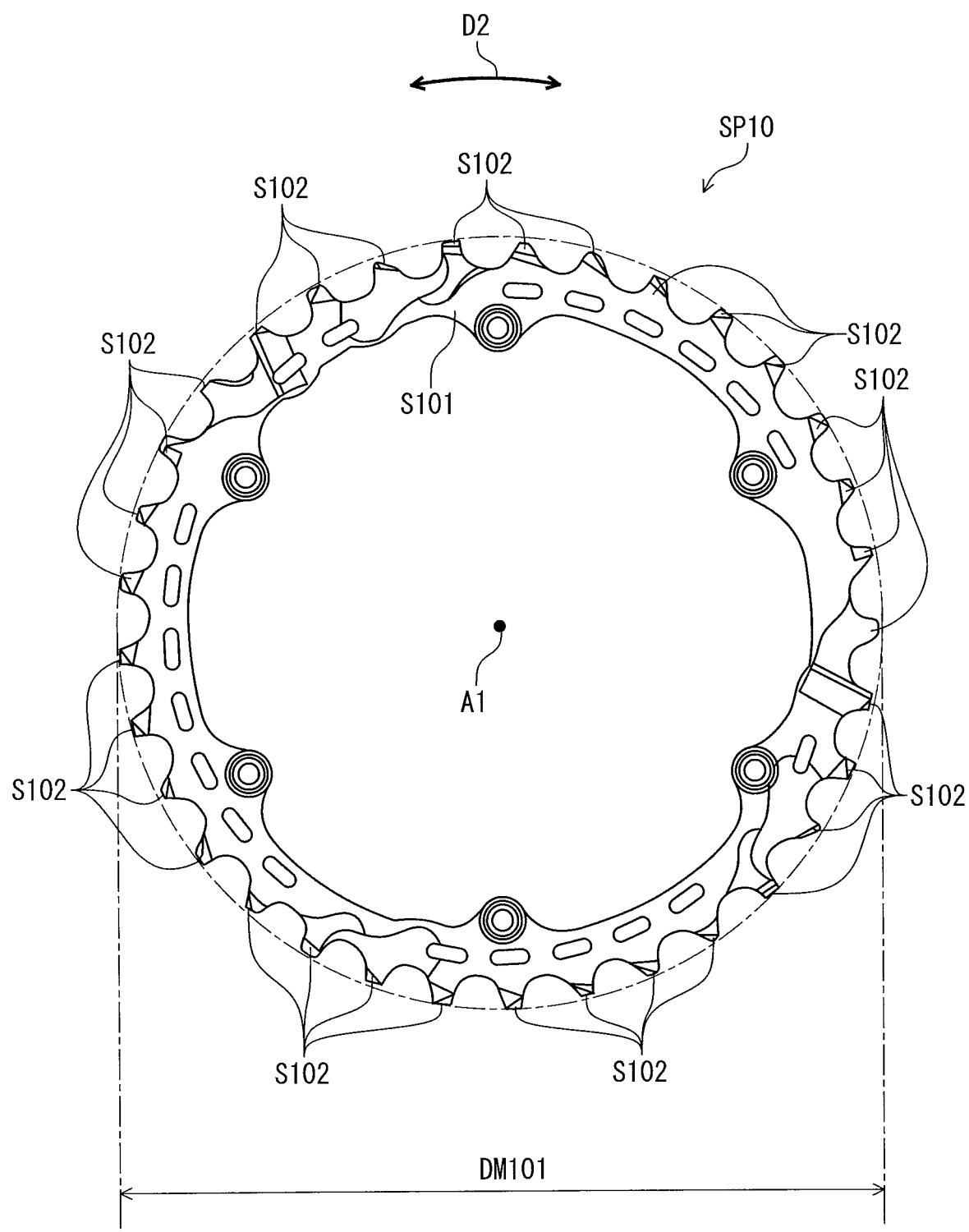
FIG. 27 is a side elevational view of a first rear-sprocket of the rear sprocket assembly illustrated in FIG. 25.

As seen in FIG. 27, the first rear-sprocket SP10 has the rotational center axis A1 to define the axial direction D1, the radial direction and the circumferential direction D2. The first rear-sprocket SP10 comprises a sprocket body S101 and a plurality of sprocket teeth S102. The plurality of sprocket teeth S102 extends radially outwardly from the sprocket body S101 in the radial direction. The plurality of sprocket teeth S102 defines a sprocket outer diameter DM101. The first rear-sprocket SP10 has a first total tooth number. The first total tooth number is a total number of the sprocket teeth S102.

Figure 28:
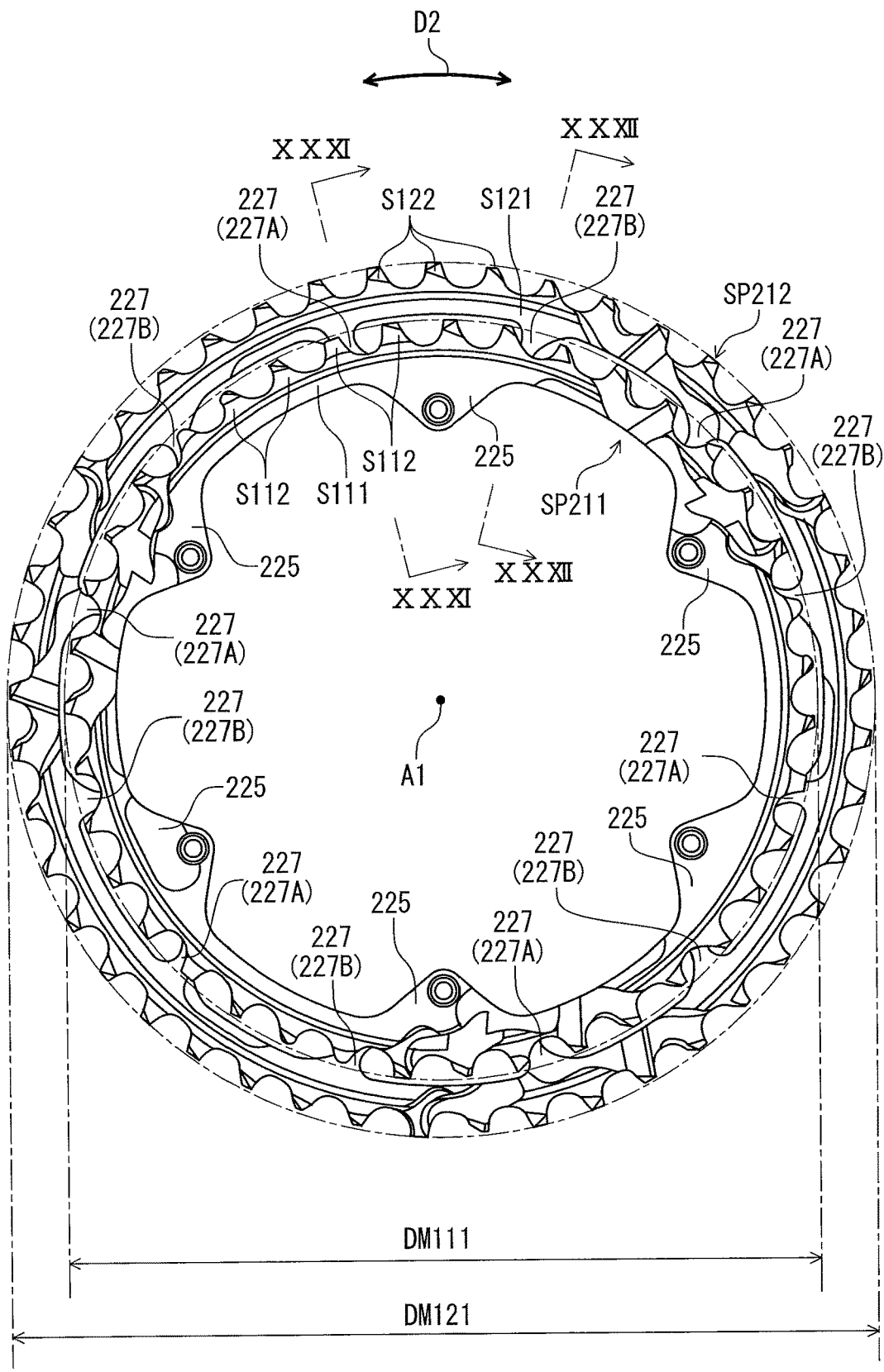
FIG. 28 is a side elevational view of second and third rear-sprockets of the rear sprocket assembly illustrated in FIG. 25.

As seen in FIG. 28, the second rear-sprocket SP211 has the rotational center axis A1 to define the axial direction D1, the radial direction and the circumferential direction D2. The second rear-sprocket SP211 comprises a sprocket body S111 and a plurality of sprocket teeth S112. The plurality of sprocket teeth S112 extends radially outwardly from the sprocket body S111 in the radial direction. The plurality of sprocket teeth S112 defines a sprocket outer diameter DM111. The second rear-sprocket SP211 has a second total tooth number. The second total number is a total number of the sprocket teeth S112. The second total tooth number is larger than the first total tooth number. The sprocket outer diameter DM111 is larger than the sprocket outer diameter DM101 of the first rear-sprocket SP10 (see e.g., FIG. 27).

The third rear-sprocket SP212 has the rotational center axis A1 to define the axial direction D1, the radial direction and the circumferential direction D2. The third rear-sprocket SP212 comprises a sprocket body S121 and a plurality of sprocket teeth S122. The plurality of sprocket teeth S122 extends radially outwardly from the sprocket body S121 in the radial direction. The plurality of sprocket teeth S122 defines a sprocket outer diameter DM121. The third rear-sprocket SP212 has a third total tooth number. The third total number is a total number of the sprocket teeth S122. The third total tooth number is larger than the second total tooth number. The sprocket outer diameter DM121 is larger than the sprocket outer diameter DM111 of the second rear-sprocket SP211.

Figure 29:
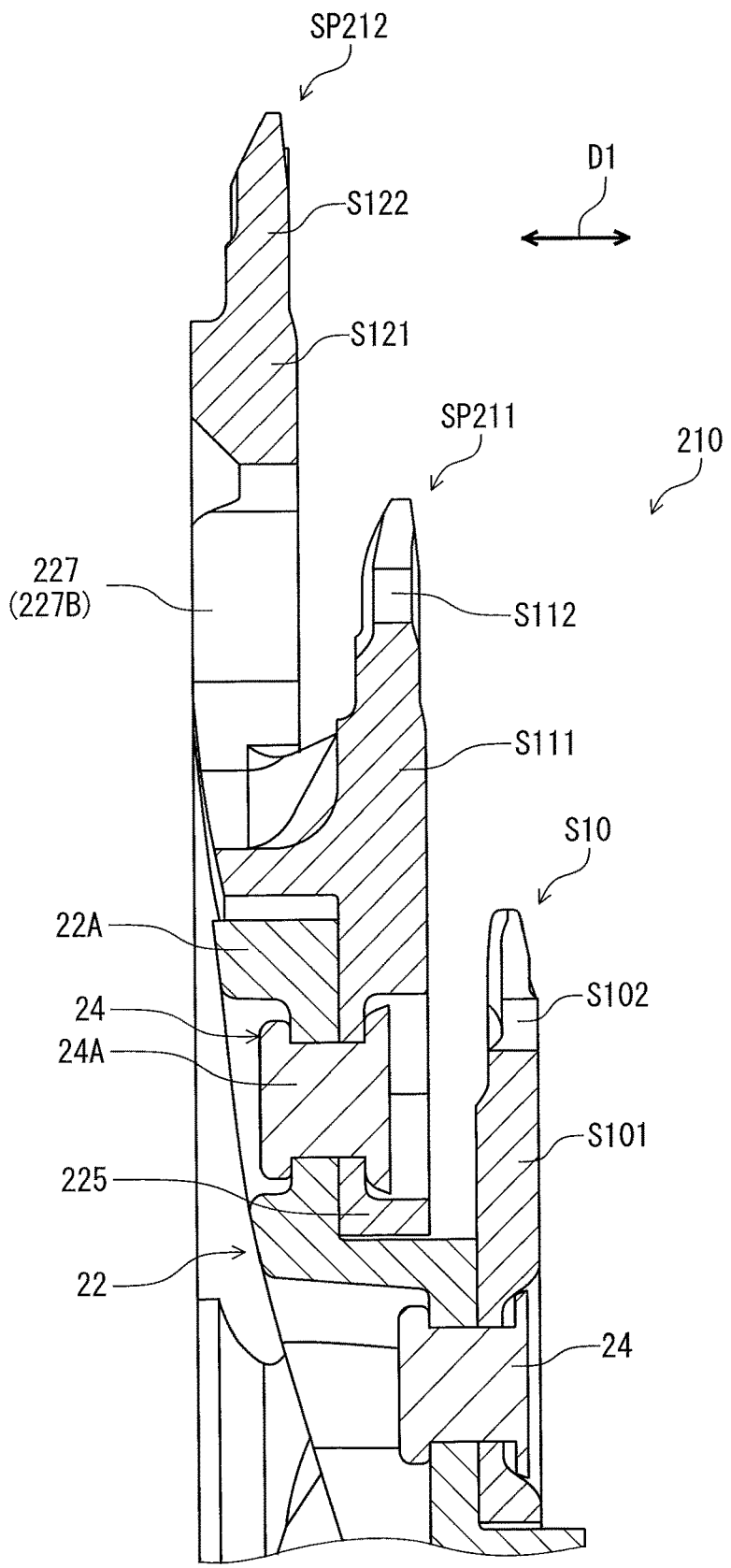
FIG. 29 is a partial enlarged cross-sectional view of the rear sprocket assembly illustrated in FIG. 26.

As seen in FIG. 29, the coupling portion 225 extends radially inwardly from the sprocket body S111 of the second rear-sprocket SP211. In the present embodiment, the coupling portion 225 is integrally provided with the sprocket body S111. However, the coupling portion 225 can be a separate member from the sprocket body S111 if needed and/or desired. The coupling portion 225 can be provided to extend radially inwardly from the sprocket body S121 of the third rear-sprocket SP212 if needed and/or desired.

Figure 30:
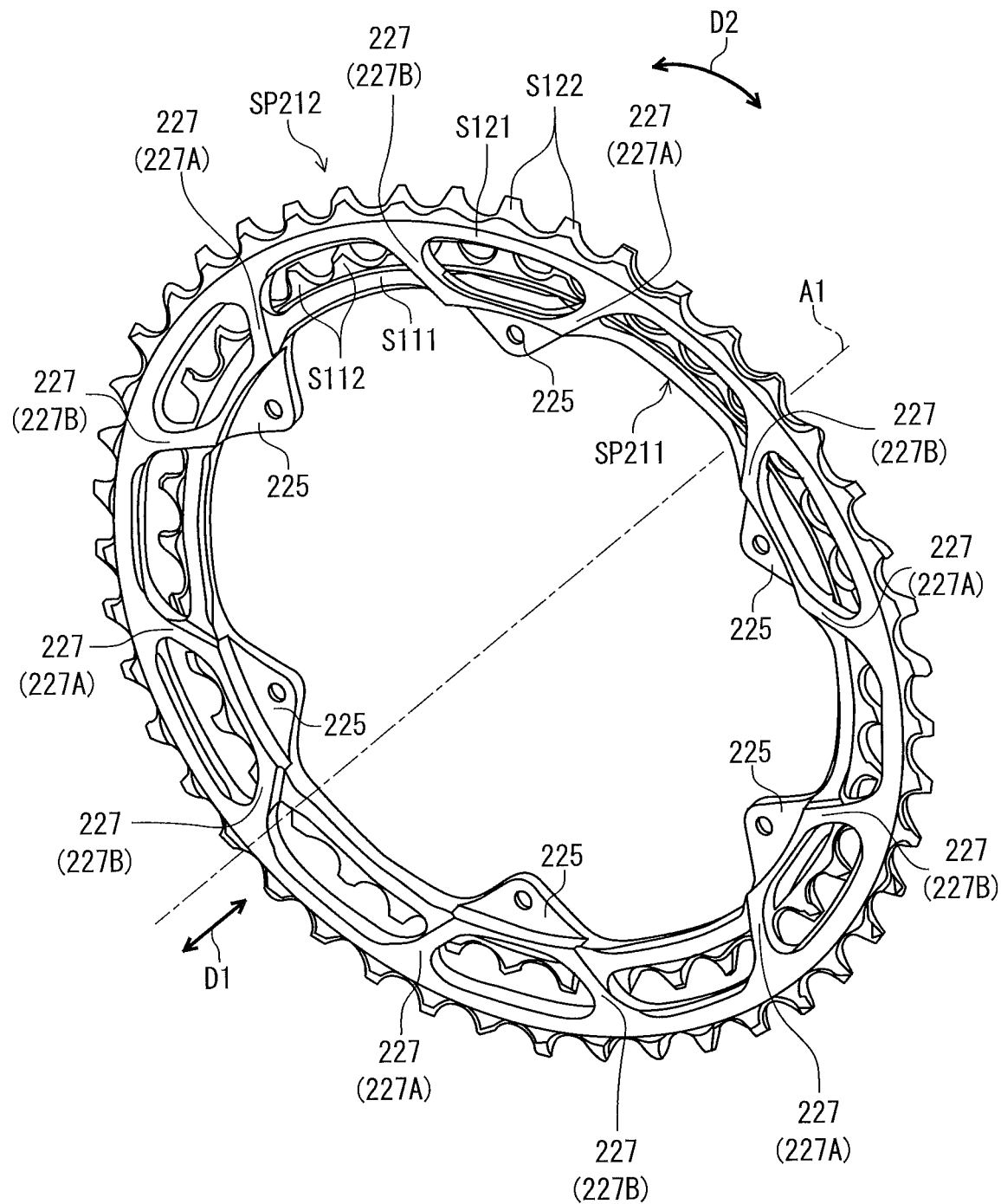
FIG. 30 is a perspective view of the second and third rear-sprockets illustrated in FIG. 28.

As seen in FIG. 30, the third rear-sprocket SP212 includes at least one connecting portion 227 extending radially inwardly from the sprocket body S121. The third rear-sprocket SP212 includes a plurality of connecting portions 227 extending radially inwardly from the sprocket body S121. The connecting portion 227 extend radially inwardly from the sprocket body S121 of the third rear-sprocket SP212 to the sprocket body S111 of the second rear-sprocket SP211. The connecting portion 227 connects the sprocket body S111 of the second rear-sprocket SP211 and the sprocket body S121 of the third rear-sprocket SP212.

The plurality of connecting portions 227 includes at least one first connecting portion 227A and at least one second connecting portion 227B. In the first modification, the plurality of connecting portions 227 includes a plurality of first connecting portions 227A and a plurality of second connecting portions 227B. The plurality of first connecting portions 227A and the plurality of second connecting portions 227B are alternatingly arranged in the circumferential direction D2.

The first connecting portion 227A extend radially inwardly from the sprocket body S121 of the third rear-sprocket SP212 toward the coupling portion 225. The second connecting portion 227B extend radially inwardly from the sprocket body S121 of the third rear-sprocket SP212 toward the coupling portion 225. The first connecting portion 227A connects the sprocket body S111 of the second rear-sprocket SP211 and the sprocket body S121 of the third rear-sprocket SP212. The second connecting portion 227B connects the sprocket body S111 of the second rear-sprocket SP211 and the sprocket body S121 of the third rear-sprocket SP212. A pair of the first connecting portion 227A and the second connecting portion 227B corresponds to the coupling portion 225. The arrangement of the connecting portions 227 is not limited to the illustrated modification.

Figure 31:
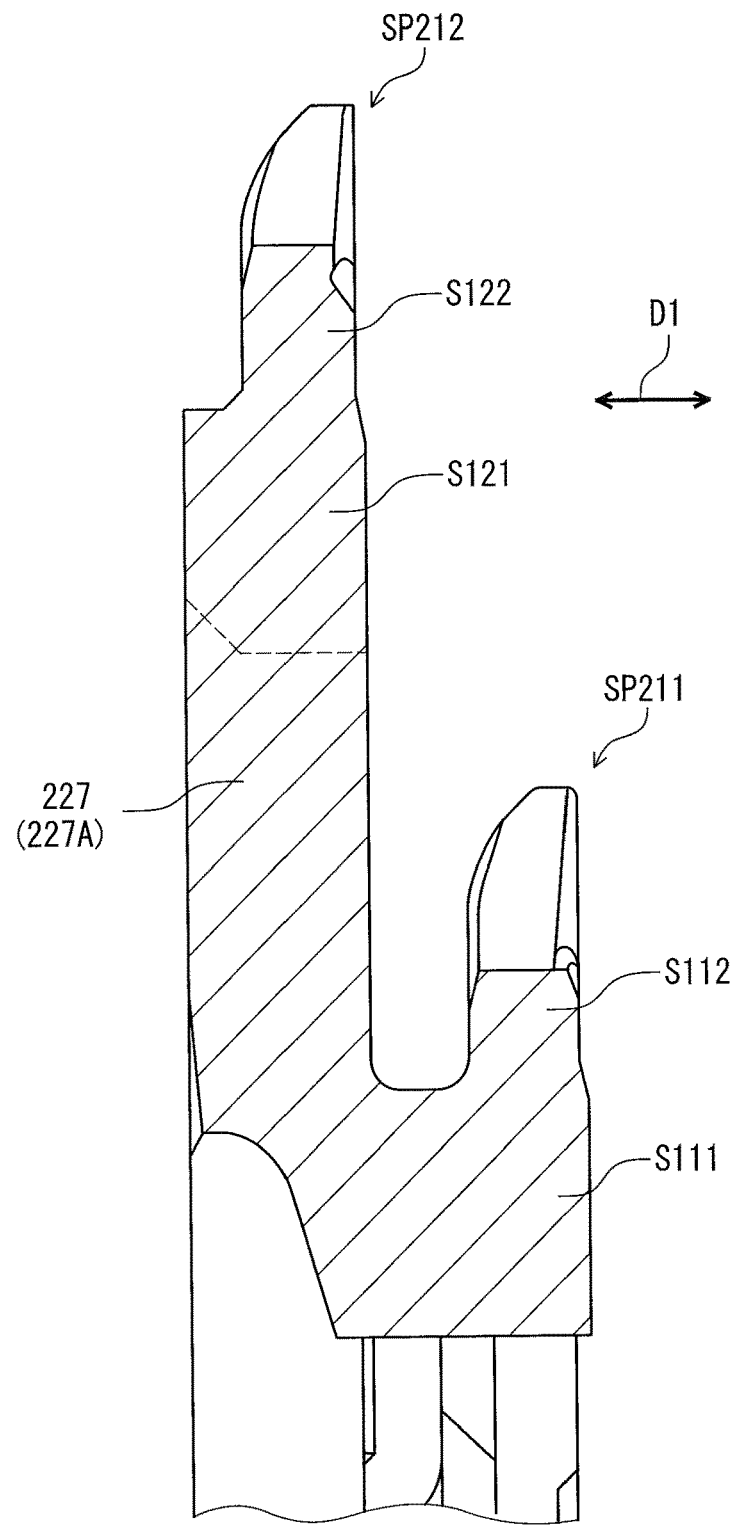
FIG. 31 is a cross-sectional view of the rear sprocket assembly taken along line XXXI-XXXI of FIG. 28.
Figure 32:
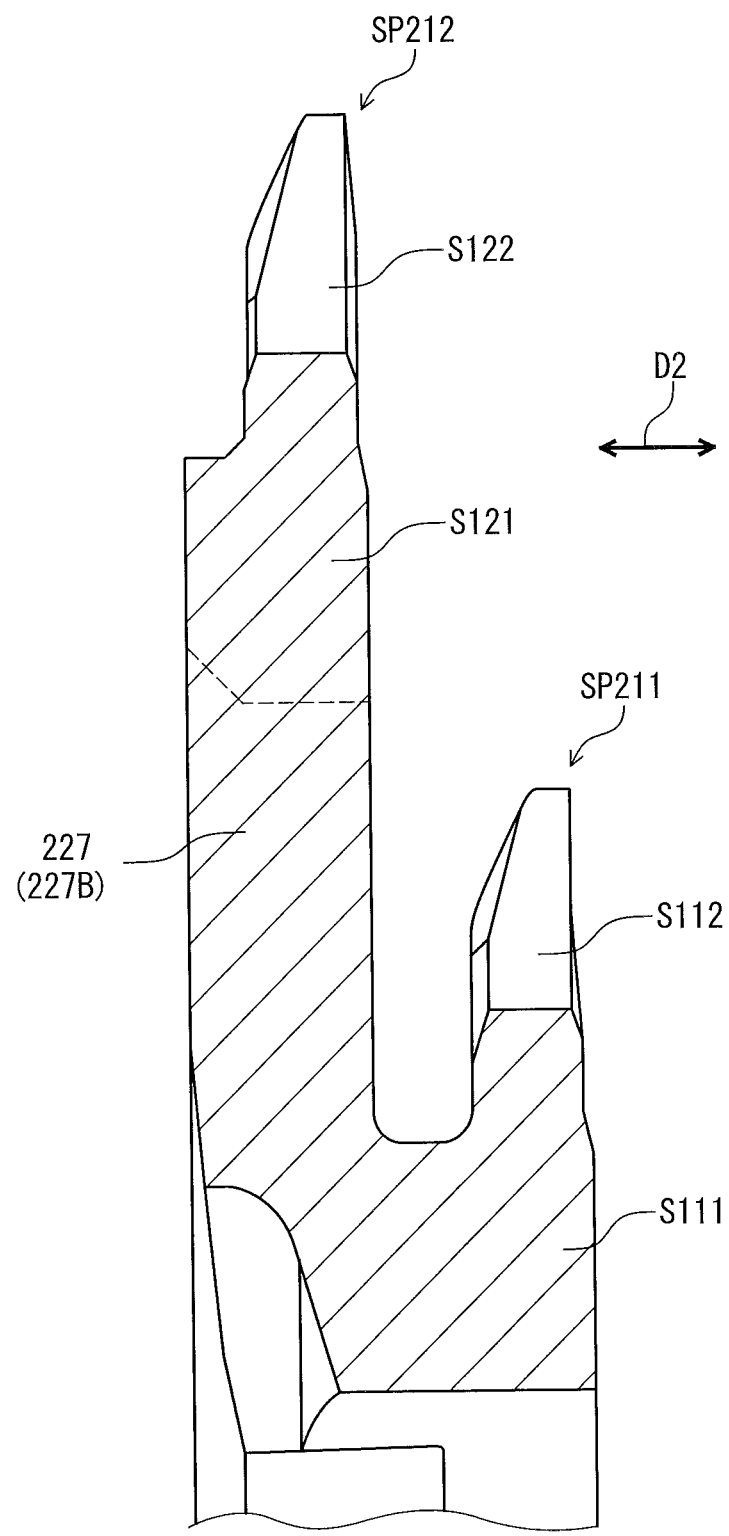
FIG. 32 is a cross-sectional view of the rear sprocket assembly taken along line XXXII-XXXII of FIG. 28.

As seen in FIGS. 31 and 32, the connecting portion 227 is integrally provided with the sprocket body S111 of the second rear-sprocket SP211 as a one-piece unitary member. The connecting portion 227 is integrally provided with the sprocket body S121 of the third rear-sprocket SP212 as a one-piece unitary member.

As seen in FIG. 31, the first connecting portion 227A is integrally provided with the sprocket body S111 of the second rear-sprocket SP211 as a one-piece unitary member. The first connecting portion 227A is integrally provided with the sprocket body S121 of the third rear-sprocket SP212 as a one-piece unitary member.

As seen in FIG. 32, the second connecting portion 227B is integrally provided with the sprocket body S111 of the second rear-sprocket SP211 as a one-piece unitary member. The second connecting portion 227B is integrally provided with the sprocket body S121 of the third rear-sprocket SP212 as a one-piece unitary member.

Figure 33:
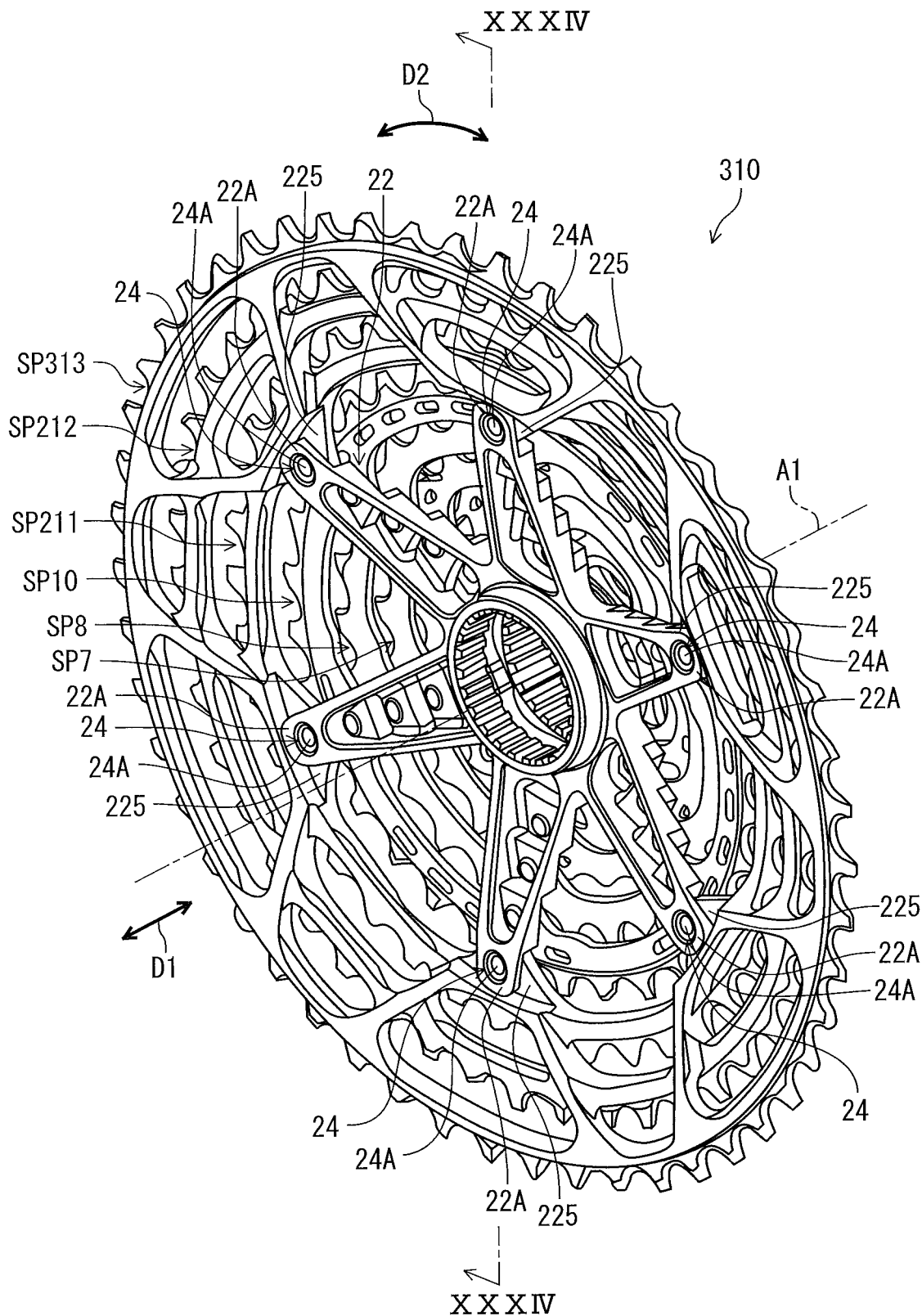
FIG. 33 is a perspective view of a rear sprocket assembly in accordance with a second modification.

FIG. 33 depicts a rear sprocket assembly 310 in accordance with a second modification. The rear sprocket assembly 310 has substantially the same structure as the structure of the rear sprocket assembly 210. The rear sprocket assembly 310 for the human-powered vehicle 2 has the rotational center axis A1. The rear sprocket assembly 310 comprises the first rear-sprocket SP10, the second rear-sprocket SP211, and the third rear-sprocket SP212. The second rear-sprocket SP211 and the third rear-sprocket SP212 are formed as a unitary, one-piece member. The rear sprocket assembly 310 further comprises a fourth rear-sprocket SP313. The second rear-sprocket SP211, the third rear-sprocket SP212 and the fourth rear-sprocket SP313 are formed as a unitary, one-piece member. In the above-mentioned embodiments, a total number of rear-sprockets formed as a unitary, one-piece member in a rear sprocket assembly is two or three. However, a total number of rear-sprockets formed as a unitary, one-piece member in a rear sprocket assembly can be equal to or larger than four. Preferably, a rear sprocket assembly comprises a plurality of rear-sprockets formed as a unitary, one-piece member and at least one rear-sprocket that is a separate member from the plurality of rear-sprockets formed as a unitary, one-piece member.

Figure 34:
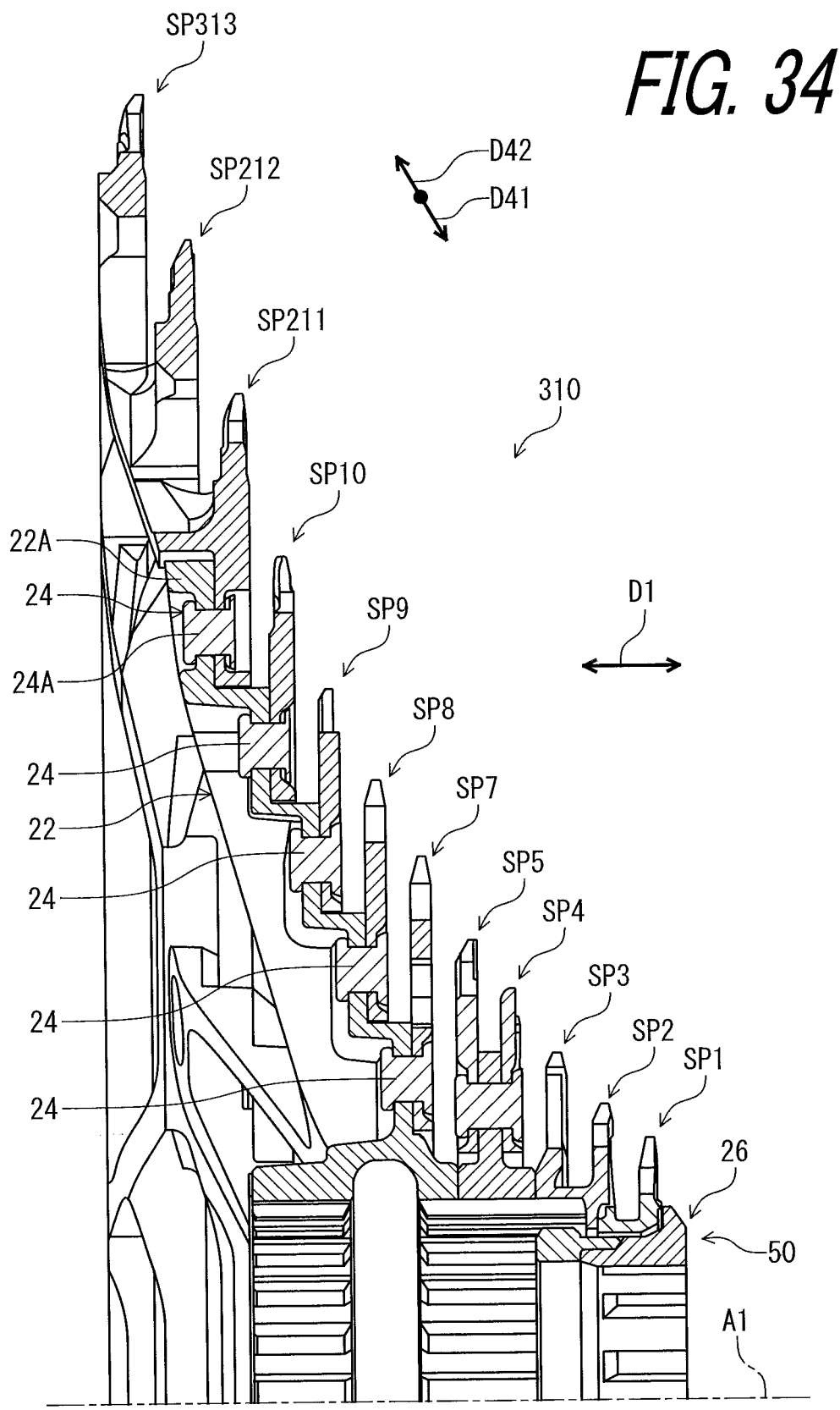
FIG. 34 is a cross-sectional view of the rear sprocket assembly taken along line XXXIV-XXXIV of FIG. 33.

As seen in FIG. 34, the fourth rear-sprocket SP313 is adjacent to the third rear-sprocket SP212 without another sprocket between the third rear-sprocket SP212 and the fourth rear-sprocket SP313 in the axial direction D1. The first rear-sprocket SP10 is a separate member from the second rear-sprocket SP211, the third rear-sprocket SP212, and the fourth rear-sprocket SP313.

The rear sprockets SP1 to SP5 and SP7 to SP9 can also be referred to as additional rear-sprockets SP1 to SP5 and SP7 to SP9. Namely, the rear sprocket assembly 310 further comprises the plurality of additional rear-sprockets SP1 to SP5 and SP7 to SP9. The plurality of additional rear-sprockets SP1 to SP5 and SP7 to SP9 is disposed at an opposite side of the second rear-sprocket SP211 with respect to the first rear-sprocket SP10. Each of the plurality of additional rear-sprockets SP1 to SP5 and SP7 to SP9 is a separate member from the second rear-sprocket SP211 and the third rear-sprocket SP212. Each of the plurality of additional rear-sprockets SP1 to SP5 and SP7 to SP9 is a separate member from the second rear-sprocket SP211, the third rear-sprocket SP212, and the fourth rear-sprocket SP313. The plurality of additional rear-sprockets SP1 to SP5 and SP7 to SP9 is a separate member from each other. However, at least two of the first rear-sprocket SP10 and the plurality of additional rear-sprockets SP1 to SP5 and SP7 to SP9 can be integrally provided with each other as a one-piece unitary member if needed and/or desired.

For example, the plurality of additional rear-sprockets SP1 to SP5 and SP7 to SP9 is made of at least one of aluminum, titanium and iron. The first rear-sprocket SP10 is made of at least one of aluminum, titanium and iron. The second rear-sprocket SP211 and the third rear-sprocket SP212 are made of aluminum. The second rear-sprocket SP211, the third rear-sprocket SP212 and the fourth rear-sprocket SP313 are made of aluminum. However, the materials of the first rear-sprocket SP10 and the plurality of additional rear-sprockets SP1 to SP5 and SP7 to SP9 are not limited to the above examples. The material of the second rear-sprocket SP211, the third rear-sprocket SP212, and the fourth rear-sprocket SP313 is not limited to the above examples.

As seen in FIG. 33, the rear sprocket assembly 310 includes the sprocket carrier 22. One of the second rear-sprocket SP211, the third rear-sprocket SP212 and the fourth rear-sprocket SP313 has at least one coupling portion 225 coupled to one of the first rear-sprocket SP10 and the sprocket carrier 22 that is a separate member from the second rear-sprocket SP211, the third rear-sprocket SP212 and the fourth rear-sprocket SP313. The at least one coupling portion 225 is coupled to the one of the first rear-sprocket SP10 and the sprocket carrier 22 by at least one fastener 24. The at least one coupling portion 225 is coupled to the one of the first rear-sprocket SP10 and the sprocket carrier 22 by at least one rivet 24A.

In the second modification, the second rear-sprocket SP211 has the at least one coupling portion 225. The at least one coupling portion 225 is coupled to the sprocket carrier 22. The second rear-sprocket SP211 has the plurality of coupling portions 225 coupled to the plurality of arms 22A of the sprocket carrier 22. The coupling portion 225 is coupled to the arm 22A of the sprocket carrier 22 with the rivet 24A. However, the coupling portion 225 can be coupled to the arm 22A of the sprocket carrier 22 with members other than the rivet 24A if needed and/or desired. The total number of the coupling portions 225 is not limited to the illustrated modification. The total number of the arms 22A of the sprocket carrier 22 is not limited to the illustrated modification. One of the third rear-sprocket SP212 and the fourth rear-sprocket SP313 can include the at least one coupling portion 225 if needed and/or desired. The at least one coupling portion 225 can be coupled to the first rear-sprocket SP10 by the fastener 24 if needed and/or desired.

Figure 35:
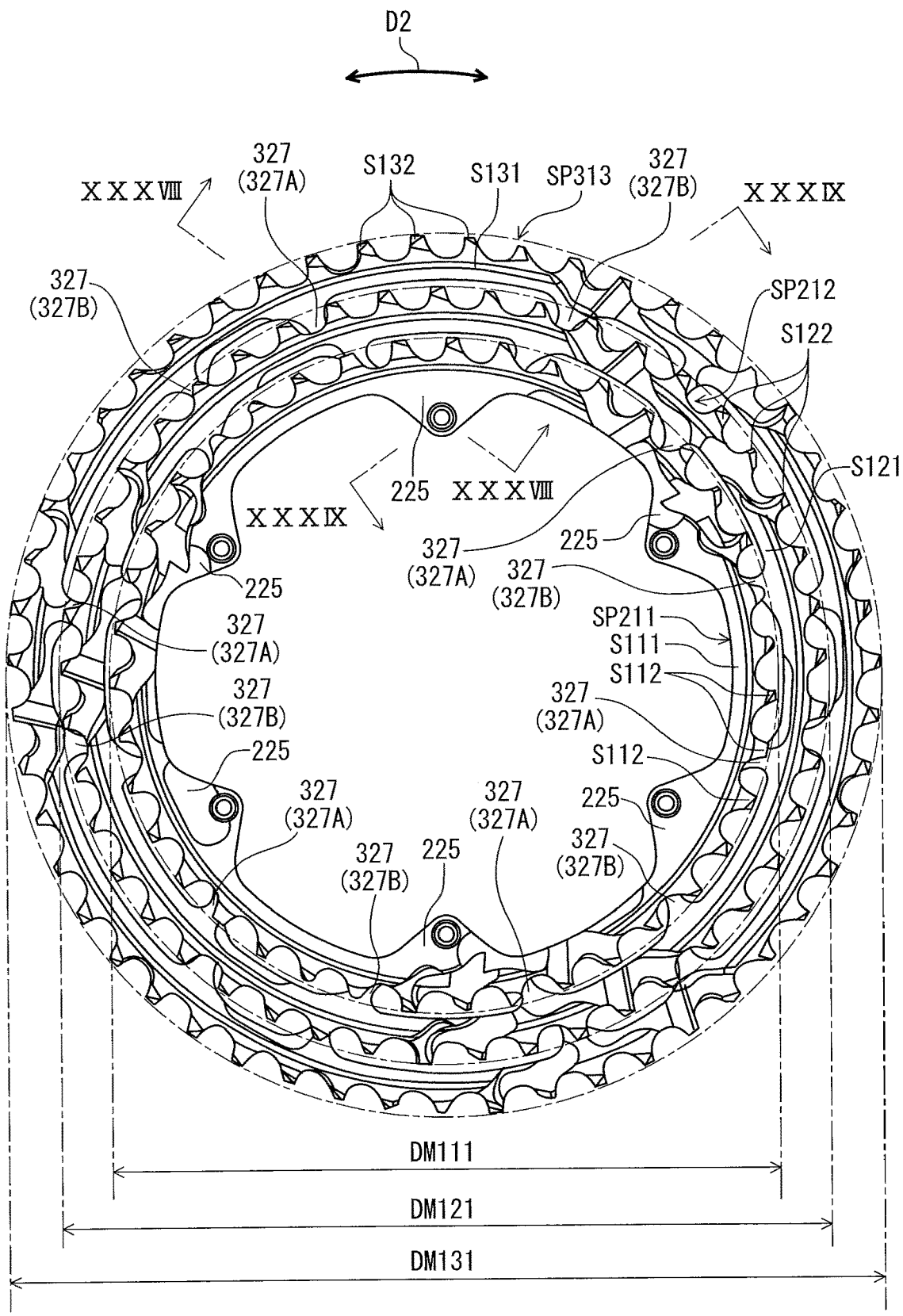
FIG. 35 is a side elevational view of second, third and fourth rear-sprockets of the rear sprocket assembly illustrated in FIG. 33.

As seen in FIG. 35, the second rear-sprocket SP211 comprises the sprocket body S111 and the plurality of sprocket teeth S112. The second rear-sprocket SP211 has the second total tooth number. The second total tooth number is larger than the first total tooth number of the first rear-sprocket SP10. The sprocket outer diameter DM111 is larger than the sprocket outer diameter DM101 of the first rear-sprocket SP10 (see e.g., FIG. 27).

The third rear-sprocket SP212 comprises the sprocket body S121 and the plurality of sprocket teeth S122. The third rear-sprocket SP212 has the third total tooth number. The third total tooth number is larger than the second total tooth number. The sprocket outer diameter DM121 is larger than the sprocket outer diameter DM111 of the second rear-sprocket SP211.

The fourth rear-sprocket SP313 comprises a sprocket body S131 and a plurality of sprocket teeth S132. The plurality of sprocket teeth S132 extends radially outwardly from the sprocket body S131 in the radial direction. The plurality of sprocket teeth S132 defines a sprocket outer diameter DM131. The fourth rear-sprocket SP313 has a fourth total tooth number. The fourth total number is a total number of the sprocket teeth S132. The fourth total tooth number is larger than the third total tooth number. The sprocket outer diameter DM131 is larger than the sprocket outer diameter DM121 of the third rear-sprocket SP212.

Figure 36:
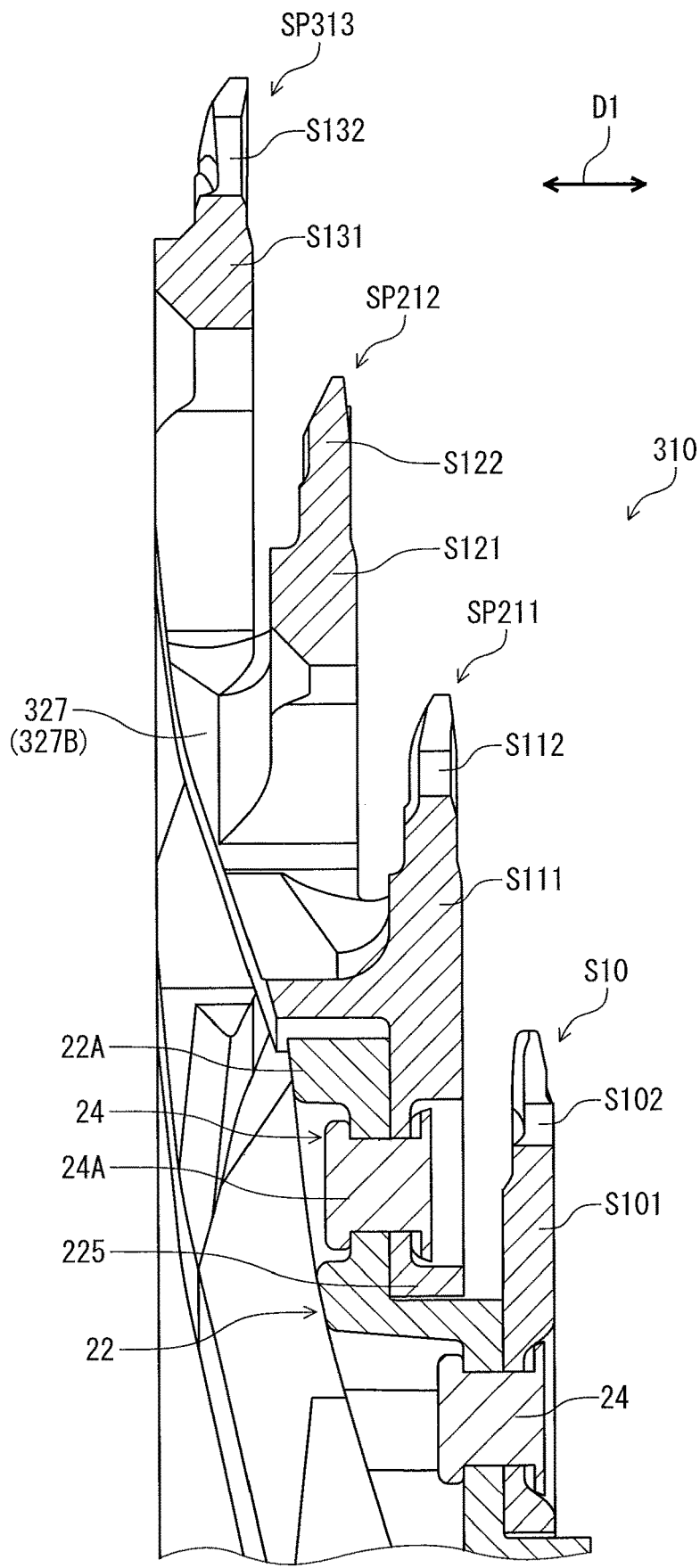
FIG. 36 is a partial enlarged cross-sectional view of the rear sprocket assembly illustrated in FIG. 34.

As seen in FIG. 36, the coupling portion 225 extends radially inwardly from the sprocket body S111 of the second rear-sprocket S211. In the present embodiment, the coupling portion 225 is integrally provided with the sprocket body S111. However, the coupling portion 225 can be a separate member from the sprocket body S111 if needed and/or desired. The coupling portion 225 can be provided to extend radially inwardly from the sprocket body S121 of the third rear-sprocket SP212 and/or the sprocket body S131 of the fourth rear-sprocket SP313 if needed and/or desired.

Figure 37:
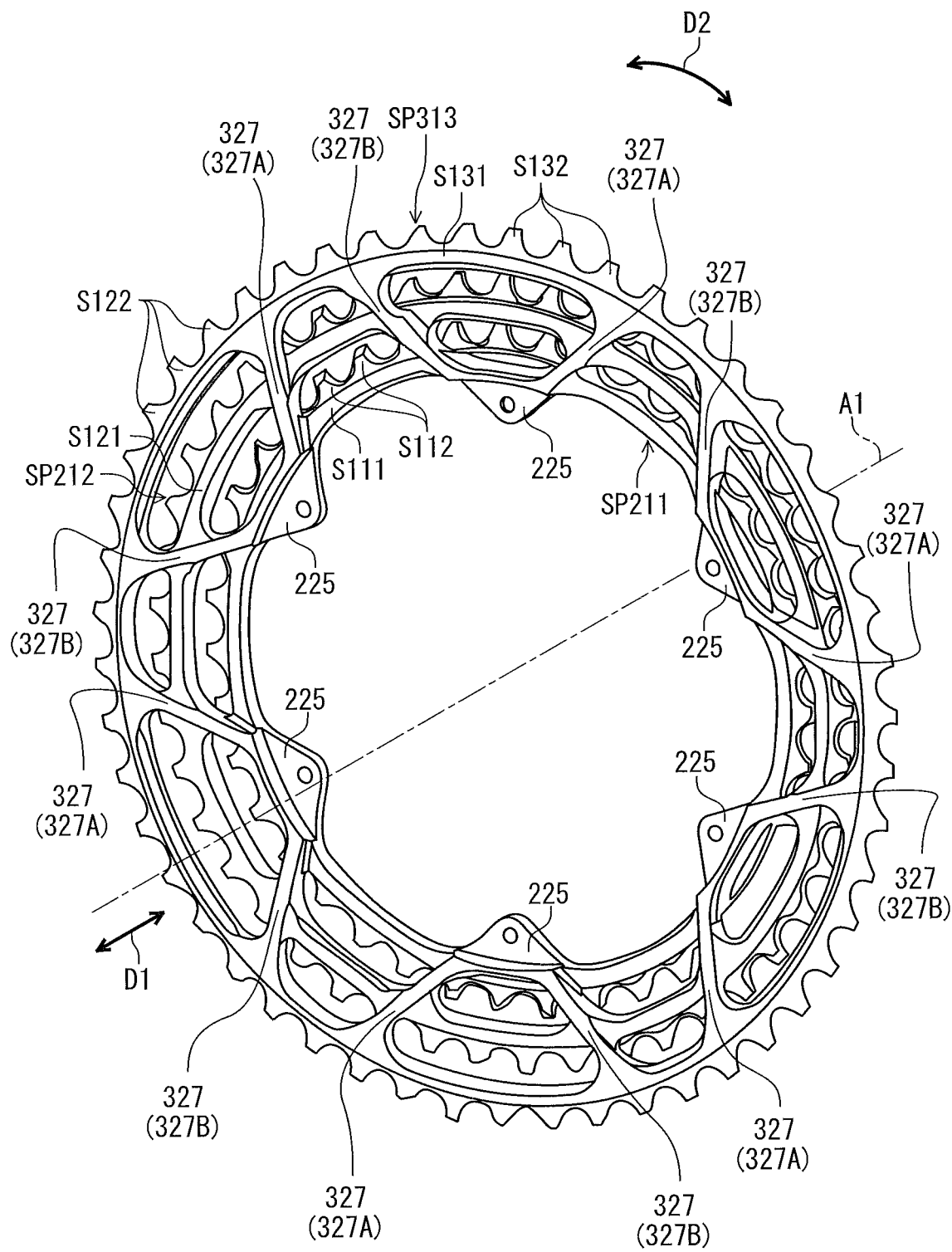
FIG. 37 is a perspective view of the second, third and fourth rear-sprockets illustrated in FIG. 35.

As seen in FIG. 37, the fourth rear-sprocket SP313 includes at least one connecting portion 327 extending radially inwardly from the sprocket body S121. The fourth rear-sprocket SP313 includes a plurality of connecting portions 327 extending radially inwardly from the sprocket body S121. The connecting portion 327 extend radially inwardly from the sprocket body S131 of the fourth rear-sprocket SP313 to the sprocket body S111 of the second rear-sprocket SP211. The connecting portion 327 connects the sprocket body S121 of the third rear-sprocket SP212 and the sprocket body S131 of the fourth rear-sprocket SP313. Furthermore, the connecting portion 327 connects the sprocket body S111 of the second rear-sprocket SP211 and the sprocket body S121 of the third rear-sprocket SP212. Namely, the connecting portion 327 connects the sprocket body S131 of the fourth rear-sprocket SP313, the sprocket body S121 of the third rear-sprocket SP212, and the sprocket body S111 of the second rear-sprocket SP211.

The plurality of connecting portions 327 includes at least one first connecting portion 327A and at least one second connecting portion 327B. In the present embodiment, the plurality of connecting portions 327 includes a plurality of first connecting portions 327A and a plurality of second connecting portions 327B. The plurality of first connecting portions 327A and the plurality of second connecting portions 327B are alternatingly arranged in the circumferential direction D2.

The first connecting portion 327A extend radially inwardly from the sprocket body S131 of the fourth rear-sprocket SP313 toward the coupling portion 225. The second connecting portion 327B extend radially inwardly from the sprocket body S131 of the fourth rear-sprocket SP313 toward the coupling portion 225. The first connecting portion 327A connects the sprocket body S131 of the fourth rear-sprocket SP313, the sprocket body S121 of the third rear-sprocket SP212, and the sprocket body S111 of the second rear-sprocket SP211. The second connecting portion 327B connects the sprocket body S131 of the fourth rear-sprocket SP313, the sprocket body S121 of the third rear-sprocket SP212, and the sprocket body S111 of the second rear-sprocket SP211. A pair of the first connecting portion 327A and the second connecting portion 327B corresponds to the coupling portion 225. The arrangement of the connecting portions 327 is not limited to the illustrated modification.

Figure 38:
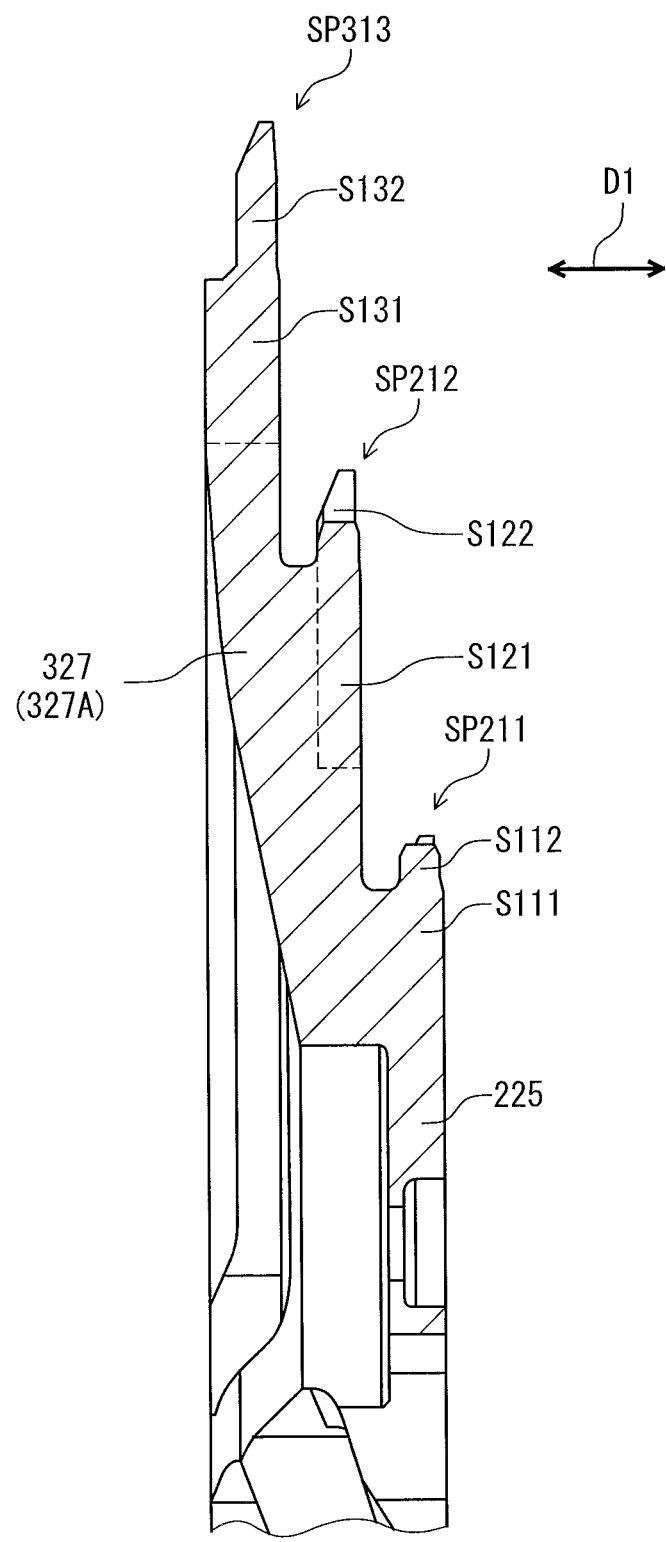
FIG. 38 is a cross-sectional view of the rear sprocket assembly taken along line XXXVIII-XXXVIII of FIG. 35.
Figure 39:
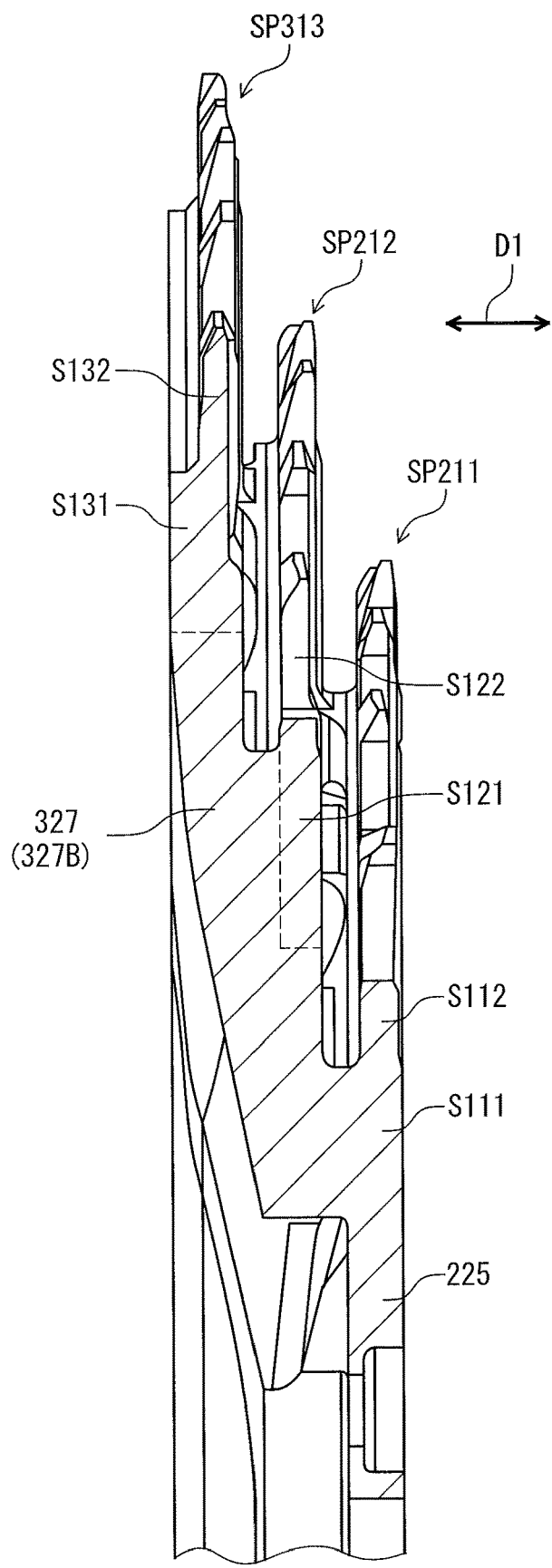
FIG. 39 is a cross-sectional view of the rear sprocket assembly taken along line XXXIX-XXXIX of FIG. 35.

As seen in FIGS. 38 and 39, the connecting portion 327 is integrally provided with the sprocket body S131 of the fourth rear-sprocket SP313 as a one-piece unitary member. The connecting portion 327 is integrally provided with the sprocket body S121 of the third rear-sprocket SP212 as a one-piece unitary member. The connecting portion 327 is integrally provided with the sprocket body S111 of the second rear-sprocket SP211 as a one-piece unitary member.

As seen in FIG. 38, the first connecting portion 327A is integrally provided with the sprocket body S131 of the fourth rear-sprocket SP313 as a one-piece unitary member. The first connecting portion 327A is integrally provided with the sprocket body S121 of the third rear-sprocket SP212 as a one-piece unitary member. The first connecting portion 327A is integrally provided with the sprocket body S111 of the second rear-sprocket SP211 as a one-piece unitary member.

As seen in FIG. 39, the second connecting portion 327B is integrally provided with the sprocket body S131 of the fourth rear-sprocket SP313 as a one-piece unitary member. The second connecting portion 327B is integrally provided with the sprocket body S121 of the third rear-sprocket SP212 as a one-piece unitary member. The second connecting portion 327B is integrally provided with the sprocket body S111 of the second rear-sprocket SP211 as a one-piece unitary member.

In the present application. the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The tem "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A rear sprocket configured to be mounted to a rear hub assembly for a human-powered vehicle, the rear sprocket having a rotational center axis to define an axial direction, a radial direction and a circumferential direction, the rear sprocket comprising:
a sprocket body;
a plurality of sprocket teeth extending radially outwardly from the sprocket body in the radial direction, the plurality of sprocket teeth defining a plurality of tooth bottom center points spaced apart from each other in the circumferential direction, each of the plurality of sprocket teeth having a tooth outline extending from corresponding one of the plurality of tooth bottom center points to a neighboring tooth bottom center point among the plurality of tooth bottom center points in the circumferential direction;
a plurality of spline teeth configured to transmit a driving torque to a neighboring sprocket adjacent to the rear sprocket without another sprocket between the rear sprocket and the neighboring sprocket in the axial direction, each of the plurality of spline teeth having a spline crest;
a maximum spline distance being defined from the rotational center axis to the spline crest;
a radial tooth-bottom distance being defined from the rotational center axis to one of the plurality of tooth bottom center points;
the maximum spline distance being larger than the radial tooth-bottom distance; and
the spline crest of each of the plurality of spline teeth being positioned radially inwardly from the tooth outline of each of the plurality of sprocket teeth in the radial direction.

2. The rear sprocket according to claim 1, wherein
the sprocket body has a sprocket opening configured to receive a hub axle of the rear hub assembly in a hub mounting state where the rear sprocket is mounted to the rear hub assembly.

3. The rear sprocket according to claim 2, wherein
the sprocket opening has a minimum diameter that is smaller than an outermost diameter of a sprocket support body of the rear hub assembly.

4. The rear sprocket according to claim 1, further comprising:
an annular base from which the plurality of spline teeth extends radially outwardly in the radial direction.

5. The rear sprocket according to claim 4, wherein
the rear sprocket has an axially outwardly facing surface and an axially inwardly facing surface provided on a reverse side of the axially outwardly facing surface in the axial direction,
the axially inwardly facing surface is configured to face toward an axial center plane of the human-powered vehicle in the axial direction in a vehicle mounting state where the rear sprocket is mounted to the human-powered vehicle, and
the annular base extends axially inwardly from the axially inwardly facing surface of the sprocket body in the axial direction.

6. The rear sprocket according to claim 4, wherein
the sprocket body has a sprocket opening configured to receive a hub axle of the rear hub assembly in a hub mounting state where the rear sprocket is mounted to the rear hub assembly, and
the annular base is disposed so as to surround the sprocket opening as viewed in the axial direction.

7. The rear sprocket according to claim 1, wherein
the plurality of spline teeth is spaced apart from the plurality of sprocket teeth in the axial direction.

8. The rear sprocket according to claim 1, wherein
at least two spline teeth of the plurality of spline teeth are disposed so as to overlap with one of the plurality of sprocket teeth as viewed in the axial direction.

9. The rear sprocket according to claim 1, wherein
the plurality of spline teeth includes at least one positioning spline tooth which is different from the other spline teeth of the plurality of spline teeth in at least one of size and shape.

10. The rear sprocket according to claim 9, wherein
the at least one positioning spline tooth has a circumferential positioning-spline width which is larger than each of circumferential spline widths of the other spline teeth of the plurality of spline teeth.

11. The rear sprocket according to claim 1, wherein
the plurality of spline teeth includes at least one circumferentially symmetrical tooth with respect to the rotational center axis.

12. The rear sprocket according to claim 11, wherein
the plurality of spline teeth includes a plurality of circumferentially symmetrical teeth with respect to the rotational center axis.

13. The rear sprocket according to claim 1, wherein
the plurality of spline teeth includes at least one circumferentially asymmetrical tooth with respect to the rotational center axis.

14. The rear sprocket according to claim 1, wherein
a total spline-tooth number of the plurality of spline teeth ranges from 15 to 18.

15. The rear sprocket according to claim 1, wherein
a total sprocket-tooth number of the plurality of sprocket teeth is equal to or smaller than 10.

16. The rear sprocket according to claim 15, wherein
a total sprocket-tooth number of the plurality of sprocket teeth is nine.

17. A rear sprocket configured to be mounted to a rear hub assembly for a human-powered vehicle, the rear sprocket having a rotational center axis to define an axial direction, a radial direction and a circumferential direction, the rear sprocket comprising:
a sprocket body;
a plurality of sprocket teeth extending radially outwardly from the sprocket body in the radial direction, the plurality of sprocket teeth defining a plurality of tooth bottom center points spaced apart from each other in the circumferential direction, each tooth bottom center point of the plurality of tooth bottom center points being radially innermost points along a tooth outline of each sprocket tooth of the plurality of sprocket teeth when viewed in the axial direction; and
a plurality of spline teeth configured to transmit driving torque to a neighboring sprocket adjacent to the rear sprocket without another sprocket between the rear sprocket and the neighboring sprocket in the axial direction, the plurality of spline teeth being disposed so as to be offset from the plurality of tooth bottom center points in the circumferential direction.

18. The rear sprocket according to claim 17, wherein a total spline-tooth number of the plurality of spline teeth ranges from 15 to 18.

19. The rear sprocket according to claim 17, wherein a total sprocket-tooth number of the plurality of sprocket teeth is equal to or smaller than 10.

20. The rear sprocket according to claim 19, wherein a total sprocket-tooth number of the plurality of sprocket teeth is nine.

* * * * *